United States Patent
Tazawa et al.

(10) Patent No.: US 6,879,129 B2
(45) Date of Patent: Apr. 12, 2005

(54) BRUSHLESS MOTOR CONTROL METHOD AND CONTROLLER

(75) Inventors: Toru Tazawa, Ibaraki (JP); Kazushige Narazaki, Katano (JP); Tomokuni Iijima, Osaka (JP); Hideo Matsushiro, Kusatsu (JP); Subrata Saha, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 196 days.

(21) Appl. No.: 10/109,206

(22) Filed: Mar. 28, 2002

(65) Prior Publication Data
US 2002/0140395 A1 Oct. 3, 2002

(30) Foreign Application Priority Data
Mar. 29, 2001 (JP) ........................................ 2001-097018

(51) Int. Cl.⁷ .......................... H01R 39/46; H02P 5/00; H02P 5/28
(52) U.S. Cl. ........................ 318/727; 318/439; 318/138; 318/700
(58) Field of Search ............................... 318/439, 700, 318/727, 138

(56) References Cited

U.S. PATENT DOCUMENTS

| | | | |
|---|---|---|---|
| 5,486,743 A | * 1/1996 | Nagai | 318/439 |
| 5,729,102 A | * 3/1998 | Gotou et al. | 318/254 |
| 5,814,957 A | * 9/1998 | Yoshida | 318/439 |
| 5,866,998 A | * 2/1999 | Menegoli | 318/254 |
| 6,034,493 A | * 3/2000 | Boyd et al. | 318/254 |
| 6,218,795 B1 | 4/2001 | Syukuri | |
| 6,512,341 B2 | * 1/2003 | Matsushiro et al. | 318/254 |
| 6,538,404 B2 | * 3/2003 | Kato et al. | 318/254 |

FOREIGN PATENT DOCUMENTS

| | | | | |
|---|---|---|---|---|
| JP | 62060499 A | * 3/1987 | | H02P/7/63 |
| JP | 07123773 A | 5/1995 | | |
| JP | 07212915 A | * 8/1995 | | B60L/9/18 |
| JP | 08023695 A | 1/1996 | | |
| JP | 09056192 A | * 2/1997 | | H02P/6/18 |
| JP | 09154294 A | 6/1997 | | |

\* cited by examiner

*Primary Examiner*—Rina Duda
*Assistant Examiner*—Patrick Miller
(74) *Attorney, Agent, or Firm*—Akin, Gump, Strauss, Hauer & Feld, L.L.P.

(57) ABSTRACT

In a brushless motor control method and a brushless motor controller in accordance with the present invention, a rotor rotation position detection means detects the time of the intersection of a detected induced voltage and an induced voltage reference value. In addition, a motor speed calculation means calculates the rotation speed of a brushless motor on the basis of the interval of the intersection times detected by the rotor rotation position detection means. Furthermore, a speed control means outputs a duty factor index on the basis of the deviation between the command speed and the rotation speed of the brushless motor. Still further, a switching signal generation means outputs switching signals to groups of switching devices on the basis of the rotation speed and the duty factor index at the time of the intersection.

25 Claims, 40 Drawing Sheets

FIG. 7

| Motor speed [rpm] | Reference value setting amount [V] |
|---|---|
| 0 | 0 |
| 500 | V1 |
| 1000 | V2 |
| 2000 | V3 |
| 3000 | V4 |
| 4000 | V5 |
| 5000 | V6 |
| 6000 | V7 |

FIG. 8

| Motor speed [rpm] \ Energization rate index [%] | 0 | 10 | 20 | 30 | 40 | 50 | 60 | 70 | 80 | 90 | 100 |
|---|---|---|---|---|---|---|---|---|---|---|---|
| 0 | 0 | 0 | 0 | 0 | 0 | 0 | 0 | 0 | 0 | 0 | 0 |
| 500 | 0 | V10 | V11 | V12 | V13 | V14 | V15 | V16 | V17 | V18 | V19 |
| 1000 | 0 | V20 | V21 | V22 | V23 | V24 | V25 | V26 | V27 | V28 | V29 |
| 2000 | 0 | V30 | V31 | V32 | V33 | V34 | V35 | V36 | V37 | V38 | V39 |
| 3000 | 0 | V40 | V41 | V42 | V43 | V44 | V45 | V46 | V47 | V48 | V49 |
| 4000 | 0 | V50 | V51 | V52 | V53 | V54 | V55 | B56 | V57 | V58 | V59 |
| 5000 | 0 | V60 | V61 | V62 | V63 | V64 | V65 | V66 | V67 | V68 | V69 |
| 6000 | 0 | V70 | V71 | V72 | V73 | V74 | V75 | V76 | V77 | V78 | V79 |

FIG. 9

| Motor speed [rpm] | Induced voltage change rate [deg/V] |
|---|---|
| 0 | 0 |
| 500 | SLP1 |
| 1000 | SLP2 |
| 2000 | SLP3 |
| 3000 | SLP4 |
| 4000 | SLP5 |
| 5000 | SLP6 |
| 6000 | SLP7 |

FIG. 19

| Motor speed [rpm] \ Temperature [°C] | −20 | 0 | 20 | 40 | 60 | 80 | 100 | 120 |
|---|---|---|---|---|---|---|---|---|
| 500 | SLP10 | SLP11 | SLP12 | SLP13 | SLP14 | SLP15 | SLP16 | SLP17 |
| 1000 | SLP20 | SLP21 | SLP22 | SLP23 | SLP24 | SLP25 | SLP26 | SLP27 |
| 2000 | SLP30 | SLP31 | SLP32 | SLP33 | SLP34 | SLP35 | SLP36 | SLP37 |
| 3000 | SLP40 | SLP41 | SLP42 | SLP43 | SLP44 | SLP45 | SLP46 | SLP47 |
| 4000 | SLP50 | SLP51 | SLP52 | SLP53 | SLP54 | SLP55 | SLP56 | SLP57 |
| 5000 | SLP60 | SLP61 | SLP62 | SLP63 | SLP64 | SLP65 | SLP66 | SLP67 |
| 6000 | SLP70 | SLP71 | SLP72 | SLP73 | SLP74 | SLP75 | SLP76 | SLP77 |

FIG. 22

| Motor speed [rpm] \ Temperature [°C] | -20 | 0 | 20 | 40 | 60 | 80 | 100 | 120 |
|---|---|---|---|---|---|---|---|---|
| 500 | V10 | V11 | V12 | V13 | V14 | V15 | V16 | V17 |
| 1000 | V20 | V21 | V22 | V23 | V24 | V25 | V26 | V27 |
| 2000 | V30 | V31 | V32 | V33 | V34 | V35 | V36 | V37 |
| 3000 | V40 | V41 | V42 | V43 | V44 | V45 | B46 | V47 |
| 4000 | V50 | V51 | V52 | V53 | V54 | V55 | B56 | V57 |
| 5000 | V60 | V61 | V62 | V63 | V64 | V65 | V66 | V67 |
| 6000 | V70 | V71 | V72 | V73 | V74 | V75 | V76 | V77 |

FIG. 29

| Motor speed [rpm] | Duty factor correction rate [%] |
|---|---|
| 0 | 0 |
| 500 | Δd1 |
| 1000 | Δd2 |
| 2000 | Δd3 |
| 3000 | Δd4 |
| 4000 | Δd5 |
| 5000 | Δd6 |
| 6000 | Δd7 |

FIG. 30

A : Motor speed (rpm)
B : Duty factor index (%)

| B \ A | 0 | 1000 | 2000 | 3000 | ... |
|---|---|---|---|---|---|
| 0 | $\Delta d_{00}$ | $\Delta d_{01}$ | $\Delta d_{02}$ | $\Delta d_{03}$ | ............ |
| 10 | $\Delta d_{10}$ | $\Delta d_{11}$ | $\Delta d_{12}$ | $\Delta d_{13}$ | ............ |
| 20 | $\Delta d_{20}$ | $\Delta d_{21}$ | $\Delta d_{22}$ | $\Delta d_{23}$ | ............ |
| 30 | $\Delta d_{30}$ | $\Delta d_{31}$ | $\Delta d_{32}$ | $\Delta d_{33}$ | ............ |
| ... | ⋮ | ⋮ | ⋮ | ⋮ | |

US 6,879,129 B2

BRUSHLESS MOTOR CONTROL METHOD AND CONTROLLER

BACKGROUND OF THE INVENTION

The present invention relates to a brushless motor control method and a brushless motor controller. More particularly, it relates to the so-called sensorless controller that detects the rotation position of the rotor of a brushless motor without using magnetic detecting means, such as Hall devices.

A conventional technology for the so-called sensorless controller, wherein the rotation position of the rotor of a brushless motor is detected without using magnetic detecting means, such as Hall devices, is disclosed in Japanese Laid-open Patent Application No. Hei 7-123773 in particular.

A conventional brushless motor controller will be described below.

FIG. 38 is a block diagram showing a system configuration of a conventional brushless motor controller. In FIG. 38, a brushless motor 101 is provided with a stator 102 wherein current-flowing phase windings 121u, 121v and 121w are wound on a stator core (not shown), and a rotor 103 having magnets. The phase windings 121u, 121v and 121w are connected to a switching circuit 104, and voltages applied to the phase windings 121u, 121v and 121w are controlled. A voltage is supplied to this switching circuit 104 from a DC voltage source 105.

In the switching circuit 104, two switching devices disposed on the upstream and downstream sides of the current-flowing direction are connected in series, and this series circuit is provided for one phase. Hence, three series circuits are available for U, V and W phases. As shown in FIG. 38, the series circuit for the U phase has an upstream-side switching device 141u and a downstream-side switching device 142u. The series circuit for the V phase has an upstream-side switching device 141v and a downstream-side switching device 142v. The series circuit for the W phase has an upstream-side switching device 141w and a downstream-side switching device 142w.

In addition, in the switching circuit 104, diodes 143u, 144u, 143v, 144v, 143w and 144w are connected in parallel with the switching devices 141u, 142u, 141v, 142v, 141w and 142w, respectively, in opposite directions.

The phase winding 121u of the brushless motor 101 is connected to the connection point of the U-phase switching devices 141u and 142u of the switching circuit 104. Similarly, the phase winding 121v of the brushless motor 101 is connected to the connection point of the V-phase switching devices 141v and 142v, and the phase winding 121w of the brushless motor 101 is connected to the connection point of the W-phase switching devices 141w and 142w.

A selector 106 selects one nonenergized phase from among the three-phase windings depending on the switching state of the switching circuit 104, and an A/D converter 107 converts the analog value of the terminal voltage of the selected phase into a digital value. A control section 108 determines the change rate and commutation time of a detected voltage and outputs a driver signal to a driver 109. The switching devices 141u, 142u, 141v, 142v, 141w and 142w of the switching circuit 104 are controlled by the driver 109.

Next, a control method for the conventional brushless motor controller configured as described above will be described below. FIG. 39 shows the terminal voltages and a processed waveform when the brushless motor 101 is driven by the conventional controller in accordance with 120-degree switching, each winding of the stator 102 is energized and controlled at ideal commutation timing, and the brushless motor 101 rotates at a constant speed.

The part (a) of FIG. 39 shows a terminal voltage waveform generating in the U phase. In addition, the part (b) of FIG. 39 shows a terminal voltage waveform generating in the V phase. The part (c) of FIG. 39 shows a terminal voltage waveform generating in the W phase. Furthermore, the part (d) of FIG. 39 shows a processed waveform. The processed waveform is obtained by detecting the terminal voltage of a nonenergized phase in synchronization with a PWM signal at points wherein the detection is possible. At points wherein the detection is impossible, the processed waveform is obtained by carrying out extrapolation on the basis of a change amount with respect to a detection time.

An actual method of obtaining the waveform shown in the part (d) of FIG. 39 will be described below. In the waveforms shown in the parts (a) to (c) of FIG. 39, effective induced voltage information has discrete values, such as the values at points A and B, detected in synchronization with the PWM signal in a period designated by Ts. Hence, for example, induced voltage information in a period Tx shown in FIG. 39 cannot be detected. To solve this problem, the change rate of the induced voltage information with respect to time is obtained at two or more points, such as the points A and B, wherein the detection is possible. This change rate is used to estimate how the induced voltage changes in the period Tx. This kind of extrapolation process is carried out, and the signals for the three phases are connected, thereby obtaining the processed waveform shown in part (d) of FIG. 39.

Next, a method of determining commutation timing in the conventional brushless motor controller will be described below.

In the processed waveform shown in the part (d) of FIG. 39, commutation times are assumed to be flection points, such as times t1 and t2, at which the estimated induced voltages of phases adjacent to each other intersect. These flection points are ideal commutation times for the motor (a state wherein the maximum output can be delivered). If the estimated induced voltages of phases adjacent to each other have a deviation, it is judged that the position of the rotor is not ideal, and the commutation timing is corrected so that the deviation disappears.

As described above, the conventional brushless motor controller drives the brushless motor while estimating the position of the rotor.

However, the controller disclosed in Japanese Laid-open Patent Application No. Hei 7-123773 requires two or more values to obtain the change rate of the induced voltage with respect to time. Hence, the number of detections of the induced voltage changes greatly depending on the rotation speed of the motor. As the speed becomes higher, the number of detections of the induced voltage decreases significantly. Hence, when the speed becomes a value wherein two or more induced voltage values cannot be detected, the change rate of the induced voltage with respect to time cannot be obtained, whereby the motor stops, resulting in a problem.

As a method of solving this kind of problem, a brushless motor driving method is disclosed in Japanese Laid-open Patent Application No. Hei 9-154294.

This conventional technology disclosed in Japanese Laid-open Patent Application No. Hei 9-154294 basically uses the same control method as that of the above-mentioned technology (disclosed in Japanese Laid-open Patent Application No. Hei 7-123773) to drive brushless motors. However, in the conventional technology disclosed in Japanese Laid-open Patent Application No. Hei 9-154294, brushless motor control is carried out by using one induced voltage detection value.

A back emf (electric magnet force) V0 is proportional to the rotation speed N of the motor in accordance with the principle of the motor and is represented by the following equation (1) using a back emf (electric magnet force) constant Ke.

$$V0 = Ke \times N \tag{1}$$

Since the induced voltage is proportional to the back emf, the change amount of the voltage in a unit time is also proportional to the rotation speed N of the motor. The change rate ($\Delta v/\Delta t$) of the induced voltage with respect to time is calculated by the following equation (2).

$$\Delta v/\Delta t = \alpha \times N \tag{2}$$

In the equation (2), $\alpha$ designates a constant inherent in the motor, representing the change rate of the induced voltage with respect to the rotation speed N of the motor. The graph of FIG. 40 shows that the induced voltage is detected during motor driving, and that the change amount of the detected voltage is converted into the change amount of the voltage in a unit time. Therefore, in the case when two or more induced voltage values can be detected, the change amount of the induced voltage with respect to the rotation speed of the motor is calculated. When the number of detections of the induced voltage decreases, the change rate of the induced voltage with respect to the rotation speed of the motor is calculated and used for control. As an actual calculation method, extrapolation is carried out by approximating portions other than two points on the graph of FIG. 40 using a linear function.

In this case, the above-mentioned control method can drive the brushless motor by using extrapolation values obtained from even one induced voltage value that is detected.

As described above, when two or more induced voltage values cannot be detected in principle in the conventional technology disclosed in Japanese Laid-open Patent Application No. Hei 7-123773, the change rate of the induced voltage with respect to the detection time cannot be calculated. Therefore, no commutation time can be determined, whereby the motor stops, resulting in a problem. Furthermore, in the control method of this conventional technology, the time when the estimated induced voltages of phases adjacent to each other intersect is assumed to be commutation timing. However, this control method is applicable only to a surface magnet brushless motor. In the case of an embedded magnet brushless motor, it is known that higher efficiency is obtained by carrying out commutation at a time earlier than the time when the estimated induced voltages of phases adjacent to each other intersect.

When two or more induced voltage values cannot be detected in the conventional technology disclosed in Japanese Laid-open Patent Application No. Hei 9-154294, the change rate of the induced voltage with respect to time is calculated as a value proportional to the rotation speed of the motor in accordance with the above-mentioned equation (2). This control method of Japanese Laid-open Patent Application No. Hei 9-154294 is applicable to only a surface magnet brushless motor, just as in the case of the control method of Japanese Laid-open Patent Application No. Hei 7-123773. In the case when the brushless motor is an embedded magnet brushless motor, the equation (2) is not established. This is because the detected induced voltage of the embedded magnet brushless motor includes a reluctance component due to a motor current.

BRIEF SUMMARY OF THE INVENTION

Accordingly, the present invention is intended to solve the problems encountered in the above-mentioned conventional technologies and to provide a brushless motor controller capable of accurately detecting the rotation position of the rotor of a given brushless motor even when only one induced voltage value is detected, without using magnetic detection means, such as Hall devices, for detecting the rotation position of the rotor.

In order to attain the above-mentioned objects, a brushless motor control method in accordance with the present invention is a brushless motor control method for controlling a brushless motor provided with a stator having a number of windings and a rotor having a number of magnetic poles, comprising:

a step of detecting a supplied DC voltage, a step of detecting an induced voltage appearing at the terminal of an OFF phase, a step of generating an induced voltage reference value depending on the operation state of the brushless motor, a step of generating an induced voltage change rate depending on the operation state of the brushless motor, a step of detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, a step of calculating the rotation speed of the brushless motor on the basis of the time interval of the detected intersection time values, a step of outputting a duty factor index on the basis of the deviation between the command speed and the rotation speed of the brushless motor, and a step of driving the brushless motor on the basis of the detected intersection time, the rotation speed and the duty factor index. Hence, in the present invention, the rotation position of the rotor can be detected accurately even when only one induced voltage value is detected, without using magnetic detection means, such as Hall devices, for detecting the rotation position of the rotor.

A brushless motor control method in accordance with another aspect of the present invention is a brushless motor control method for controlling a brushless motor provided with a stator having a number of windings and a rotor having a number of magnetic poles, comprising:

a step of detecting a supplied DC voltage, a step of detecting an induced voltage appearing at the terminal of an OFF phase, a step of generating an induced voltage reference value depending on the operation state of the brushless motor, a step of renewing an induced voltage change rate generation table on the basis of the change rate of the induced voltage detected at least at two points, a step of generating the change rate of the induced voltage depending on the operation state of the brushless motor on the basis of a renewed induced voltage change rate generation table, a step of detecting the intersection time of the intersection of the detected induced voltage and the induced voltage reference value on the basis of the detected induced voltage and the induced voltage reference value, or calculating the intersection time on the basis of the detected induced voltage, the induced voltage reference value and the induced voltage change rate, a step of calculating the rotation speed of the brushless motor on the basis of the time interval of the detected intersection time values, a step of outputting a duty factor index on the basis of the deviation between the command speed and the rotation speed of the brushless motor, and a step of driving the brushless motor on the basis of the detected intersection time, the rotation speed and the duty factor index. Hence, in the present invention, the rotation position of the rotor can be detected accurately even when only one induced voltage value is detected, without using magnetic detection means, such as Hall devices, for detecting the rotation position of the rotor.

A brushless motor control method in accordance with another aspect of the present invention is a brushless motor control method for controlling a brushless motor provided with a stator having a number of windings and a rotor having a number of magnetic poles, comprising:

a step of detecting a supplied DC voltage, a step of detecting an induced voltage appearing at the terminal of an OFF phase, a step of renewing an induced voltage reference value generation table on the basis of the change rate of the induced voltage detected at least at two points, a step of generating an induced voltage reference value depending on the operation state of the brushless motor on the basis of the renewed induced voltage reference value generation table, a step of generating an induced voltage change rate depending on the operation state of the brushless motor, a step of correcting the induced voltage reference value on the basis of the change rate of the induced voltage detected at least at two points, a step of detecting the intersection time of the intersection of the detected induced voltage and the induced voltage reference value on the basis of the detected induced voltage and the induced voltage reference value, or calculating the intersection time on the basis of the detected induced voltage, the induced voltage reference value and the induced voltage change rate, a step of calculating the rotation speed of the brushless motor on the basis of the time interval of the detected intersection time, a step of outputting a duty factor index on the basis of the deviation between the command speed and the rotation speed of the brushless motor, and a step of driving the brushless motor on the basis of the detected intersection time, the rotation speed and the duty factor index. Hence, in the present invention, the rotation position of the rotor can be detected accurately even when only one induced voltage value is detected, without using magnetic detection means, such as Hall devices, for detecting the rotation position of the rotor.

A brushless motor control method in accordance with another aspect of the present invention is a brushless motor control method for controlling a brushless motor provided with a stator having a number of windings and a rotor having a number of magnetic poles, comprising:

a step of detecting a supplied DC voltage, a step of detecting an induced voltage appearing at the terminal of an OFF phase, a step of generating an induced voltage reference value depending on the operation state of the brushless motor, a step of generating an induced voltage change rate depending on the operation state of the brushless motor, a step of detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, a step of calculating the rotation speed of the brushless motor on the basis of the time interval of the detected intersection time, a step of changing the induced voltage reference value so that the phase of the current with respect to the induced voltage advances at the time when the rotation speed has a predetermined value or more or when it is detected that the duty factor index is a predetermined value or more, and a step of driving the brushless motor on the basis of the detected intersection time, the rotation speed and the duty factor index. Hence, in the present invention, the rotation position of the rotor can be detected accurately even when only one induced voltage value is detected, without using magnetic detection means, such as Hall devices, for detecting the rotation position of the rotor. In addition, in the present invention, the induced voltage reference value is changed so that the phase of the current with respect to the induced voltage advances at the time when the rotation speed has a predetermined value or more or when it is detected that the duty factor index is a predetermined value or more. As a result, weak field control is carried out, whereby the range of operation can be extended.

A brushless motor control method in accordance with another aspect of the present invention is a brushless motor control method for controlling a brushless motor provided with a stator having a number of windings and a rotor having a number of magnetic poles, comprising:

a step of detecting a supplied DC voltage, a step of detecting an induced voltage appearing at the terminal of an OFF phase, a step of generating an induced voltage reference value depending on the operation state of the brushless motor, a step of generating an induced voltage change rate depending on the operation state of the brushless motor, a step of detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, a step of calculating the rotation speed of the brushless motor on the basis of the time interval of the detected intersection time values, a step of generating the duty pattern of a duty factor in an energization period so that the average of duty factors in a predetermined time from the start of the energization period becomes larger than the average of duty factors in a predetermined time to the end of the energization period, and a step of driving the brushless motor on the basis of the detected intersection time, the rotation speed, the duty factor index and the duty pattern. Hence, in the present invention, the rotation position of the rotor can be detected accurately even when only one induced voltage value is detected, without using magnetic detection means, such as Hall devices, for detecting the rotation position of the rotor. In addition, as another feature of the present invention, the duty pattern is generated so that the average of duty factors in a predetermined time from the start of the energization period becomes larger than the average of duty factors in a predetermined time to the end of the energization period. Therefore, the waveform of the current supplied to a phase winding of the brushless motor becomes closer to a sine wave, whereby highly efficient low-vibration low-noise operation can be attained.

A brushless motor controller in accordance with the present invention is a brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of the switching circuit, induced voltage detection means for detecting an induced voltage appearing at the terminal of each phase winding connected to the connection point of the two switching devices of the series circuit in a period when both the switching devices in one of the series circuits of the switching circuit are OFF simultaneously, induced voltage reference value generation means for generating an induced voltage reference value depending on the operation state of the brushless motor, induced voltage change rate generation means for outputting the change rate of the induced voltage depending on the operation state of the brushless motor, rotor rotation position detection means for detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, motor speed calculation means for calculating the rotation speed of the brushless motor on the basis of the time interval of the intersection time values detected by the rotor rotation position detection means, speed control means for outputting a duty factor index on the basis of the deviation between the command speed and the rotation speed of the brushless motor, and first switching signal generation means for outputting switching signals to the number of the switching devices on the basis of the intersection time detected by the rotor rotation position detection means, the rotation speed and the duty factor index. Hence, in the present invention, the rotation position of the rotor can be detected accurately even when only one induced voltage value is detected, without using magnetic detection means, such as Hall devices, for detecting the rotation position of the rotor.

A brushless motor controller in accordance with another aspect of the present invention is a brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of the switching circuit, induced voltage detection means for detecting an induced voltage appearing at the terminal of each phase winding connected to the connection point of the two switching devices of the series circuit in a period when both the switching devices in one of the series circuits of the switching circuit are OFF simultaneously, induced voltage reference value generation means for generating an induced voltage reference value depending on the operation state of the brushless motor, induced voltage change rate correction means for renewing an induced voltage change rate generation table on the basis of the change rate of the induced voltage detected at least at two points, induced voltage change rate generation means for generating the change rate of the induced voltage depending on the operation state of the brushless motor on the basis of a renewed induced voltage change rate generation table, rotor rotation position detection means for detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, motor speed calculation means for calculating the rotation speed of the brushless motor on the basis of the time interval of the intersection time values detected by the rotor rotation position detection means, speed control means for outputting a duty factor index on the basis of the deviation between the command speed and the rotation speed of the brushless motor, and first switching signal generation means for outputting switching signals to the number of the switching devices on the basis of the intersection time detected by the rotor rotation position detection means, the rotation speed and the duty factor index. Hence, in the present invention, the rotation position of the rotor can be detected accurately even when only one induced voltage value is detected, without using magnetic detection means, such as Hall devices, for detecting the rotation position of the rotor.

A brushless motor controller in accordance with another aspect of the present invention is a brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of the switching circuit, induced voltage detection means for detecting an induced voltage appearing at the terminal of each phase winding connected to the connection point of the two switching devices of the series circuit in a period when both the switching devices in one of the series circuits of the switching circuit are OFF simultaneously, induced voltage reference value correction means for renewing an induced voltage reference value generation table on the basis of the change rate of the induced voltage detected at least at two points, induced voltage reference value generation means for generating the reference value of the induced voltage depending on the operation state of the brushless motor on the basis of a renewed induced voltage reference value generation table, induced voltage change rate generation means for outputting the change rate of the induced voltage depending on the operation state of the brushless motor, rotor rotation position detection means for detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, motor speed calculation means for calculating the rotation speed of the brushless motor on the basis of the time interval of the intersection time values detected by the rotor rotation position detection means, speed control means for outputting a duty factor index on the basis of the deviation between the command speed and the rotation speed of the brushless motor, and first switching signal generation means for outputting switching signals to the number of the switching devices on the basis of the intersection time detected by the rotor rotation position detection means, the rotation speed and the duty factor index. Hence, in the present invention, the rotation position of the rotor can be detected accurately even when only one induced voltage value is detected, without using magnetic detection means, such as Hall devices, for detecting the rotation position of the rotor.

A brushless motor controller in accordance with another aspect of the present invention is a brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of the switching circuit, induced voltage detection means for detecting an induced voltage appearing at the terminal of each phase winding connected to the connection point of the two switching devices of the series circuit in a period when both the switching devices in one of the series circuits of the switching circuit are OFF simultaneously, induced voltage reference value generation means for generating an induced voltage reference value depending on the operation state of the brushless motor, induced voltage change rate generation means for outputting the change rate of the induced voltage depending on the operation state of the brushless motor, rotor rotation position detection means for detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, motor speed calculation means for calculating the rotation speed of the brushless motor on the basis of the time interval of the intersection time values detected by the rotor rotation position detection means, speed control means for outputting a duty factor index on the basis of the deviation between the command speed and the rotation speed of the brushless motor, current phase adjustment means for changing the induced voltage reference value so that the phase of the current with respect to the induced voltage advances at the time when the rotation speed has a predetermined value or more or when it is detected that the duty factor index is a predetermined value or more, and first switching signal generation means for outputting switching signals to the number of the switching devices on the basis of the intersection time detected by the rotor rotation position detection means, the rotation speed and the duty factor index. Hence, in the present invention, the rotation position of the rotor can be detected accurately even when only one induced voltage value is detected, without using magnetic detection means, such as Hall devices, for detecting the rotation position of the rotor. In addition, in the present invention, the induced voltage reference value is changed so that the phase of the current with respect to the induced voltage advances at the time when the rotation speed has a predetermined value or more or when it is detected that the duty factor index is a predetermined value or more. As a result, weak field control is carried out, whereby the range of operation can be extended.

A brushless motor controller in accordance with another aspect of the present invention is a brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of the switching circuit, induced voltage detection means for detecting an induced voltage appearing at the terminal of each phase winding connected to the connection point of the two switching devices of the series circuit in a period when both the switching devices in one of the series circuits of the switching circuit are OFF simultaneously, induced voltage reference value generation means for generating an induced voltage reference value depending on the operation state of the brushless motor, induced voltage change rate generation means for outputting the change rate of the induced voltage depending on the operation state of the brushless motor, rotor rotation position detection means for detecting the intersection time of the intersection of a detected induced voltage and the induced voltage reference value on the basis of the detected induced voltage and the induced voltage reference value, or calculating the intersection time on the basis of the detected induced voltage, the induced voltage reference value and the induced voltage change rate, motor speed calculation means for calculating the rotation speed of the brushless motor on the basis of the time interval of the intersection time values detected by the rotor rotation position detection means, speed control means for outputting a duty factor index on the basis of the deviation between the command speed and the rotation speed of the brushless motor, duty pattern generation means for generating the duty pattern of a duty factor in an energization period so that the average of duty factors in a predetermined time from the start of the energization period becomes larger than the average of duty factors in a predetermined time to the end of the energization period, and second switching signal generation means for outputting switching signals to the number of the switching devices on the basis of the intersection time detected by the rotor rotation position detection means, the rotation speed, the duty factor index and the duty pattern. Hence, in the present invention, the rotation position of the rotor can be detected accurately even when only one induced voltage value is detected, without using magnetic detection means, such as Hall devices, for detecting the rotation position of the rotor.

In addition, as another feature of the present invention, the duty pattern is generated so that the average of duty factors in a predetermined time from the start of the energization period becomes larger than the average of duty factors in a predetermined time to the end of the energization period. Therefore, the waveform of the current supplied to a phase winding of the brushless motor becomes closer to a sine wave, and the brushless motor can be operated with highly efficient, low-vibration, and low-noise.

Furthermore, as another feature of the present invention, even when the time of the intersection of the detected induced voltage and the induced voltage reference value cannot be detected, the time of the intersection can be obtained, whereby the rotation position of the rotor can be detected securely.

Still further, as another feature of the present invention, the time of the intersection can be detected without any detection delay, whereby the rotation position of the rotor can be detected securely, and the fluctuations in the current waveform can be reduced.

Still further, as another feature of the present invention, even when the motor parameters change owing to temperature or the like, the table values are corrected on the basis of the change rate of the detected induced voltage, two or more values of which can be detected. Therefore, the rotation position of the rotor can be detected accurately at all times.

Still further, as another feature of the present invention, a transient change to the induced voltage value effective for the detection of the rotation position of the rotor after the end of reflux can be neglected securely. As a result, the rotation position of the rotor can be detected accurately at all times.

Still further, as another feature of the present invention, when it is judged that the time of the intersection of the detected induced voltage and the induced voltage reference value cannot be detected, the energization of the OFF phase starts immediately. Hence, the selection of the voltage application state can be carried out securely.

Apparatuses having excellent performance can be provided by using the brushless motor control method and controller in accordance with the present invention for apparatuses comprising brushless motors, such as compressors, fans and pumps. The apparatuses can perform low-vibration low-noise operation at high efficiency.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 7 is a table generated by an induced voltage reference value generation circuit on the basis of a motor speed in accordance with Embodiment 1;

FIG. 8 is a table generated by the induced voltage reference value generation circuit on the basis of the motor speed and duty factor index in accordance with Embodiment 1;

FIG. 9 is a table generated by an induced voltage change rate generation circuit on the basis of the motor speed in accordance with Embodiment 1;

FIG. 19 is a table of the induced voltage change rate with respect to a change in temperature in accordance with Embodiment 4;

FIG. 22 is a table for obtaining the table values of the induced voltage reference value generation circuit with respect to a change in temperature in accordance with Embodiment 5;

FIG. 29 shows a duty factor correction rate table on the basis of the motor speed in accordance with Embodiment 7;

FIG. 30 shows a duty factor correction rate table on the basis of the motor speed and the duty factor index in accordance with Embodiment 7;

It will be recognized that some or all of the figures are schematic representations for purposes of illustration and do not necessarily depict the actual relative sizes or locations of the elements shown.

DETAILED DESCRIPTION OF THE INVENTION

Preferable embodiments of a brushless motor control method and a brushless motor controller in accordance with the present invention will be described below referring to the accompanying drawings.

Embodiment 1

Figure 1:
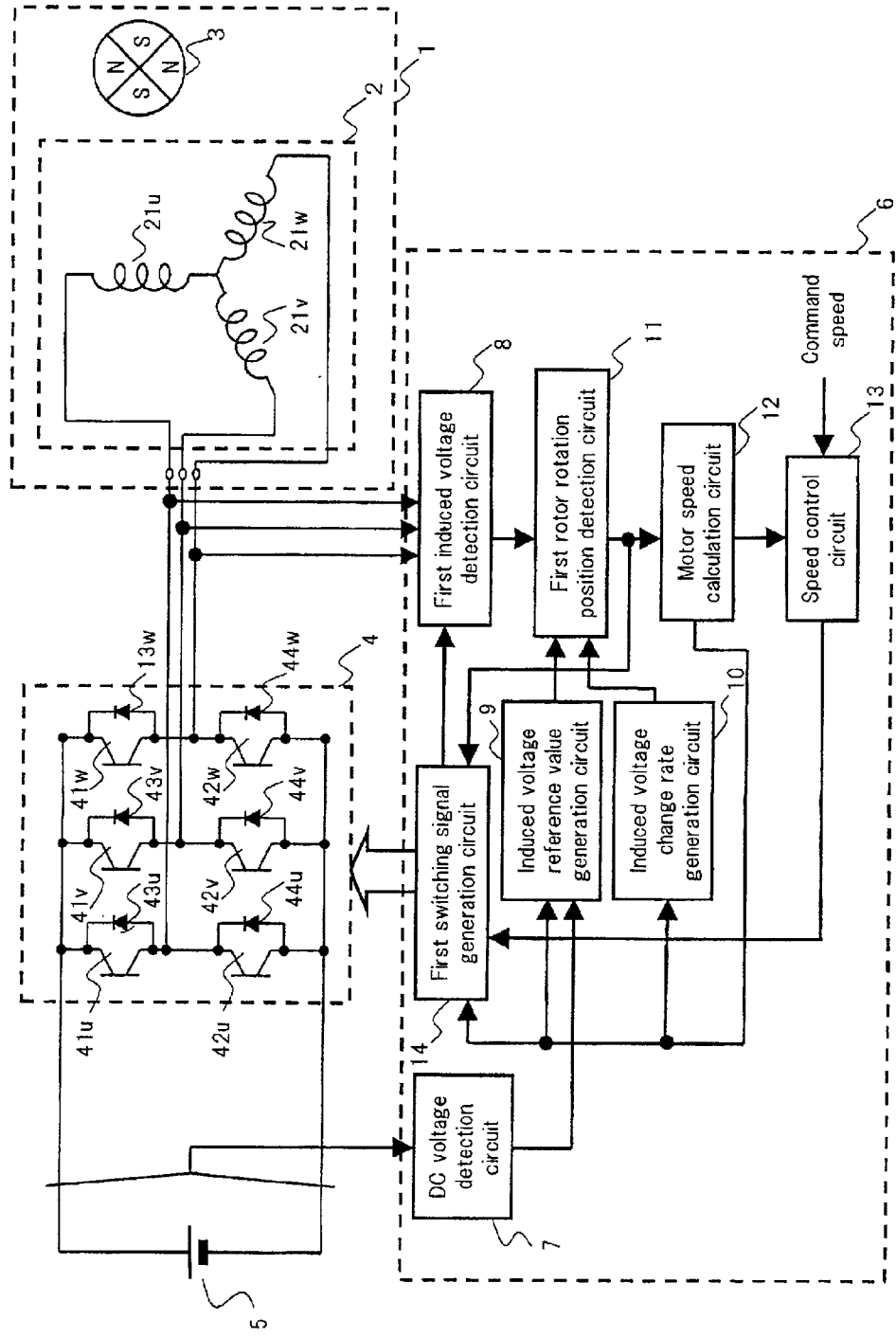
FIG. 1 is a block diagram showing a configuration of a brushless motor controller in accordance with Embodiment 1 of the present invention.

FIG. 1 is a block diagram showing a system configuration of a brushless motor controller in accordance with Embodiment 1 of the present invention.

In FIG. 1, a brushless motor 1 is provided with a stator 2 wherein current-flowing phase windings 21$u$, 21$v$ and 21$w$ are wound on a stator core (not shown), and a rotor 3 having magnets. The phase windings 21u, 21v and 21w are connected to a switching circuit 4, and voltages applied to the phase windings 21u, 21v and 21w are controlled. A DC voltage is supplied to this switching circuit 4 from a DC power source 5.

In the switching circuit 4, two switching devices disposed on the upstream and downstream sides of the current-flowing direction are connected in series, and this series circuit is provided for one phase. Hence, three series circuits are available for U, V and W phases. As shown in FIG. 1, the series circuit for the U phase has an upstream-side switching device 41u and a downstream-side switching device 42u. The series circuit for the V phase has an upstream-side switching device 41v and a downstream-side switching device 42v. The series circuit for the W phase has an upstream-side switching device 41w and a downstream-side switching device 42w.

In addition, in the switching circuit 4, diodes 43u, 44u, 43v, 44v, 43w and 44w are connected in parallel with the switching devices 41u, 42u, 41v, 42v, 41w and 42w, respectively, in opposite directions.

The phase winding 21u of the brushless motor 1 is connected to the connection point of the U-phase upstream-side switching device 41u and the U-phase downstream-side switching device 42u of the switching circuit 4. Similarly, the phase winding 21v of the brushless motor 1 is connected to the connection point of the V-phase upstream-side switching device 41v and the V-phase downstream-side switching device 42v, and the phase winding 21w of the brushless motor 1 is connected to the connection point of the W-phase upstream-side switching device 41w and the W-phase downstream-side switching device 42w.

A control section 6 comprises a microcomputer. The microcomputer includes a DC voltage detection circuit 7 having a function of directly sampling the DC voltage supplied from the DC power source 5 and a first induced voltage detection circuit 8 having a function of directly sampling induced voltages generating at the phase windings 21u, 21v and 21w of the brushless motor 1. The microcomputer further includes an induced voltage reference value generation circuit 9 having a function of generating the reference value of the induced voltages, an induced voltage change rate generation circuit 10 having a function of generating an induced voltage change rate and a first rotor rotation position detection circuit 11 having a function of obtaining the rotation position of the rotor by using the detected induced voltages and the reference value of the induced voltages. The microcomputer still further includes a motor speed calculation circuit 12 having a function of obtaining the speed of the motor depending on the change of the rotation position of the rotor with respect to time and a speed control circuit 13 having a function of obtaining the duty factor index of an applied voltage depending on the deviation between a command speed and the obtained motor speed. The microcomputer additionally includes a first switching signal generation circuit 14 having a function of generating switching signals for the switching circuit 4 on the basis of the rotation position of the rotor, the motor speed and the duty factor index and then outputting the switching signals to the switching devices of the switching circuit 4.

The switching devices 41u, 42u, 41v, 42v, 41w and 42w of the switching circuit 4 are controlled by the first switching signal generation circuit 14 of the control section 6.

Next, the operations of the respective components of the brushless motor controller in accordance with Embodiment 1 configured as described above will be described below in detail.

The operation of the first switching signal generation circuit 14 of the control section 6 will be described first.

The first switching signal generation circuit 14 outputs ON or OFF command signals to the switching devices 41u, 42u, 41v, 42v, 41w and 42w of the switching circuit 4, thereby controlling voltages applied to the phase windings 21u, 21v and 21w.

Figure 2:
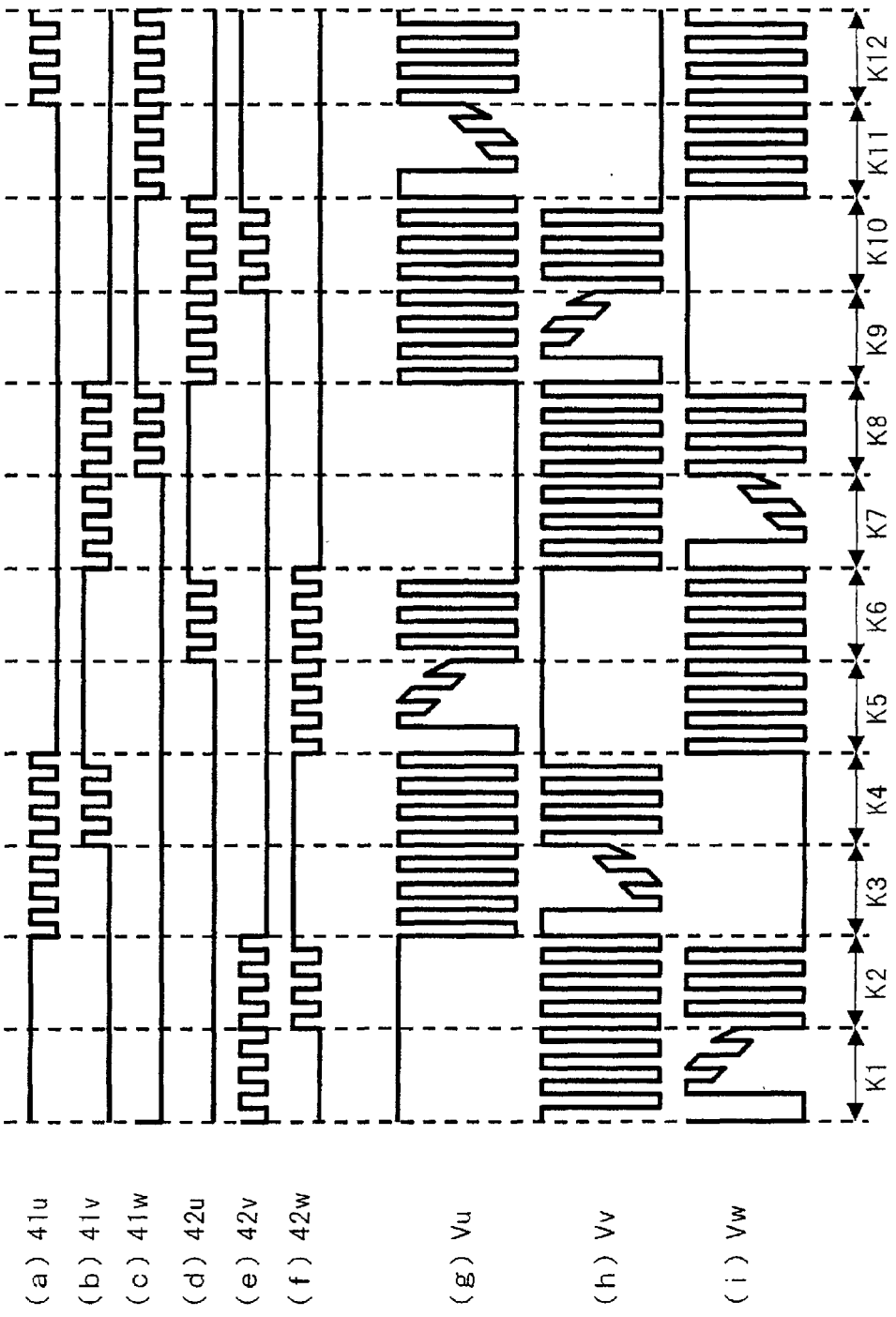
FIG. 2 is a view showing waveforms indicating the ON/OFF timing of each switching device and also showing the waveform of the terminal voltage of each phase in accordance with Embodiment 1.

FIG. 2 is a waveform graph showing the waveforms of signals indicating the operation timing of the switching devices 41u, 42u, 41v, 42v, 41w and 42w of the switching circuit 4. FIG. 2 also shows the waveforms of voltages (Vu, Vv, Vw) applied to the phase windings 21u, 21v and 21w. The parts (a) to (f) of FIG. 2 show the waveforms of the ON/OFF command signals for the switching devices 41u, 42u, 41v, 42v, 41w and 42w. In the parts (a) to (f) of FIG. 2, "high level" portions indicate ON commands and "low level" portions indicate OFF commands.

As shown in FIG. 2, in a period K1, the U-phase upstream-side switching device 41u is ON and the downstream-side switching device 42u is OFF. Similarly, in the period K1, the W-phase upstream-side switching device 41w, the W-phase downstream-side switching device 42w and the V-phase upstream-side switching device 41v are OFF. However, in this period K1, the V-phase downstream-side switching device 42v repeats ON/OFF switching in accordance with pulse width modulation (PWM). As a result, the U-phase upstream-side switching device 41u and the V-phase downstream-side switching device 42v become ON, and a current flows from the U-phase winding 21u to the V-phase winding 21v of the stator 2.

Next, in a period K2, the U-phase upstream-side switching device 41u is ON, and the V-phase downstream-side switching device 42v and the W-phase downstream-side switching device 42w repeat ON/OFF switching. At this time, the other switching devices 41v, 41w and 42u are OFF. As a result, the U-phase upstream-side switching device 41u, the V-phase downstream-side switching device 42v and the W-phase downstream-side switching device 42w become ON, and currents flow from the U-phase winding 21u to the V-phase winding 21v and the W-phase winding 21w of the stator 2.

Similarly, in a period K3, a current flows from the U-phase winding 21u to the W-phase winding 21w of the stator 2, and in a period K4, currents flow from the U-phase winding 21u and the V-phase winding 21v to the W-phase winding 21w. Furthermore, in a period K5, a current flows from the V-phase winding 21v to the W-phase winding 21w, and in a period K6, currents flow from the V-phase winding 21v to the U-phase winding 21u and the W-phase winding 21w.

Still further, in a period K7, a current flows from the V-phase winding 21v to the U-phase winding 21u. In a period K8, currents flow from the V-phase winding 21v and the W-phase winding 21w to the U-phase winding 21u. In a period K9, a current flows from the W-phase winding 21w to the U-phase winding 21u. In a period K10, currents flow from the W-phase winding 21w to the U-phase winding 21u and the V-phase winding 21v. In a period K11, a current flows from the W-phase winding 21w to the V-phase winding 21v. In a period K12, currents flow from the U-phase winding 21u and the W-phase winding 21w to the V-phase winding 21v.

In actual practice, however, immediately after transition to the periods K1, K3, K5, K7, K9 and K11, a current flows through each of the diodes 43u, 43v, 43w, 44u, 44v and 44w for a short time. The flow of the current is not described herein.

In Embodiment 1, the value of the duty factor index, i.e., the output of the speed control circuit 13, is used as the duty factor of the pulse width modulation.

The ON/OFF switching is repeated in the periods K1 to K12 as described above, thereby rotating the rotor 3. When rotating the rotor 3 in this way, the currents flowing through the phase windings 21$u$, 21$v$ and 21$w$ have current waveforms, the phases of which are different from one another by 120 degrees.

In FIG. 2 showing the waveforms, the period from the start of the period K1 to the end of the period K6 represents an electrical angle of 180 degrees. In the brushless motor drive control shown in FIG. 2, voltage application commands are input in the period of 150 degrees in the period of the electrical angle of 180 degrees in each phase.

Figure 3:
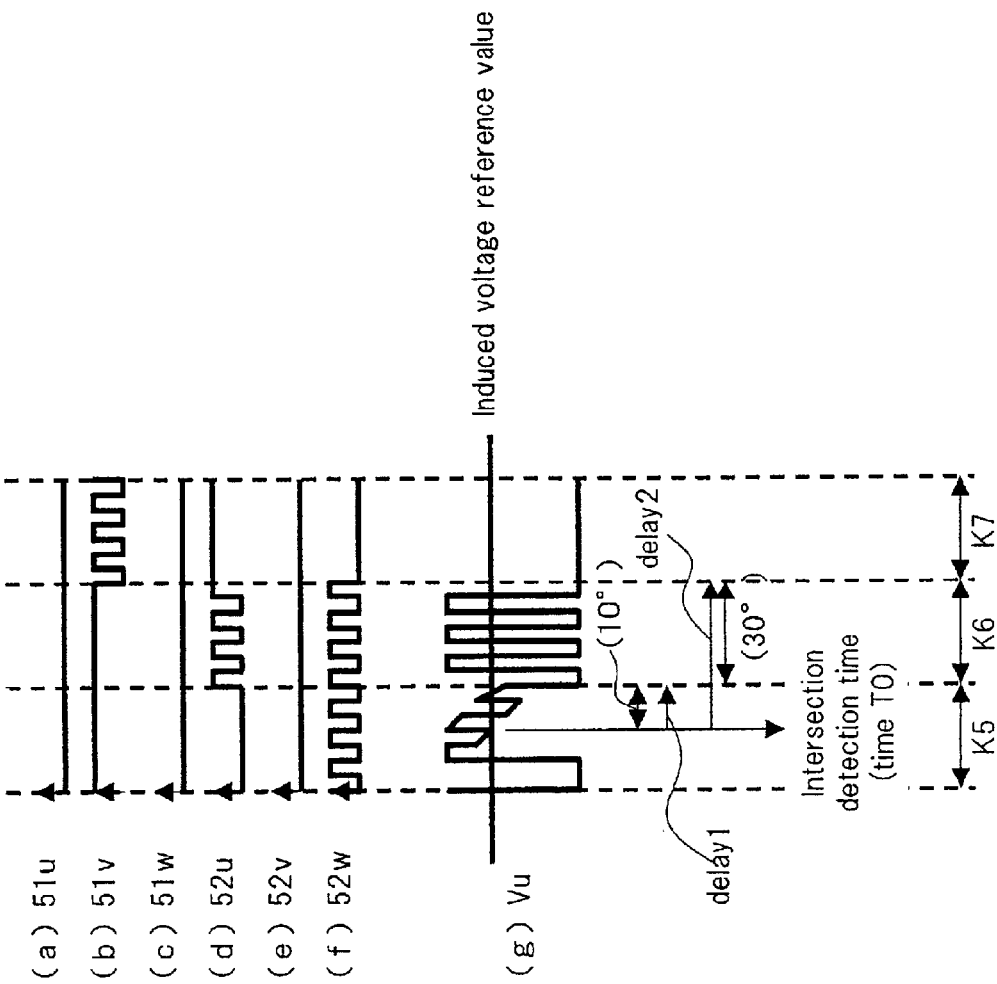
FIG. 3 is a view showing a relationship indicating the time of the intersection of an induced voltage detection value and an induced voltage reference value and also indicating selection timing in accordance with Embodiment 1.

The method of obtaining the selection timing of the periods in the waveforms shown in FIG. 2, that is, the selection timing of the energization states will be described below referring to FIG. 3.

In a period wherein both the two switching devices for one phase are OFF, an induced voltage that generates when no current flows through the winding for the same phase is detected by the first induced voltage detection circuit 8. Since both the U-phase upstream-side switching device 41$u$ and the U-phase downstream-side switching device 42$u$ are OFF in the period K5 shown in FIG. 3, the detection of the induced voltage is carried out at the U-phase winding 21$u$.

The induced voltage reference value generation circuit 9 outputs the reference value of the induced voltages. The operation of the induced voltage reference value generation circuit 9 will be described later. The detected induced voltage and the induced voltage reference value are input to the first rotor rotation position detection circuit 11 from moment to moment, and the time when the two intersect is detected. Based on the detected intersection time, the first rotor rotation position detection circuit 11 obtains the energization selection timing to the next induced voltage detection period K7. In the periods shown in FIG. 3, the time of the selection from the energization state in the period K5 to the energization state in the period K6 and the time of the selection from the energization state in the period K6 to the energization state in the period K7 are present. Hence, delay 1 and delay 2 shown in FIG. 3 are determined.

For example, the delay 1 is determined in advance so as to be 10° behind from the intersection detection time in terms of phase, and the delay 2 is also determined in advance so as to be further 30° degrees behind therefrom. The above-mentioned phase differences are converted into the times to the selection by using a motor speed ω obtained from the motor speed calculation circuit 12, and the timing is calculated as represented by the following equations (3) and (4). The equation (3) represents the time of the selection from the ON state in the period K5 to the ON state in the period K6. The equation (4) represents the time of the selection from the ON state in the period K6 to the ON state in the period K7.

$$\text{Timing from } K5 \text{ to } K6 = T0 + 10°/\omega \quad (3)$$

$$\text{Timing from } K6 \text{ to } K7 = T0 + (10° + 30°) \quad (4)$$

In the equations (3) and (4), T0 designates the time when the detected induced voltage and the induced voltage reference value intersect. At this timing, the selection of the energization state is carried out.

When the next induced voltage detection period K7 is reached, a similar process is carried out again. By repeating the timing calculation process in this way, the selection timing of the energization is determined each time the process is carried out.

However, in comparison with the case of the energization period of 120 degrees in the conventional brushless motor driving method, in the case of the energization period of 150 degrees as shown in FIG. 2, one OFF time is short, that is, 30 degrees. Hence, a first effective detected induced voltage in the induced voltage detection period may be after the time of the intersection with the induced voltage reference value. Furthermore, when abrupt changes occur in load or speed, the induced voltage changes, and this kind of situation is apt to occur. The first effective detected induced voltage having already passed the time of the intersection with the induced voltage reference value, obtained in this kind of case, is used as one induced voltage value to calculate a true intersection time as described below.

Figure 4:
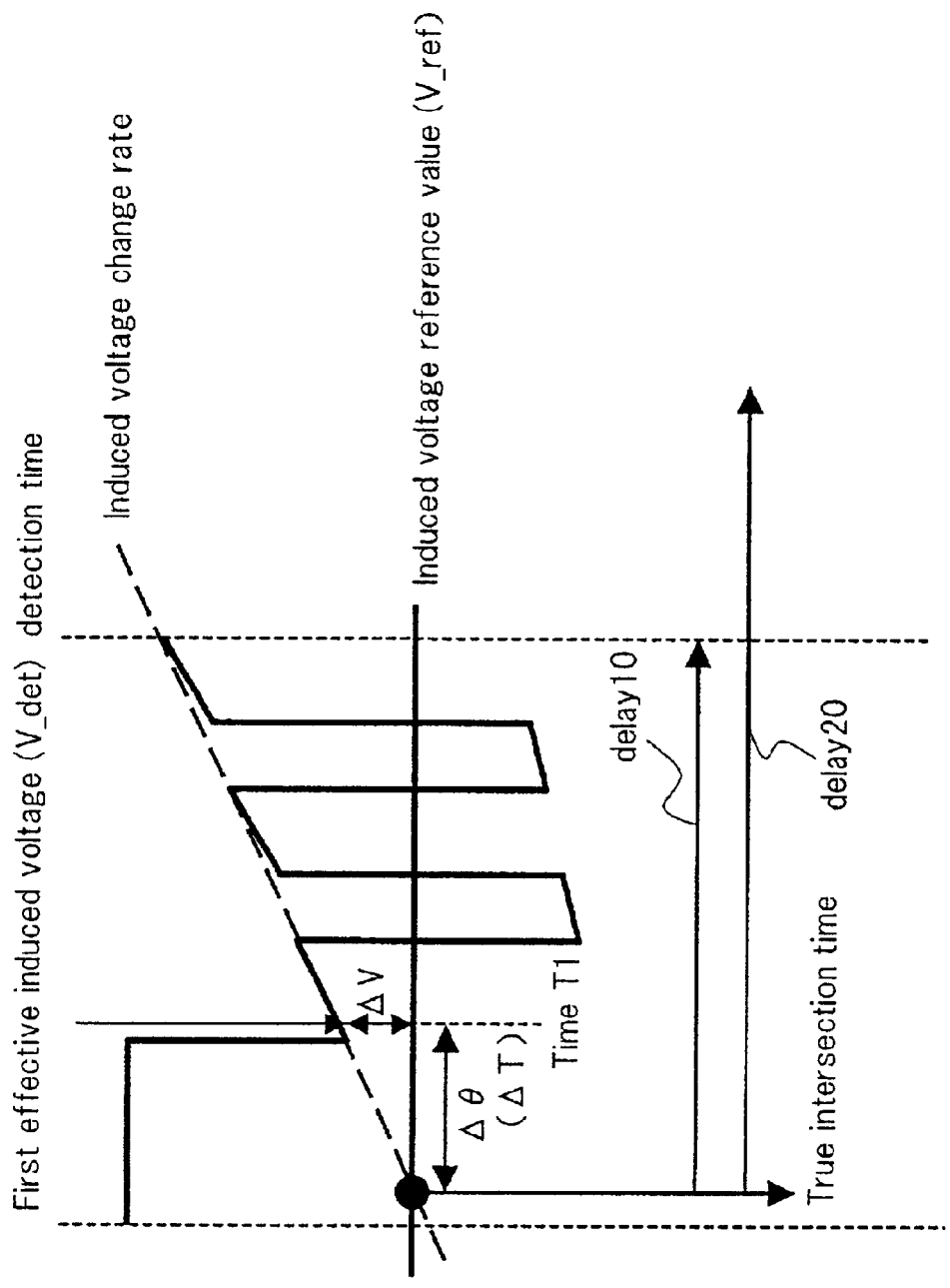
FIG. 4 is a view illustrating the calculation of a true intersection time in the case wherein the detected value of the induced voltage has already exceeded the induced voltage reference value in accordance with Embodiment 1.

FIG. 4 is a view illustrating the calculation of the true intersection time in the case wherein the detected value of the induced voltage has already exceeded the induced voltage reference value in accordance with Embodiment 1. As shown in FIG. 4, the first effective detected induced voltage in the induced voltage detection period has already passed the time of the intersection with the induced voltage reference value.

Figure 5:
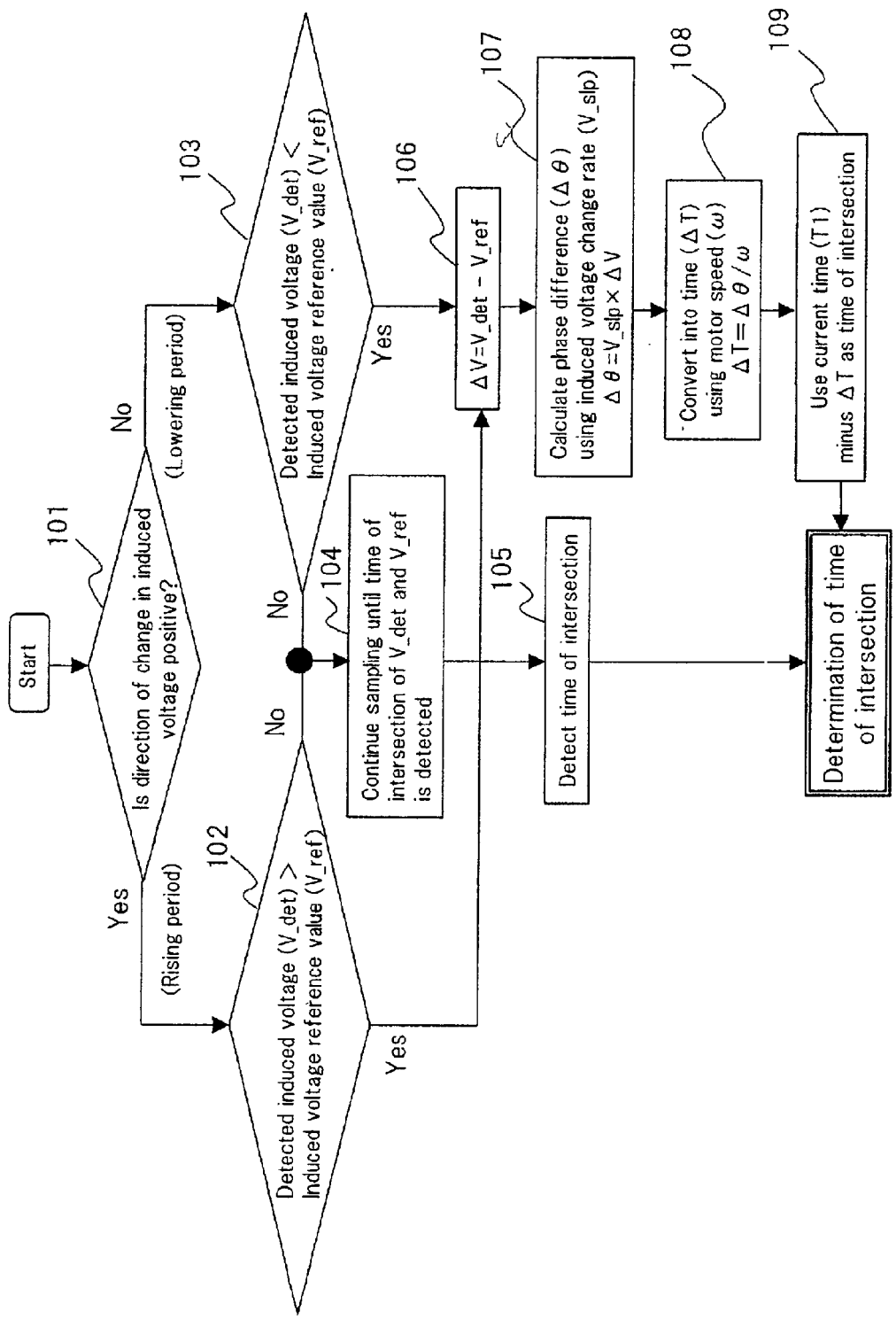
FIG. 5 is a flowchart for obtaining the time of the intersection of a detected induced voltage and the induced voltage reference value in accordance with Embodiment 1.

In this case, the time of the intersection of the detected induced voltage and the induced voltage reference value cannot be detected. At this time, the time of the intersection is calculated as described below, whereby the position of the rotor can be detected. FIG. 5 is a flowchart showing the flow of the intersection time calculation process in accordance with Embodiment 1.

At step 101, the first rotor rotation position detection circuit 11 judges the direction of the change in the induced voltage. If the change rate of the induced voltage is positive, the induced voltage is in a rising period. At step 102, a judgment is made as to whether the detected induced voltage (V_det) is larger than the induced voltage reference value (V_ref) or not. If the detected induced voltage (V_det) is smaller than the induced voltage reference value (V_ref), it is judged that the intersection time can be detected, and the sampling of the induced voltage continues until the intersection time is detected. (at step 104). Conversely, if the detected induced voltage (V_det) is larger than the induced voltage reference value (V_ref), it is judged that the intersection time cannot be detected, and the sequence advances to step 106. At step 106, the difference (ΔV) between the detected induced voltage (V_det) and the induced voltage reference value (V_ref) is calculated. Next, at step 107, the phase difference Δθ (=V_slp×ΔV) between the current time T1 and the true intersection time is calculated from the calculated difference (ΔV) and the induced voltage change rate (V_slp) output from the induced voltage change rate generation circuit 10. The operation of the induced voltage change rate generation circuit 10 will be described later.

Next, at step 108, the calculated phase difference (Δθ) is converted into a time difference ΔT (=Δθ/ω) by using the motor speed (ω). The time going back from the current time T1 by the time difference (ΔT) is determined as the intersection time.

On the other hand, if the change rate of the induced voltage is negative at step 101, the induced voltage is in a lowering period. At step 103, a judgment is made as to whether the detected induced voltage (V_det) is smaller than the induced voltage reference value (V_ref) or not. If the detected induced voltage (V_det) is larger than the induced voltage reference value (V_ref), it is judged that the intersection time can be detected, and the sampling of the induced voltage continues until the intersection time is detected (at step 104). Conversely, if the detected induced voltage (V_det) is smaller than the induced voltage reference value (V_ref), it is judged that the intersection time cannot be detected, and the sequence advances to step 106. The processing after step 106 is the same as that described above.

The selection times (delay 10 and delay 20 in FIG. 4) are calculated on the basis of the determined intersection time as described above. When the times calculated as described above are reached, the selection of the energization state is carried out.

When the next induced voltage detection period is reached, the above-mentioned intersection time calculation process is carried out again. By repeating the intersection time calculation process in this way, the selection timing of the energization is determined each time the process is carried out.

Next, the operation of the induced voltage reference value generation circuit 9 will be described below. The induced voltage reference value generation circuit 9 receives the information of the operation state of the brushless motor 1 and outputs the induced voltage reference value.

In the case of the duty pattern shown in FIG. 2, the rising and lowering states of the detected induced voltage occur alternately so as to be symmetrical with respect to the half of the DC voltage.

Figure 6:
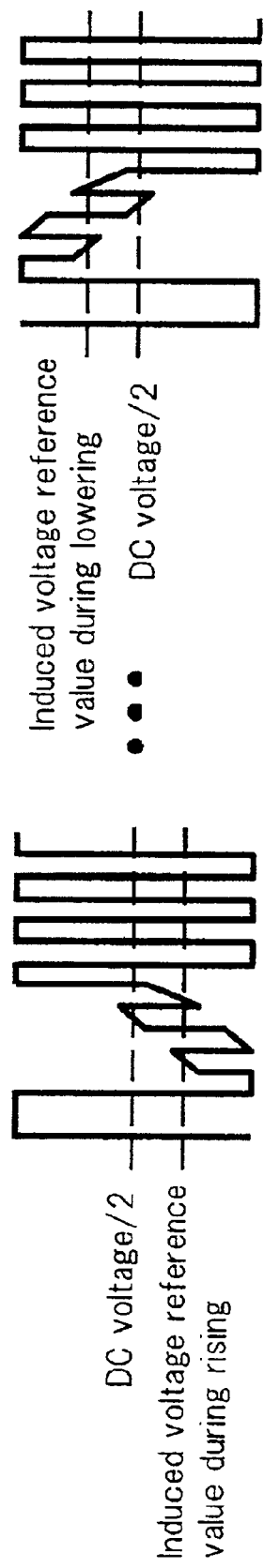
FIG. 6 is a view illustrating a method of setting the induced voltage reference value in accordance with Embodiment 1.

FIG. 6 is a view illustrating the method of setting the induced voltage reference value in accordance with Embodiment 1, and shows the detected induced voltage waveforms in the rising and lowering periods of the detected induced voltage. As shown in FIG. 6, the induced voltage reference value in the rising period is set at a value obtained by subtracting a reference value setting amount from the half of the DC voltage. The induced voltage reference value in the lowering period is set at a value obtained by adding the reference value setting amount to the half of the DC voltage. By this setting, the frequency of the intersection time detection becomes stable. The reference value setting amount that is added and subtracted in this process is obtained in advance depending on the rotation speed of the motor so that the brushless motor 1 can be operated highly efficiently. The reference value setting amount is shown in a tabular form as shown in FIG. 7.

In the case when the brushless motor 1 is an embedded magnet brushless motor, the induced voltage appears as the composition of a magnet component and a reluctance component. The magnet component depends on the speed of the motor, and the reluctance component depends on the speed and current of the motor. In addition, the current of the motor relates to the duty factor index. In the case when the change in the induced voltage due to the current is negligible in the range of the operation at the time of the table formation. A table indicating the reference value setting amount depending on the speed of the motor is formed in advance as shown in FIG. 7. Furthermore, in the case when the change in the induced voltage is not negligible, a table indicating the reference value setting amount depending on the speed of the motor and the duty factor index is formed as shown in FIG. 8. By using this table, the value derived from the information of the operation state of the brushless motor 1, having been input, is output as the above-mentioned reference value setting amount. In this embodiment, the information of the operation state is the speed of the motor. In the case when the table indicating the reference value setting amount depending on the speed of the motor and the duty factor index as shown in FIG. 8 is used instead of the table indicating the reference value setting amount depending on the speed of the motor as shown in FIG. 7, the information of the operation state is the speed of the motor and the duty factor index.

The reference values in the table are set discretely. Hence, when the speed of the motor and the duty factor index that are required do not coincide with the reference values in the table, the required reference value setting amount is calculated by linearly interpolating the reference value setting amounts adjacent to the reference values. For example, a case wherein the speed of the motor is 2400 rpm will be described below by using the table shown in FIG. 7. According to the table shown in FIG. 7, the reference value setting amount at a motor speed of 2000 rpm is V3, and the reference value setting amount at a motor speed of 3000 rpm is V4. The reference value setting amounts obtained in this way are linearly interpolated in accordance with the following equation (5), and the obtained value is used as the reference value setting amount at the motor speed of 2400 rpm.

$$\text{Predetermined value (2400 rpm)} = (V4-V3)/(3000-2000) \times (2400-2000) + V3 \quad (5)$$

Next, the operation of the induced voltage change rate generation circuit 10 will be described below. The induced voltage change rate generation circuit 10 receives the information of the operation state of the brushless motor 1 and outputs an induced voltage change rate.

In the case when the brushless motor 1 is an embedded magnet brushless motor, the induced voltage change rate changes depending on the speed of the motor, motor parameters, such as a back emf constant, and the current of the motor. In addition, the current of the motor relates to the duty factor index.

Figure 10:
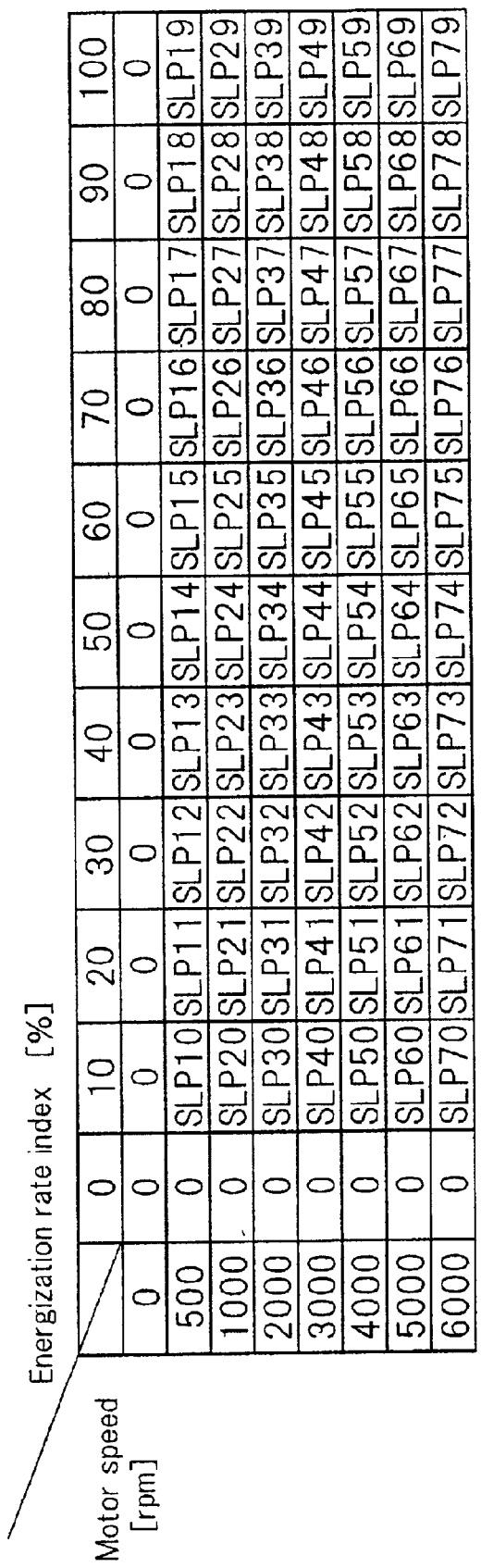
FIG. 10 is a table generated by the induced voltage reference value generation circuit on the basis of the motor speed and duty factor index in accordance with Embodiment 1.

Hence, the induced voltage change rate depending on the operation state of the brushless motor 1 in an operation range is checked in advance and listed in a tabular form. When the width of the change rate of the induced voltage obtained in the load condition within the operation range at a constant speed is sufficiently small, a table indicating the induced voltage change rate depending on the speed of the motor is formed in advance as shown in FIG. 9. When the width of the change is large, a table indicating the induced voltage change rate depending on the speed of the motor and the duty factor index is formed in advance as shown in FIG. 10. By using these tables formed as described above, the value derived from the information of the operation state of the brushless motor 1, having been input, is output as the induced voltage change rate. In this embodiment, the information of the operation state is the speed of the motor. In the case when the table indicating the induced voltage change rate depending on the speed of the motor and the duty factor index as shown in FIG. 10 is used instead of the table indicating the induced voltage change rate depending on the speed of the motor as shown in FIG. 9, the information of the operation state is the speed of the motor and the duty factor index.

The reference values in the table are set discretely. Hence, when the speed of the motor and the duty factor index that are required do not coincide with the reference values, the required induced voltage change rate is calculated by linearly interpolating the induced voltage change rates adjacent to the reference values. For example, a case wherein the speed of the motor is 2400 rpm will be described below by using the table shown in FIG. 9. According to the table shown in FIG. 9, the induced voltage change rate at a motor speed of 2000 rpm is SLP3, and the induced voltage change rate at a motor speed of 3000 rpm is SLP4. The induced voltage change rates obtained in this way are linearly interpolated in accordance with the following equation (6), and the obtained value is used as the induced voltage change rate at the motor speed of 2400 rpm.

$$\text{Induced voltage change rate (2400 rpm)} = (SLP4 - SLP3)/(3000 - 2000) \times (2400 - 2000) + SLP3 \quad (6)$$

In Embodiment 1, the control section 6 is formed of the microcomputer having a function of directly sampling the DC voltage and the induced voltage. However, the present invention is not limited to this kind of configuration. It is possible to have a configuration wherein the DC voltage and the induced voltage are sampled by different circuits and input to the microcomputer.

In addition, the energization period of the duty pattern in accordance with Embodiment 1 is 150 degrees in the electrical angle of 180 degrees. However, the present invention is not limited to this energization period. It is possible to have a similar configuration wherein the energization period is in the range of 120 degree or more to less than 180 degrees.

Furthermore, the duty pattern in accordance with Embodiment 1 is provided with two selection times between one OFF period and the next OFF period. However, the present invention is not limited to this duty pattern. It is possible to have a similar configuration wherein more than two selection times are provided between one OFF period and the next OFF period.

As described above, the brushless motor controller in accordance with Embodiment 1 can accurately detect the position of the rotor at all times even when only one induced voltage value is detected for a given brushless motor. Magnetic detection means, such as Hall devices, are not necessary in order to detect the rotation position of the rotor 3.

Embodiment 2

Next, a brushless motor controller in accordance with Embodiment 2 of the present invention will be described below. In Embodiment 2, just as in the case of the above-mentioned Embodiment 1, the intersection time is detected from the detected induced voltage, the direction of the induced voltage change and the induced voltage reference value. However, the controller in accordance with Embodiment 2 can deal with a case wherein, in a selection time calculation in the case wherein it is judged that no intersection time can be detected, the selection time obtained by the calculation has already passed the actual selection time.

The control method of the brushless motor controller in accordance with Embodiment 2 will be described below referring to FIG. 11. The configuration of Embodiment 2 is the same as that of the above-mentioned Embodiment 1.

In the case wherein it is judged that no intersection time can be detected from the detected induced voltage, the direction of the induced voltage change and the induced voltage reference value, the true intersection time is obtained by a method similar to that of Embodiment 1. When the selection time is calculated on the basis of the intersection time, the selection time may become earlier than the induced voltage detection time in some cases. FIG. 11 is a view illustrating the calculation for obtaining the true intersection time in the case wherein the detected value of the induced voltage in Embodiment 2 has already exceeded the induced voltage reference value.

Figure 11:
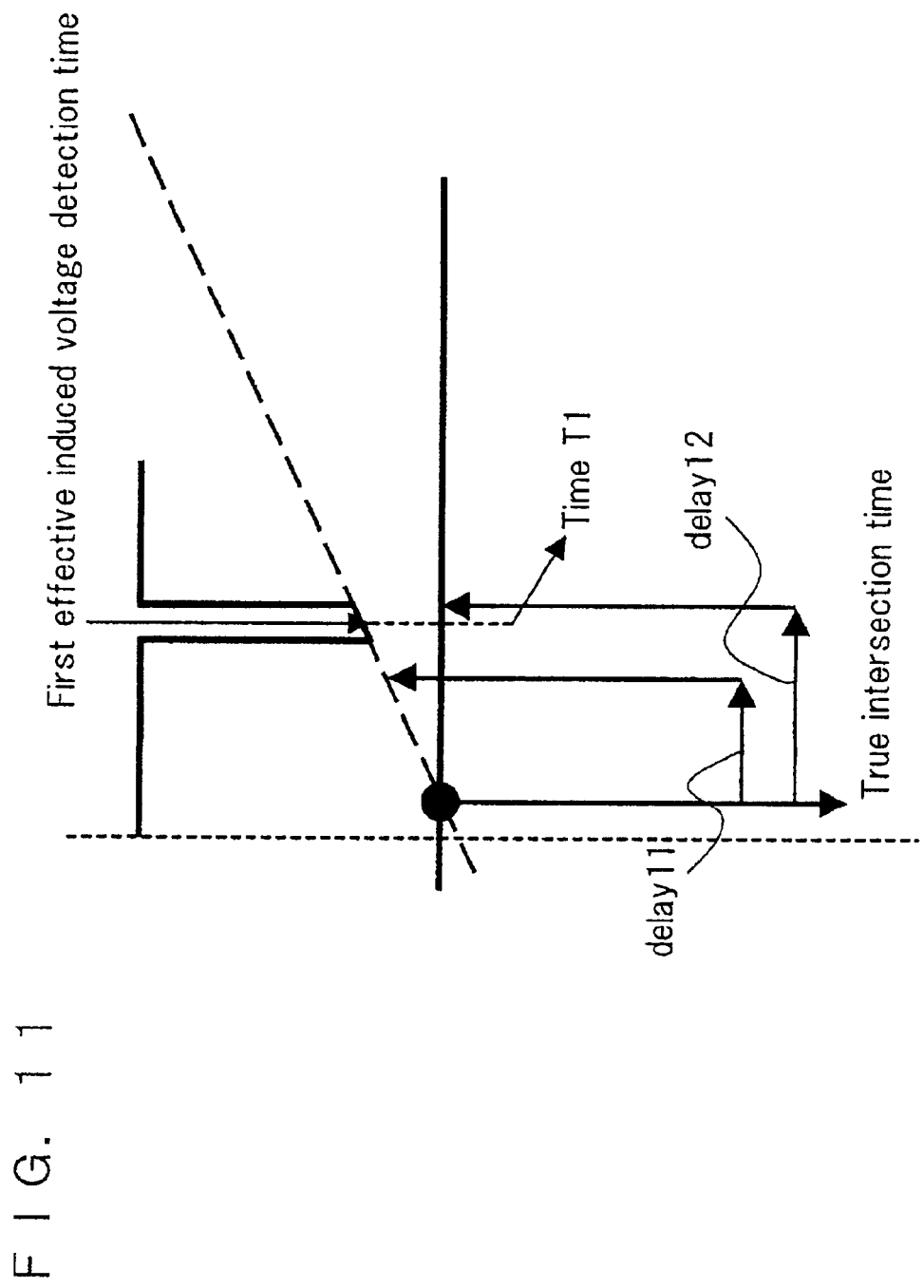
FIG. 11 is a view illustrating a process in accordance with Embodiment 2 in the case when corrected selection timing cannot be obtained in accordance with Embodiment 2.

It is assumed that the selection time calculated on the basis of the true intersection time is the time indicated by delay 11 in FIG. 11. In this case, the selection time is earlier than the indicated voltage detection time, whereby the selection cannot be attained.

In order to carry out the selection, the selection time is required to be set so as to be later than the current time T1. In this case, the selection time is changed to delay 12 so that the selection can be carried out immediately after the induced voltage detection time. In other words, the delay 12 should be set at a time immediately after the induced voltage detection time T1 and so that a period in which the selection can be done is provided. For example, the delay 12 can be set at 10 μs after the induced voltage detection time T1, provided that the selection can be done. By this change, the selection can be carried out securely.

As described above, the brushless motor controller in accordance with Embodiment 2 can accurately detect the position of the rotor at all times and securely select the voltage application state for a given brushless motor. Magnetic detection means, such as Hall devices, are not necessary in order to detect the rotation position of the rotor 3.

Embodiment 3

Next, a brushless motor controller in accordance with Embodiment 3 of the present invention will be described below. In Embodiment 3, the intersection time is obtained by calculation even in the case wherein the time of the intersection of the induced voltage reference value and the detected induced voltage can be detected during high-speed operation in which the OFF period becomes short. In the controller in accordance with Embodiment 3 configured as described above, the rotation position of the rotor can be detected accurately even during high-speed operation in which the OFF period becomes short and a control cycle delay causes a large angle difference. It is thus possible to reduce the fluctuations in the current waveform.

The control method of the brushless motor controller in accordance with Embodiment 3 will be described below.

Figure 12:
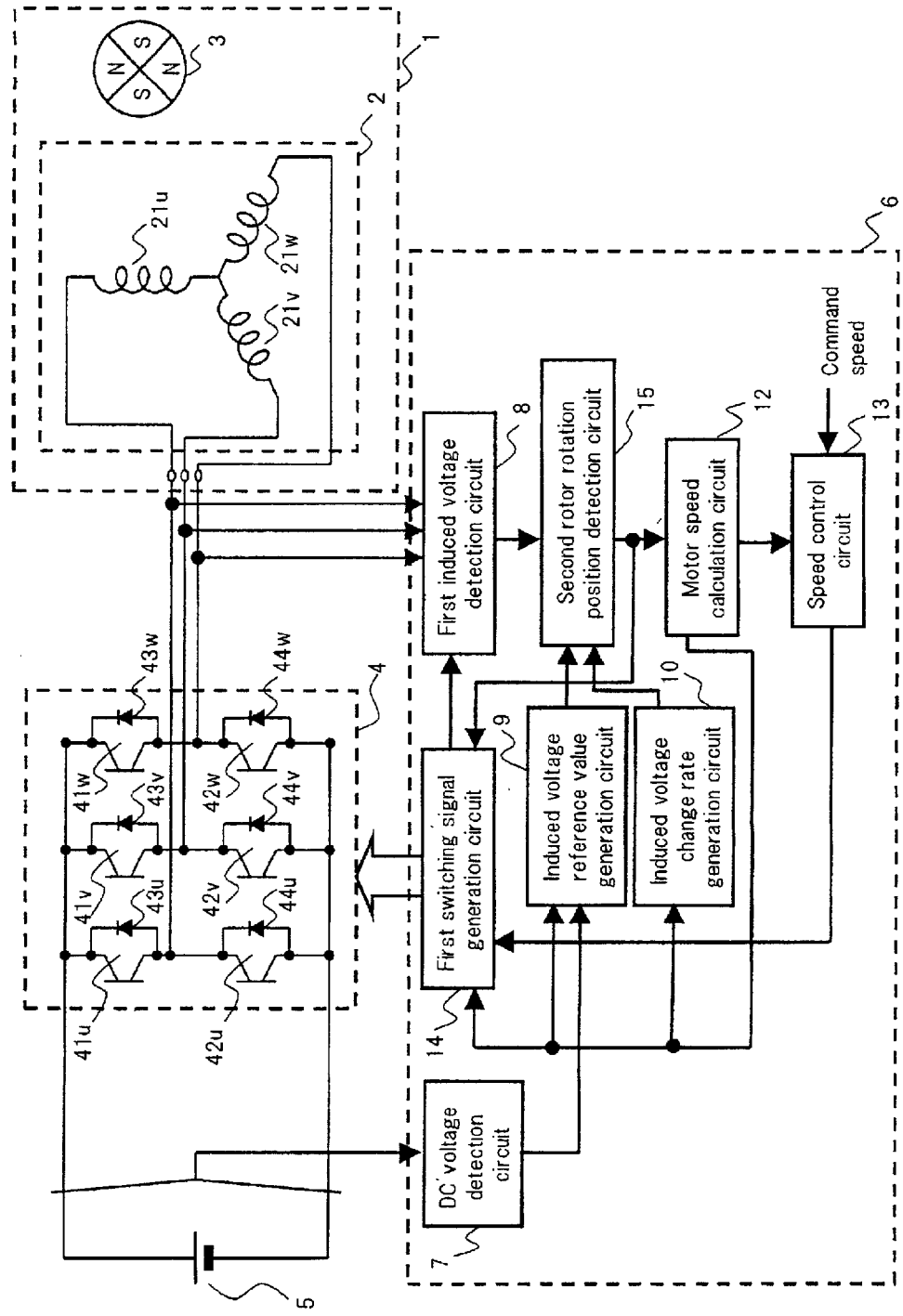
FIG. 12 is a block diagram showing a configuration of a brushless motor controller in accordance with Embodiment 3 of the present invention.

FIG. 12 is a block diagram showing a configuration of the brushless motor controller in accordance with Embodiment 3. In FIG. 12, the same components as those of the above-mentioned Embodiment 1 are designated by the same numerals as those used in FIG. 1, and their explanations are omitted.

In the controller in accordance with Embodiment 3, a second rotor rotation position detection circuit 15 is provided instead of the first rotor rotation position detection circuit 11 in accordance with the above-mentioned Embodiment 1.

The operation of the second rotor rotation position detection circuit 15 will be described below.

Figure 13:
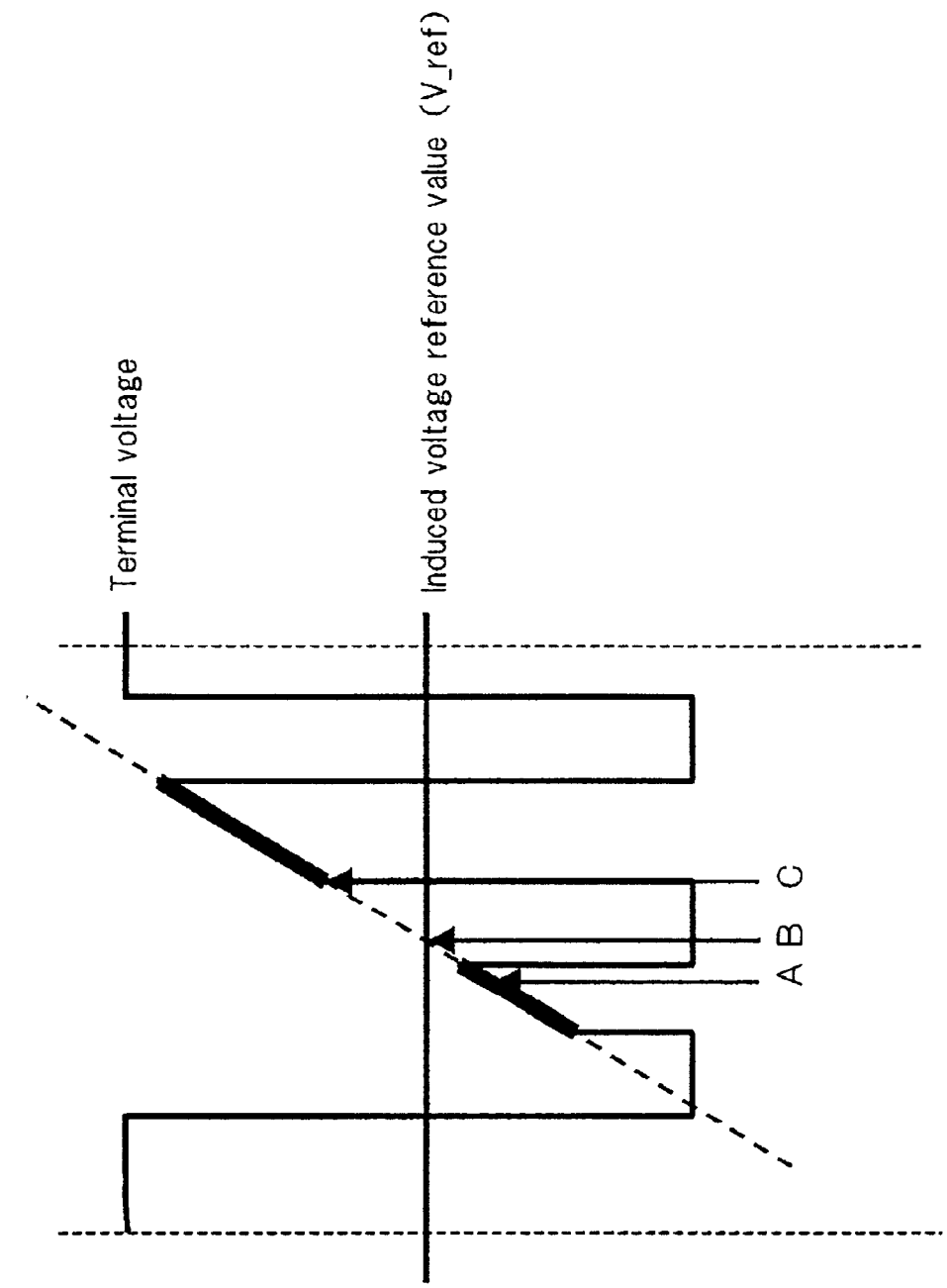
FIG. 13 is a view showing a change in the terminal voltage of an induced voltage detection phase in accordance with Embodiment 4.
Figure 14:
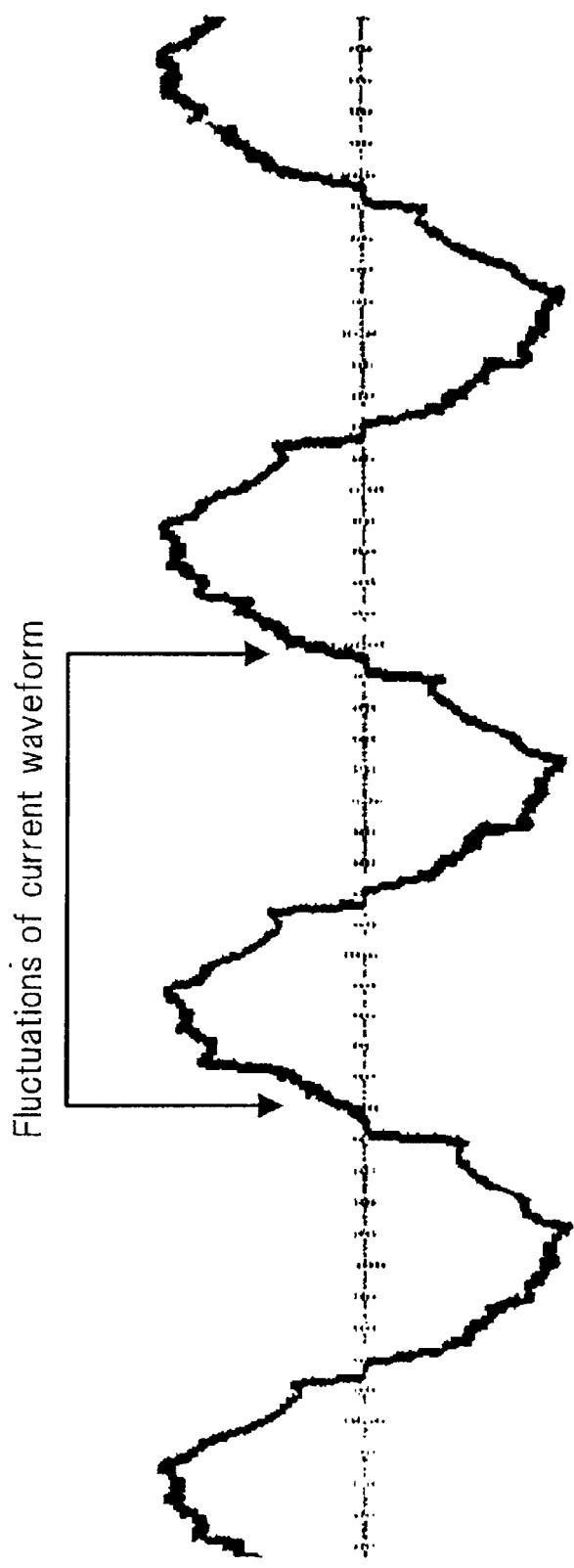
FIG. 14 is a view showing a current waveform at the time when switching selection timing varies in accordance with Embodiment 4.

FIG. 13 is a view showing a change in a detected induced voltage at a terminal. The effective portions of the induced voltage are those synchronized with PWM, indicated by thick lines in FIG. 13. On the other hand, during high-speed operation, the change rate of the detected induced voltage with respect to time becomes large. Hence, the intersection of the detected induced voltage and the induced voltage reference value may occur at a time in which the induced voltage cannot be detected, for example, time B shown in FIG. 13. At time A shown in FIG. 13, the detected induced voltage does not exceed the induced voltage reference value. It is thus found that the detected induced voltage has exceeded the intersection at time C. For this reason, the detection of the intersection time, that is, time B in reality, is delayed, thereby causing a problem. This delay corresponds to one PWM portion at the maximum and becomes a large angle during high-speed operation. For example, when it is assumed that a four-pole motor is rotating at 4000 rpm at a PWM cycle of 250 μs, the angle advancing during one PWM portion becomes 12°. In particular, when the energization width is large, for example, 165°, the OFF period is only 15°. In this situation, fluctuations occur in the current waveform because of the variation, and stable operation becomes difficult. FIG. 14 is a view showing the above-mentioned fluctuations in the current waveform at the time when the motor is operated at an energization width of 165°.

Hence, in the controller in accordance with Embodiment 3, when the motor speed is high, even before the detected induced voltage and the induced voltage reference value intersect, the intersection time is obtained by calculation, thereby detecting the position of the rotor in advance.

Figure 15:
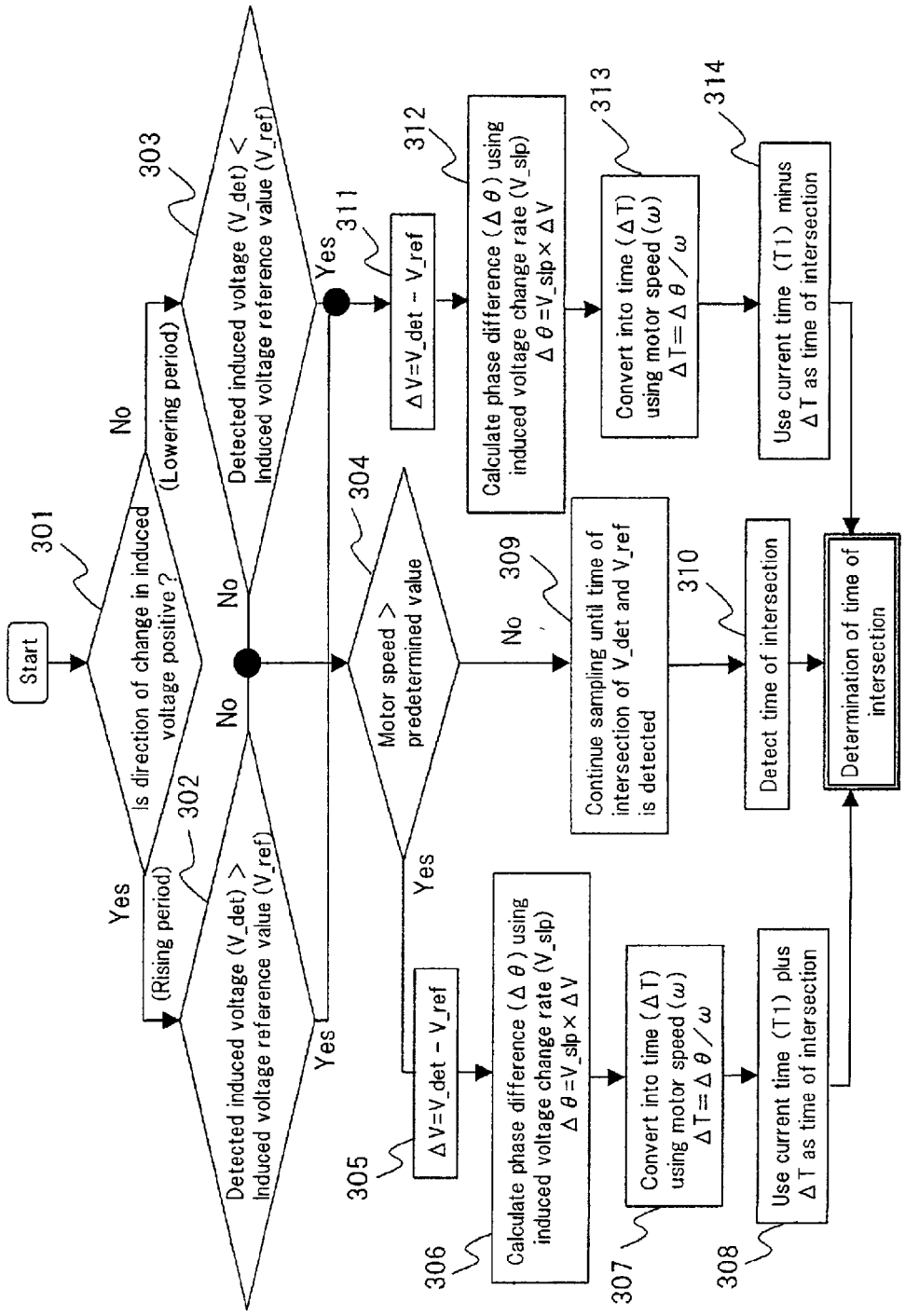
FIG. 15 is a flowchart for obtaining the time of the intersection of a detected induced voltage and the induced voltage reference value in accordance with Embodiment 3.

FIG. 15 is a flowchart showing the flow of an intersection time calculation process in accordance with the control method of Embodiment 3. A judgment is made as to whether the intersection time can be detected or not from the detected induced voltage, the direction of the induced voltage change and the induced voltage reference value. First, at step 301, the second rotor rotation position detection circuit 15 judges the direction of the change in the induced voltage. If the change rate of the induced voltage is positive, the induced voltage is in a rising period. At step 302, a judgment is made as to whether the detected induced voltage (V_det) is larger than the induced voltage reference value (V_ref) or not. If the detected induced voltage (V_det) is smaller than the induced voltage reference value (V_ref), it is judged that the intersection time can be detected, and the sequence advances to step 304. Conversely, if the detected induced voltage (V_det) is larger than the induced voltage reference value (V_ref), it is judged that the intersection time cannot be detected, and the sequence advances to step 311.

On the other hand, if the change rate of the induced voltage is negative at step 301, the induced voltage is in a lowering period. At step 303, a judgment is made as to whether the detected induced voltage (V_det) is smaller than the induced voltage reference value (V_ref) or not. If the detected induced voltage (V_det) is larger than the induced voltage reference value (V_ref), it is judged that the intersection time can be detected, and the sequence advances to step 304. Conversely, if the detected induced voltage (V_det) is smaller than the induced voltage reference value (V_ref), it is judged that the intersection time cannot be detected, and the sequence advances to step 311. After step 311, the intersection time is calculated by the method described at steps 106 to 109 in FIG. 5 in the above-mentioned Embodiment 1.

Figure 16:
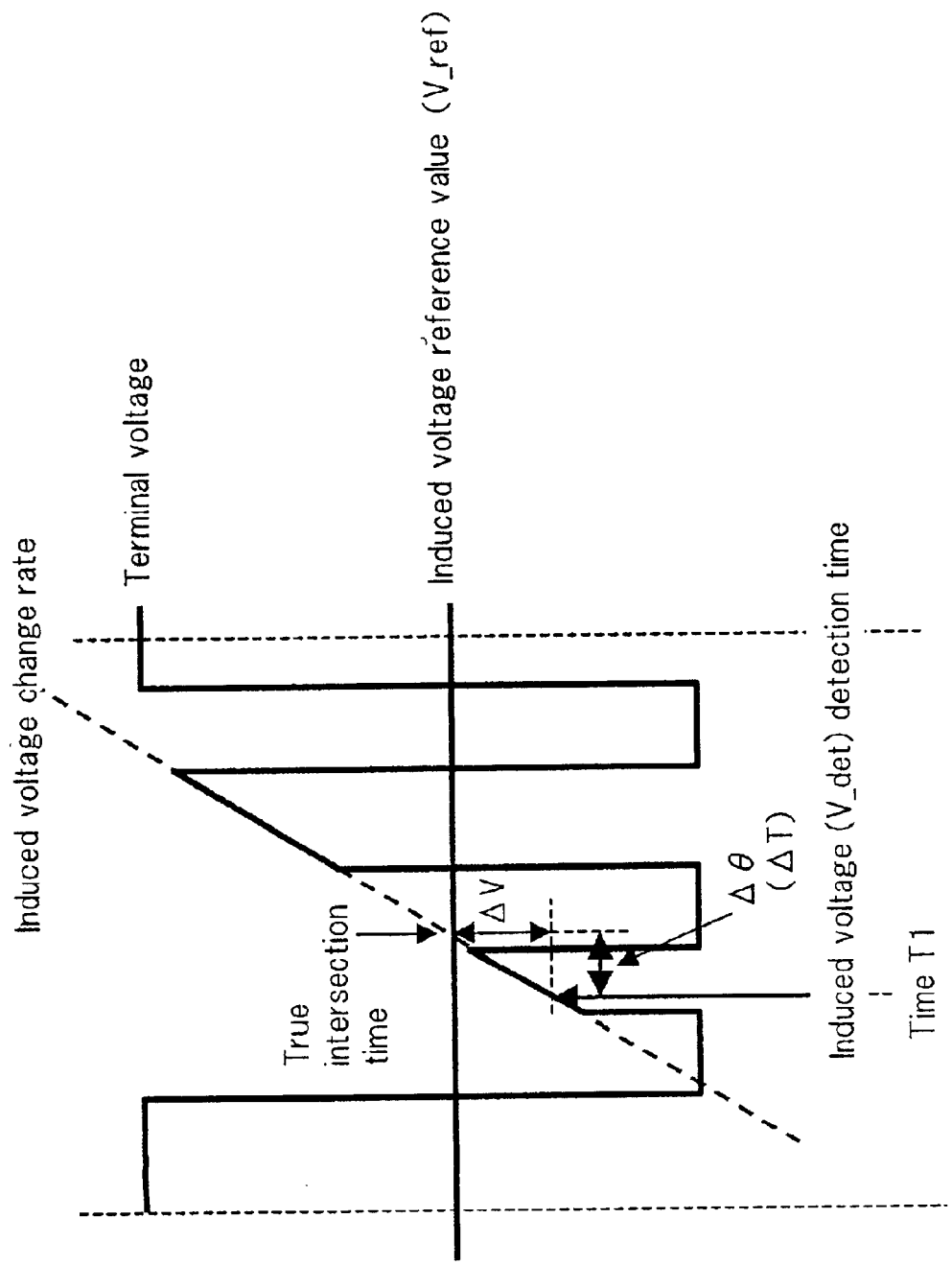
FIG. 16 is a view illustrating the calculation of a true intersection time during high-speed operation in Embodiment 3.

FIG. 16 is a view illustrating the calculation of the true intersection time during high-speed operation in Embodiment 3.

In the case wherein the change in the induced voltage is in a rising period as shown in FIG. 16, it is judged that the intersection time cannot be detected if the detected induced voltage is larger than the induced voltage reference value (at step 302). Furthermore, in the case wherein the change in the induced voltage is in a lowering period, it is judged that the intersection time cannot be detected if the detected induced voltage is smaller than the induced voltage reference value.

If it is judged that the intersection time cannot be detected as the result of the judgment, the intersection time is calculated in accordance with the method described in the above-mentioned Embodiment 1. If it is judged that the intersection time can be detected, a judgment is made as to whether the speed of the motor is more than a predetermined value (at step 304). If the speed of the motor is the predetermined value or less, the sampling of the induced voltage continues until the intersection time is detected in accordance with the method described in Embodiment 1 (at step 104 in FIG. 5). If it is judged that the speed of the motor is more than the predetermined value, the intersection time calculation process described below is carried out.

First, as shown in FIG. 16, the difference ($\Delta V$) between the detected induced voltage (V_det) and the induced voltage reference value (V_ref) is calculated (at step 305). Next, the phase difference $\Delta \theta$ (=V_slp×$\Delta V$) between the current time T1 and the true intersection time is calculated from the above-mentioned difference ($\Delta V$) and the induced voltage change rate (V_slp) output from the induced voltage change rate generation circuit 10 (at step 306). Furthermore, the calculated phase difference ($\Delta \theta$) is converted into a time difference $\Delta T$ (=$\Delta \theta/\omega$) by using the motor speed (at step 307). Then, the time passed from the current time T1 by the time difference ($\Delta T$) is determined as the intersection time (at step 308).

Next, the method of determining the predetermined value of the motor speed, that is, a value depending on which a judgment is made as to whether the above-mentioned intersection time calculation process is carried out or not, will be described below.

For example, a case wherein a four-pole motor is operated at a PWM cycle of 250 $\mu$s and at an energization angle of 165° and the motor speed is such that the induced voltage detection period is shorter than two PWM cycles will be described below.

In this case, the induced voltage detection period becomes 15°. Since two PWM cycles become 500 $\mu$s, the motor speed, at which a 15° advance time is 500 $\mu$s, is calculated as 2500 rpm. Hence, in the case wherein the motor speed exceeds this speed, the above-mentioned intersection time calculation process is carried out. In the above example, the case wherein the induced voltage detection period is shorter than two PWM cycles. However, the present invention is not limited to this case. The induced voltage detection period may be longer than two PWM cycles.

The next switching state selection time is obtained on the basis of the intersection time calculated as described above. The switching state selection time is calculated in this way, and the brushless motor is driven according to the calculated value.

As described above, the brushless motor controller in accordance with Embodiment 3 can accurately obtain the time of the intersection of the induced voltage and the induced voltage reference value for a given brushless motor. Magnetic detection means, such as Hall devices, are not necessary in order to detect the rotation position of the rotor 3. Furthermore, the switching state can be selected at accurate timing. Therefore, the fluctuations of the current waveform can be reduced, and stable brushless motor driving can be attained.

Embodiment 4

Next, a brushless motor controller in accordance with Embodiment 4 of the present invention will be described below. Embodiment 4 is configured so that the table values of the induced voltage change rate generation circuit are corrected when the induced voltage changes owing to a change in temperature or the like. With this configuration, the controller in accordance with Embodiment 4 can attain accurate rotor rotation position detection stably at all times regardless of the change in temperature.

The control method of the brushless motor controller in accordance with Embodiment 4 will be described below.

Figure 17:
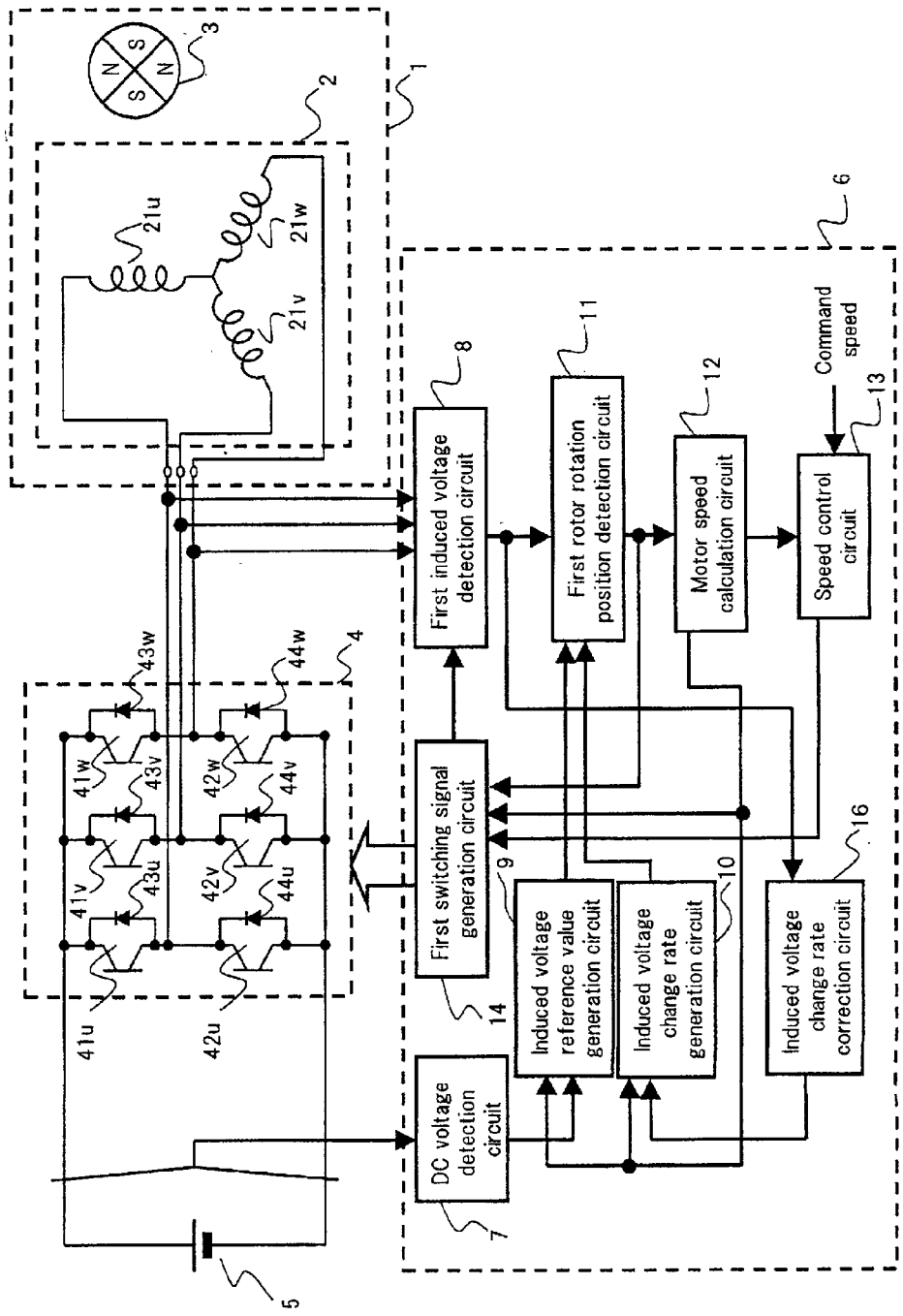
FIG. 17 is a block diagram showing a configuration of a brushless motor controller in accordance with Embodiment 4 of the present invention.

FIG. 17 is a block diagram showing a configuration of the brushless motor controller in accordance with Embodiment 4. In FIG. 17, the same components as those of the above-mentioned Embodiment 1 are designated by the same numerals as those used in FIG. 1, and their explanations are omitted.

The controller in accordance with Embodiment 4 is provided with an induced voltage change rate correction circuit 16 in addition to the configuration of Embodiment 1.

The operation of the induced voltage change rate correction circuit 16 will be described below.

Figure 18:
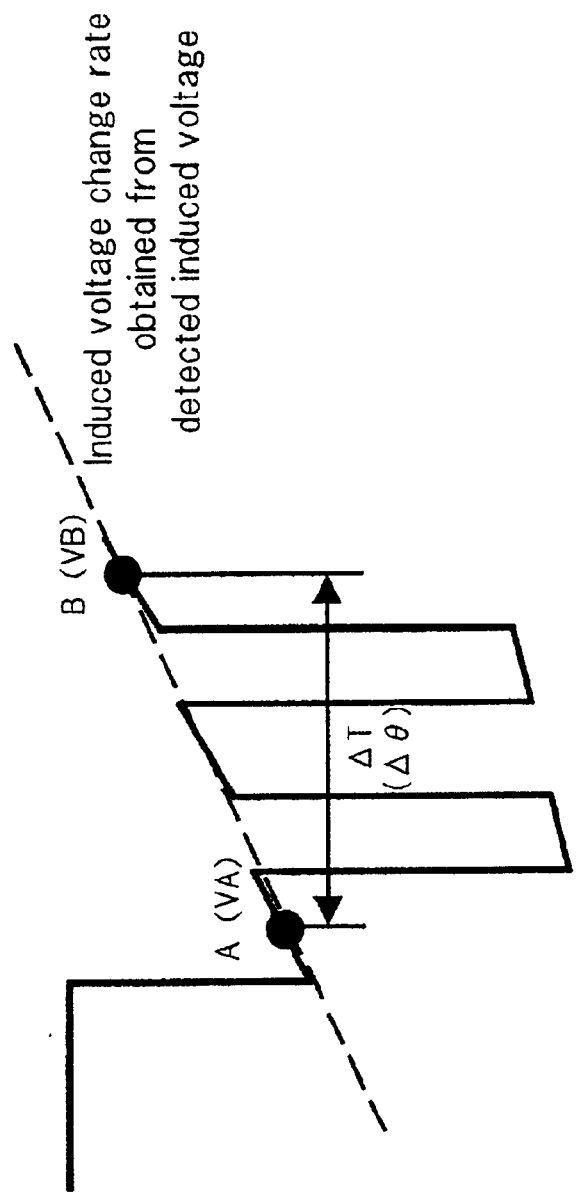
FIG. 18 is a view illustrating a process for obtaining an induced voltage change rate from a detected induced voltage in accordance with Embodiment 4.

The back emf constant and the winding resistance value of a brushless motor, used as motor parameters, change depending on the environmental temperature of the brushless motor. The detected induced voltage thus changes depending on these changes. Hence, the table values of the induced voltage change rate generation circuit 10, having been obtained in advance, become deviated. To solve this problem, the table values of the induced voltage change rate generation circuit 10 are corrected as described below. FIG. 18 is a view illustrating a table value correction process.

It is assumed that an induced voltage VA is detected at time A and that an induced voltage VB is detected at time B as shown in FIG. 18. Furthermore, the time difference $\Delta T$ between time A and time B is converted into a phase difference $\Delta \theta$ by using the motor speed. By using these data, an induced voltage change rate SLP_X is calculated from the following equation (7).

$$SLP\_X = (VB - BA)/\Delta\theta \quad (7)$$

It is assumed that the output value of the induced voltage change rate generation circuit 10 in the same conditions as those described above is SLP_ORG. By using this induced voltage change rate SLP_ORG and the calculated induced voltage change rate SLP_X, a new induced voltage change rate SLP_NEW is calculated in accordance with the following equation (8), and the table values are renewed by PI control.

$$SLP\_NEW = Kp(SLP\_X - SLP\_ORG) + Ki\Sigma(SLP\_X - SLP\_ORG) \quad (8)$$

In the equation (8), Kp and Ki designate gains for renewal. The gains are determined in consideration of a temperature change rate during the operation of the brushless motor.

Additionally, the induced voltage change rate in a region wherein only one induced voltage value can be detected is renewed as described below. The change in temperature is estimated from a table value corrected by using two or more induced voltages detected before. Then, the induced voltage change rate is obtained depending on the change in temperature, whereby the change rate is renewed.

For example, a table of the induced voltage change rate depending on a change in temperature at a specific motor speed is created in advance as shown in FIG. 19. It is assumed that the current motor speed is 2000 rpm and that the induced voltage change rate after correction is SLP34. According to this table, it is estimated that the temperature has become 60° C. It is thus possible to obtain induced voltage change rate values at a temperature of 60° C. at different motor speeds.

In Embodiment 4, the induced voltage change rate is calculated by using two detected induced voltage values. However, an operation similar to that of Embodiment 4 can also be attained by calculating two or more change rates of the detected induced voltage values and by averaging the change rates.

Furthermore, in Embodiment 4, the induced voltage change rate in a region wherein only one induced voltage value can be detected is corrected on the basis of the table shown in FIG. 19. However, a similar operation can also be attained even when the induced voltage change rate is corrected by using the change in temperature calculated from a theoretical equation for the induced voltage.

In the case of a salient brushless motor, such as an embedded magnet brushless motor, when the induced voltage Vu generating in the U-phase is derived in an OFF period, for example, the voltage Vu is represented by the following equation (9).

$$Vu = 1/2[3\phi u + \sqrt{(3)}Las/(La - Las\cdot\cos 2\theta) \times [\{Vv - Vw\} + \phi w - \phi v]\sin 2\theta + \{-2R\cdot\sin 2\theta + 6\omega La\cdot\cos 2\theta - 6\omega Las\}iv]] \quad (9)$$

Figure 20:
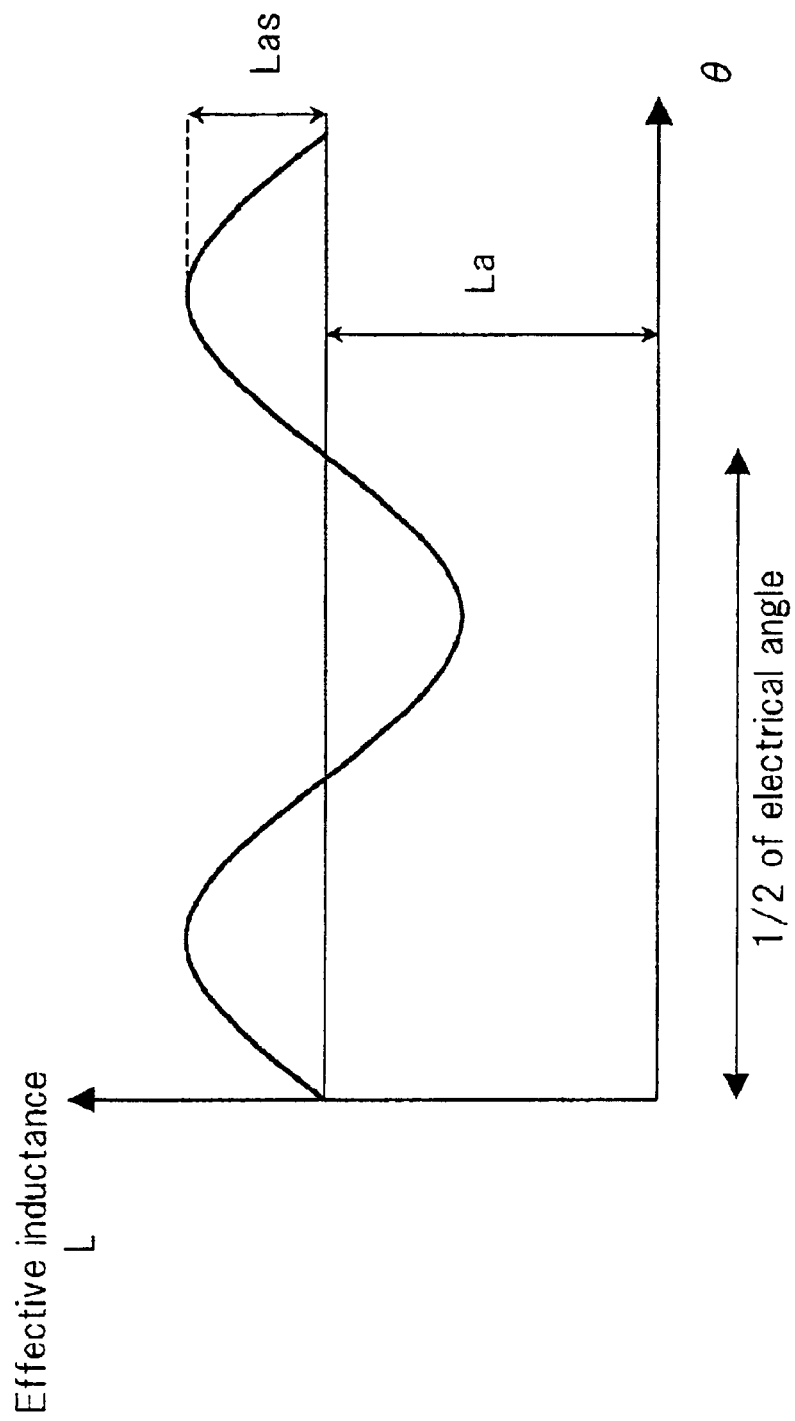
FIG. 20 is a view showing the inductance characteristic of an embedded magnet brushless motor.

In the equation (9), Vv and Vw designate the terminal voltages of the V-phase and the W-phase, respectively, and iv designates a phase current, whose direction to the neutral point is positive. $\Phi u$, $\Phi v$ and $\Phi w$ are magnet-induced voltages viewed from the neutral point in the three phases, respectively. $\omega$ designates a motor speed and R designates a phase resistance. Furthermore, La and Las are parameters indicating an effective inductance in one phase, changing depending on the position of the rotor as shown in FIG. 20. In FIG. 20, the ordinate represents an effective inductance [L], and the abscissa represents an electrical angle [$\theta$].

The change in the induced voltage depending on the temperature can be calculated theoretically as described below, for example.

By changing the motor parameters depending on the temperature, induced voltage values at two different angles are calculated. A temperature condition is obtained wherein the induced voltage change rate calculated depending on the inclinations of the induced voltage values coincides with the induced voltage change rate obtained from the detected induced voltage values. In the temperature condition, the induced voltage change rate in a region wherein only one induced voltage value can be detected is calculated, whereby the change rate is corrected.

As described above, the brushless motor controller in accordance with Embodiment 4 can accurately detect the position of the rotor at all times even when the induced voltage changes owing to a change in temperature. Magnetic detection means, such as Hall devices, are not necessary in order to detect the rotation position of the rotor 3.

Embodiment 5

Next, a brushless motor controller in accordance with Embodiment 5 of the present invention will be described below. Embodiment 5 is configured so that the table values of the induced voltage reference value generation circuit are corrected when the induced voltage changes owing to a change in temperature. With this configuration, the controller in accordance with Embodiment 5 can attain accurate rotor rotation position detection stably at all times regardless of the change in temperature.

The control method of the brushless motor controller in accordance with Embodiment 5 will be described below.

Figure 21:
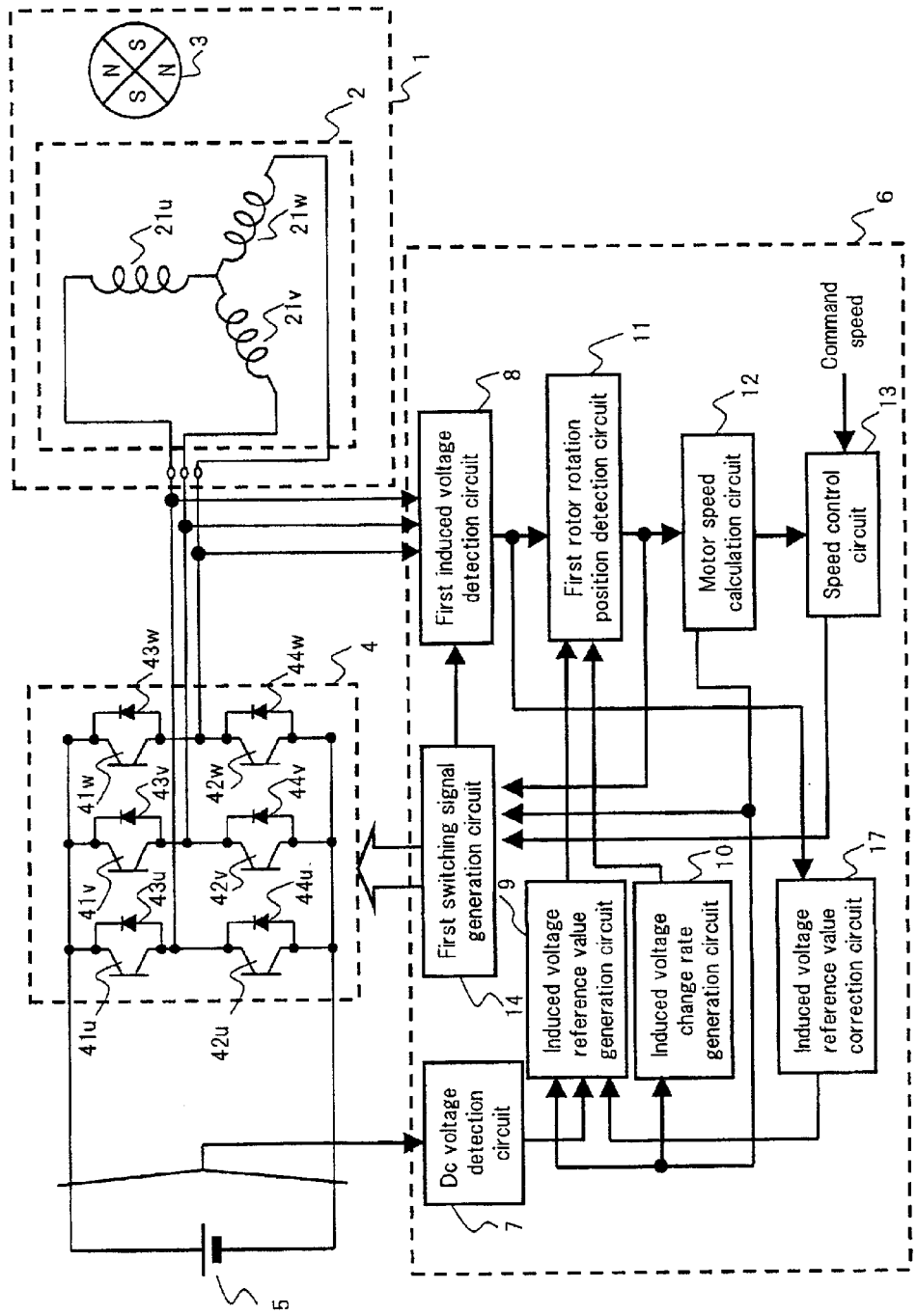
FIG. 21 is a block diagram showing a configuration of a brushless motor controller in accordance with Embodiment 5 of the present invention.

FIG. 21 is a block diagram showing the configuration of the brushless motor controller in accordance with Embodiment 5. In FIG. 21, the same components as those of the above-mentioned Embodiment 1 are designated by the same numerals as those used in FIG. 1, and their explanations are omitted.

The controller in accordance with Embodiment 5 is provided with an induced voltage reference value correction circuit 17 in addition to the configuration of the above-mentioned Embodiment 1.

The operation of the induced voltage reference value correction circuit 17 will be described below.

The induced voltage constant and the winding resistance value of a brushless motor, used as motor parameters, change depending on the environmental temperature of the brushless motor. The detected induced voltage thus changes depending on these changes. Hence, the table values of the induced voltage reference value generation circuit 9, having been obtained in advance, become unsuitable. To solve this problem, the table values of the induced voltage reference value generation circuit 9 are corrected as described below.

FIG. 22 shows the table values of the induced voltage reference value generation circuit 9, at which driving can be attained at the maximum efficiency when the temperature changes at a specific motor speed. As shown in FIG. 22, a table is created in advance wherein values at various specific motor speeds change depending on the change in temperature. On the other hand, an induced voltage change rate is calculated from two or more detected induced voltage values. Then, the change in temperature is obtained in accordance with such a change table as shown in FIG. 22. On the basis of this change in temperature, a new table value is obtained, whereby the change table value is renewed.

As described above, the brushless motor controller in accordance with Embodiment 5 can drive and control a given brushless motor at high efficiency at all times even when the induced voltage changes owing to a change in temperature. Magnetic detection means, such as Hall devices, are not necessary in order to detect the rotation position of the rotor 3.

Embodiment 6

Next, a brushless motor controller in accordance with Embodiment 6 of the present invention will be described below. In Embodiment 6, when it is detected that a duty factor index is saturated, the output of the induced voltage reference value generation circuit is changed so that the phase of the current advances.

The control method of the brushless motor controller in accordance with Embodiment 6 will be described below.

Figure 23:
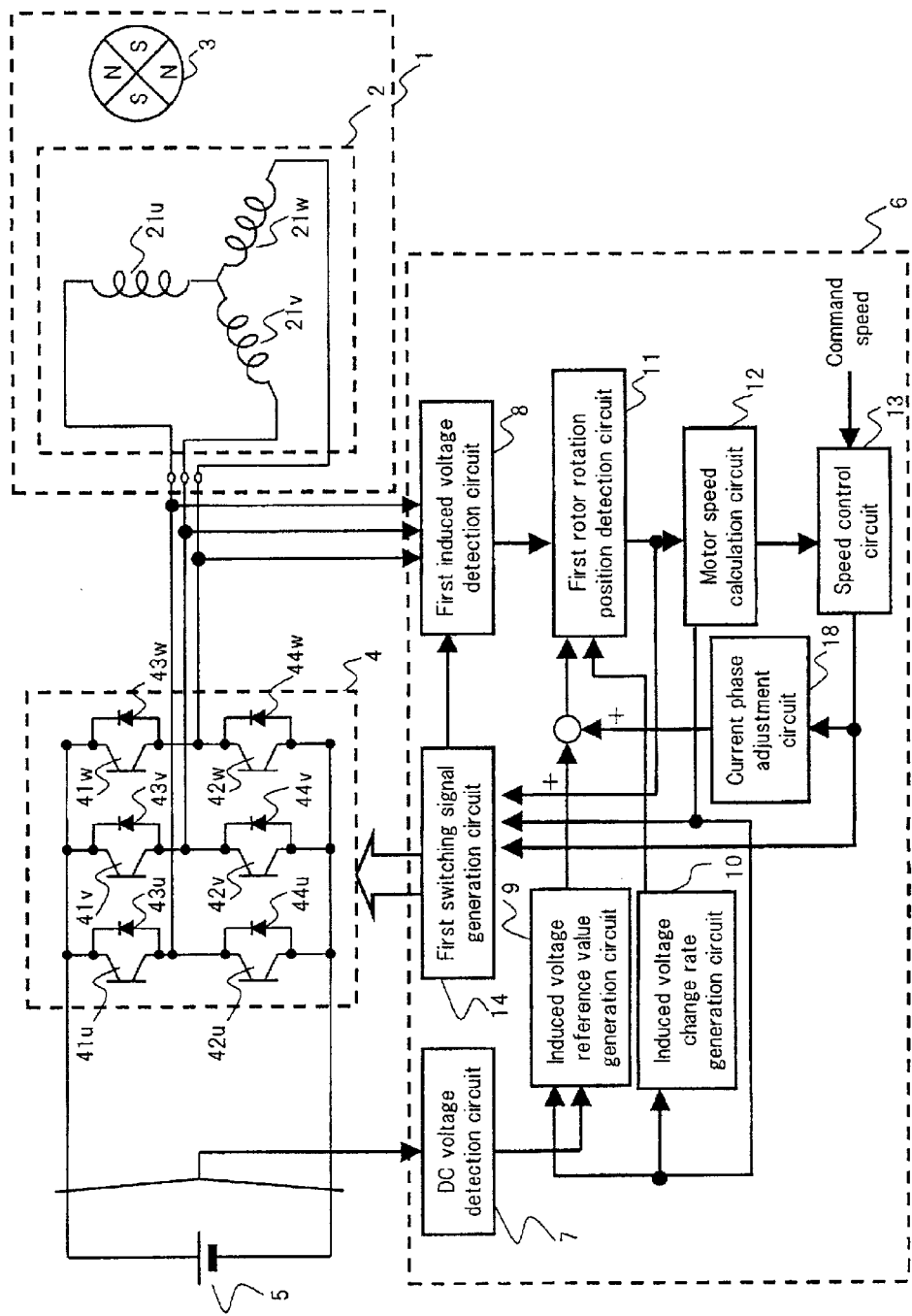
FIG. 23 is a block diagram showing a configuration of a brushless motor controller in accordance with Embodiment 6 of the present invention.

FIG. 23 is a block diagram showing a configuration of the brushless motor controller in accordance with Embodiment 6. In FIG. 23, the same components as those of the above-mentioned Embodiment 1 are designated by the same numerals as those used in FIG. 1, and their explanations are omitted.

The controller in accordance with Embodiment 6 is provided with a current phase adjustment circuit 18 in addition to the configuration of the above-mentioned Embodiment 1. The operation of the current phase adjustment circuit 18 will be described below.

The voltage induced by a magnet of the brushless motor are proportional to the motor speed. Since the induced voltage becomes high at a high speed, the voltage to be applied for flowing the motor current must also be raised. However, if the duty factor index is saturated, a voltage higher than the voltage corresponding to the saturated duty factor index cannot be applied. The motor speed is thus limited by the saturation of the duty factor index. It is known at this time that the maximum rotation speed is increased by advancing the phase of the current with respect to the induced voltage. In the controller in accordance with Embodiment 6, the induced voltage reference value can be changed, whereby the phase of the current can also be controlled.

Figure 24:
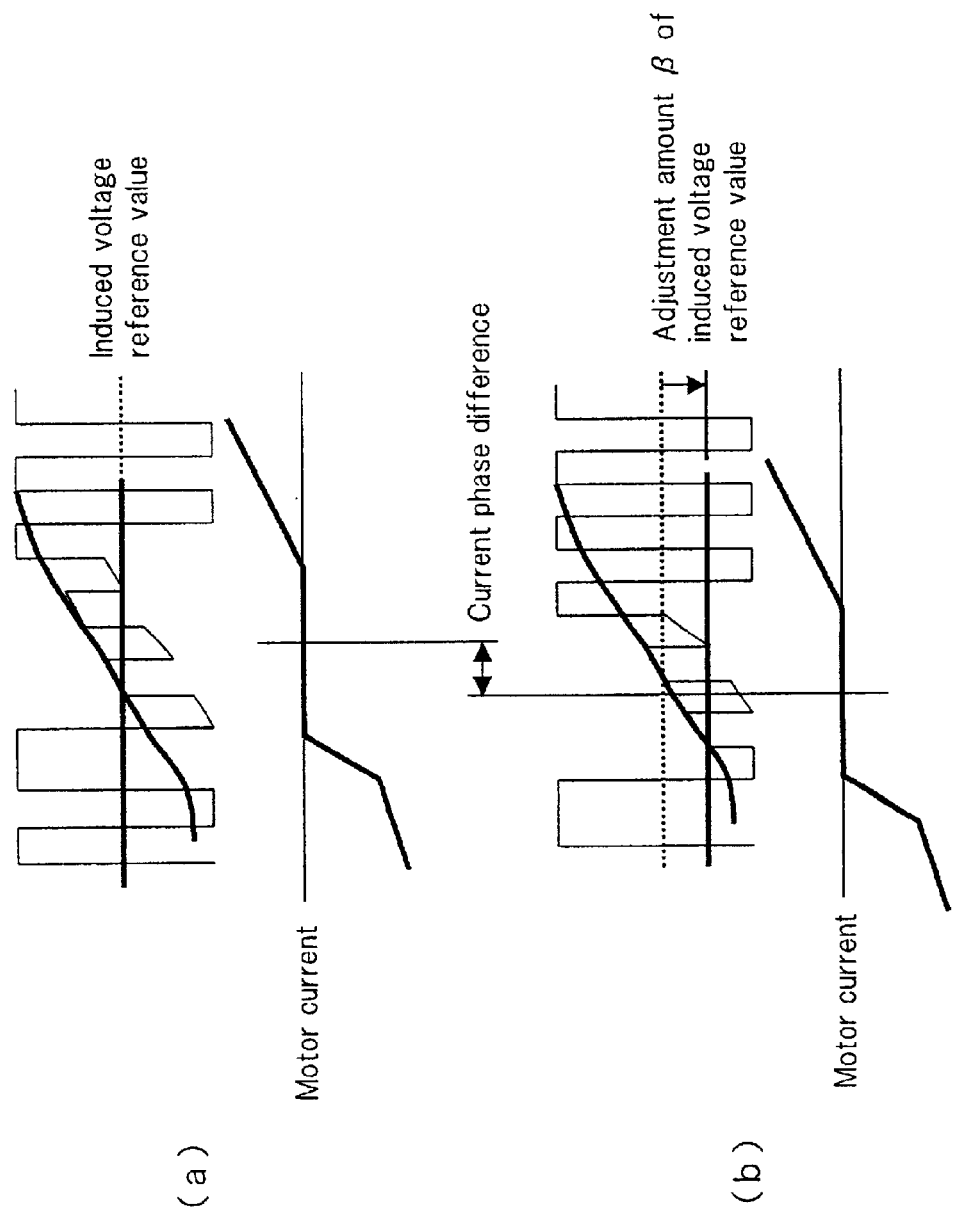
FIG. 24 is a view illustrating the relationship between the induced voltage and current phase depending on the induced voltage reference value in Embodiment 6.

FIG. 24 is a view illustrating the relationship between the induced voltage and the phase of the current depending on the induced voltage reference value in Embodiment 6.

In the parts (a) and (b) of FIG. 24, the induced voltage and the motor current are indicated. In the part (a), the induced voltage reference value is used as a level at which the intersection time is detected. In the part (b), a value obtained by adding an adjustment amount $\beta$ to the induced voltage reference value is used as a level at which the intersection time is detected. As understood according to FIG. 24, the phase of the current with respect to the induced voltage changes depending on the reference voltage at which the time of the intersection with the detected induced voltage is obtained. In FIG. 24, the phase of the current with respect to the induced voltage in the part (a) is more advanced than that in the part (b). By changing the adjustment amount $\beta$ to be added to the induced voltage reference value as described above, the phase of the current can be adjusted.

Figure 25:
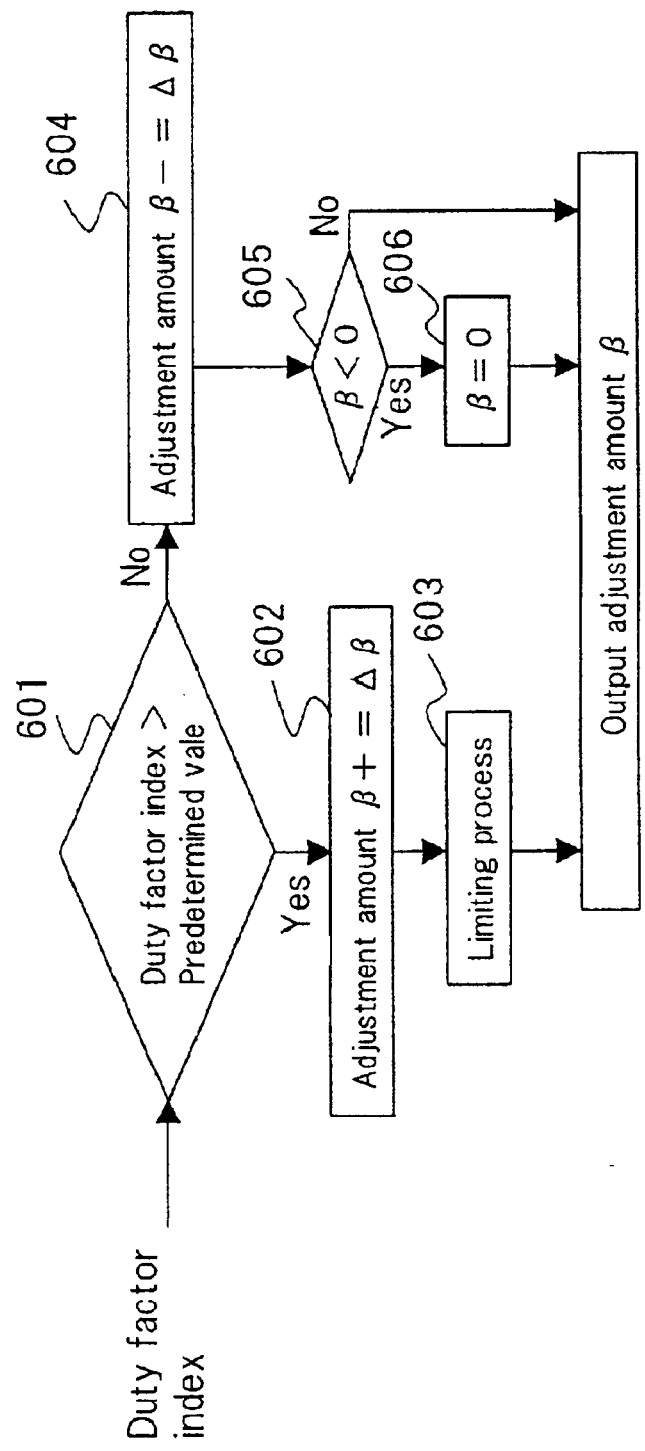
FIG. 25 is a flowchart for generating the adjustment amount of the induced voltage reference value in accordance with Embodiment 6.

Next, the operation of the current phase adjustment circuit 18 will be described below. FIG. 25 is a flowchart showing the operation of the current phase adjustment circuit 18.

When the duty factor index, i.e., the output of the speed control circuit 13, is input to the current phase adjustment circuit 18, a judgment is made at step 601 as to whether the duty factor index is a predetermined value or more. When the duty factor index is nearly saturated, the predetermined value used as a threshold value is set at a value close to saturation (for example, 90%) so that the current phase adjustment circuit 18 functions effectively.

If the duty factor index is the predetermined value or more at step 601, the adjustment amount $\beta$ is increased (at step 602). If the duty factor index is less than the predetermined value, the adjustment amount $\beta$ is decreased (at step 604).

However, if the increased adjustment amount $\beta$ is too large, it exceeds the maximum of the induced voltage. If the decreased adjustment amount $\beta$ becomes negative, the efficiency lowers. To solve this problem, a limiting process for limiting the increased adjustment amount $\beta$ within the maximum adjustment amount is carried out at step 603 after step 602. The current phase adjustment circuit 18 outputs the result of this limiting process as a new adjustment amount $\beta$.

On the other hand, a judgment is made at step 605 as to whether the decreased adjustment amount $\beta$ is negative or not. If the decreased adjustment amount $\beta$ is positive, the current phase adjustment circuit 18 outputs the adjustment amount $\beta$ without changing it. If the decreased adjustment amount $\beta$ is negative, the adjustment amount $\beta$ is set at zero at step 606 and then output.

The sum of the induced voltage reference value, i.e., the output of the induced voltage reference value generation circuit 9, and the adjustment amount $\beta$, i.e., the output of the current phase adjustment circuit 18, are input to the first rotor rotation position detection circuit 11. The time of the intersection of the induced voltage reference value and the induced voltage is obtained by the first rotor rotation position detection circuit 11.

The current phase adjustment circuit 18 in accordance with Embodiment 6 determines the adjustment amount on the basis of the duty factor index. However, in the case when the load state of the motor is almost determined by the speed of the motor, it is possible to obtain a motor speed wherein the duty factor index is saturated. Hence, an operation similar to that of the above-mentioned Embodiment 6 can also be carried out even when the adjustment amount is determined on the basis of the motor speed instead of the duty factor index and then output.

As described above, the brushless motor controller in accordance with Embodiment 6 can control the current phase with respect to the induced voltage of a given brushless motor, whereby the operation range of the motor can be extended. Magnetic detection means, such as Hall devices, are not necessary in order to detect the rotation position of the rotor 3.

Embodiment 7

Next, a brushless motor controller in accordance with Embodiment 7 of the present invention will be described below. In Embodiment 7, the time-series duty pattern of a duty factor in an energization period is generated so that the duty factor in a predetermined period from the start of the energization period becomes larger than the duty factor in a predetermined period to the end of the energization period. Because of this control method, the brushless motor controller in accordance with Embodiment 7 can apply a voltage suited for a load condition. As a result, the waveform of the current is made smooth, whereby highly efficient low-noise control can be attained.

The control method of the brushless motor controller in accordance with Embodiment 7 will be described below referring to the drawings.

Figure 26:
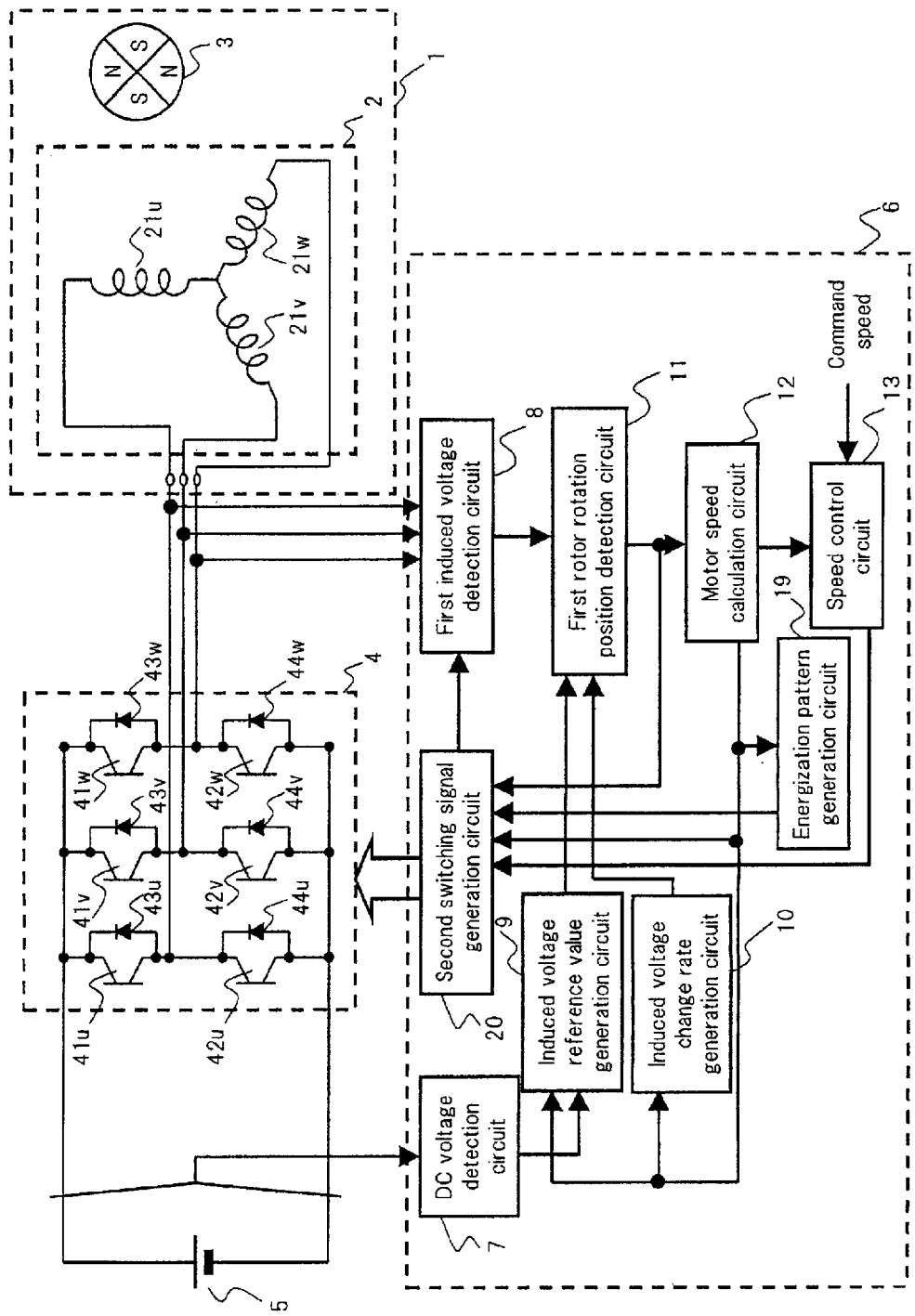
FIG. 26 is a block diagram showing a configuration of a brushless motor controller in accordance with Embodiment 7 of the present invention.

FIG. 26 is a block diagram showing the configuration of the brushless motor controller in accordance with Embodiment 7. In FIG. 26, the same components as those of the above-mentioned Embodiment 1 are designated by the same numerals as those used in FIG. 1, and their explanations are omitted.

The controller in accordance with Embodiment 7 is provided with a duty pattern generation circuit 19 in addition to the configuration of the above-mentioned Embodiment 1. In addition, a second switching signal generation circuit 20 is provided instead of the first switching signal generation circuit 14. The duty pattern generation circuit 19 generates a duty pattern depending on the motor speed and outputs the duty pattern to the second switching signal generation circuit 20. The second switching signal generation circuit 20 generates and outputs ON/OFF signals to the switching devices of the switching circuit 4 depending on the duty pattern, the rotation position of the rotor, the motor speed and the duty factor index.

The operation of the duty pattern generation circuit 19 will be described below in detail.

Figure 27:
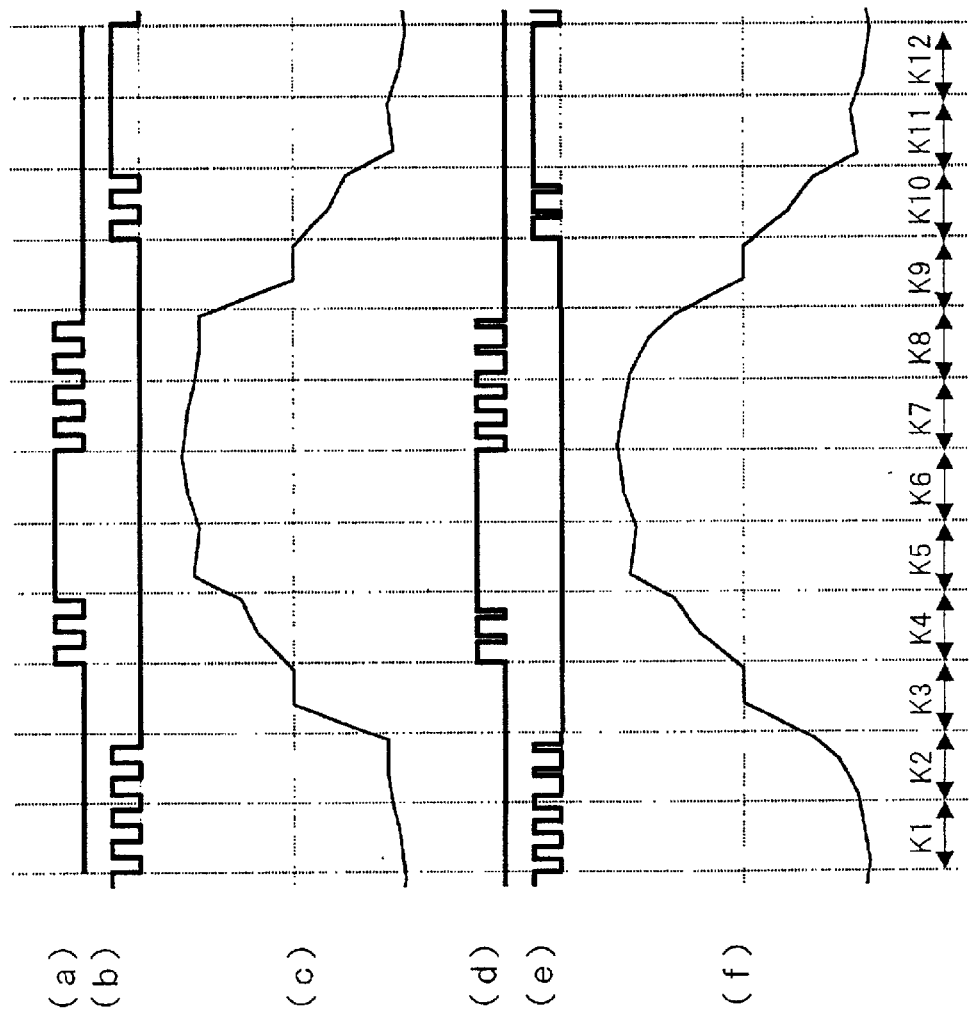
FIG. 27 is a view showing the waveforms of signals input to the switching devices and windings in accordance with Embodiment 7; the part (a) shows an ON/OFF signal input to the U-phase upstream-side switching device in the case when the duty factors in pulse width modification periods are identical with the duty factor index; the part (b) shows an ON/OFF signal input to the U-phase downstream-side switching device in the case when the duty factors in pulse width modification periods are identical with the duty factor index; the part (c) shows the waveform of the U-phase current in the case when the ON/OFF signals supplied to the U-phase are those shown in the parts (a) and (b); the part (d) shows an ON/OFF signal input to the U-phase upstream-side switching device in the case when the duty factors in pulse width modification periods are different from the duty factor index; the part (e) shows an ON/OFF signal input to the U-phase downstream-side switching device in the case when the duty factors in pulse width modification periods are different from the duty factor index; and the part (f) shows the waveform of the U-phase current in the case when the ON/OFF signals supplied to the U-phase are those shown in the parts (a) and (b)

FIG. 27 is a view showing a change in the waveform of the current depending on the duty pattern. The part (a) of FIG. 27 shows an ON/OFF signal supplied to the upstream-side switching device 41$u$ in the case when the duty factors in all pulse width modification periods are identical. The part (b) of FIG. 27 shows an ON/OFF signal supplied to the downstream-side switching device 42$u$ in the case when the duty factors in all pulse width modification periods are identical. The part (c) of FIG. 27 shows the waveform of the phase current of the U-phase winding in the above-mentioned cases shown at the parts (a) and (b) of FIG. 27. The parts (d) and (e) of FIG. 27 show the waveforms of the ON/OFF signals supplied to the upstream-side switching device 41$u$ and the downstream-side switching device 42$u$, respectively, when the duty factors in periods K4 and K10 are the duty factor index +30%, when the duty factors in periods K2 and K8 are the duty factor index −30%, and when the duty factors in periods K1 and K7 are identical to the duty factor index. The part (f) of FIG. 27 shows the waveform of the current of the U-phase winding in the above-mentioned cases shown at the parts (d) and (e) of FIG. 27. As understood by comparison between the current waveform in the part (c) of FIG. 27 and the current waveform in the part (f) of FIG. 27, the current waveform in the part (f) of FIG. 27 becomes close to a sine wave. At this time, the induced voltage values detected in periods K3 and K9 have the same form, although they are not shown. In other words, the phase difference of the current waveform shown in the part (c) of FIG. 27 with respect to the induced voltage is the same as that of the current waveform shown in the part (f) of FIG. 27 with respect to the induced voltage.

The efficiency of the motor is considered herein. The induced voltage, current and phase difference greatly contribute to the efficiency. As can be understood from FIG. 27, the waveform of the current can be made smooth by changing the duty pattern, without changing the phase difference between the induced voltage and the current. For this reason, the controller in accordance with Embodiment 7 can attain low-vibration low-noise operation while maintaining high efficiency.

Figure 28:
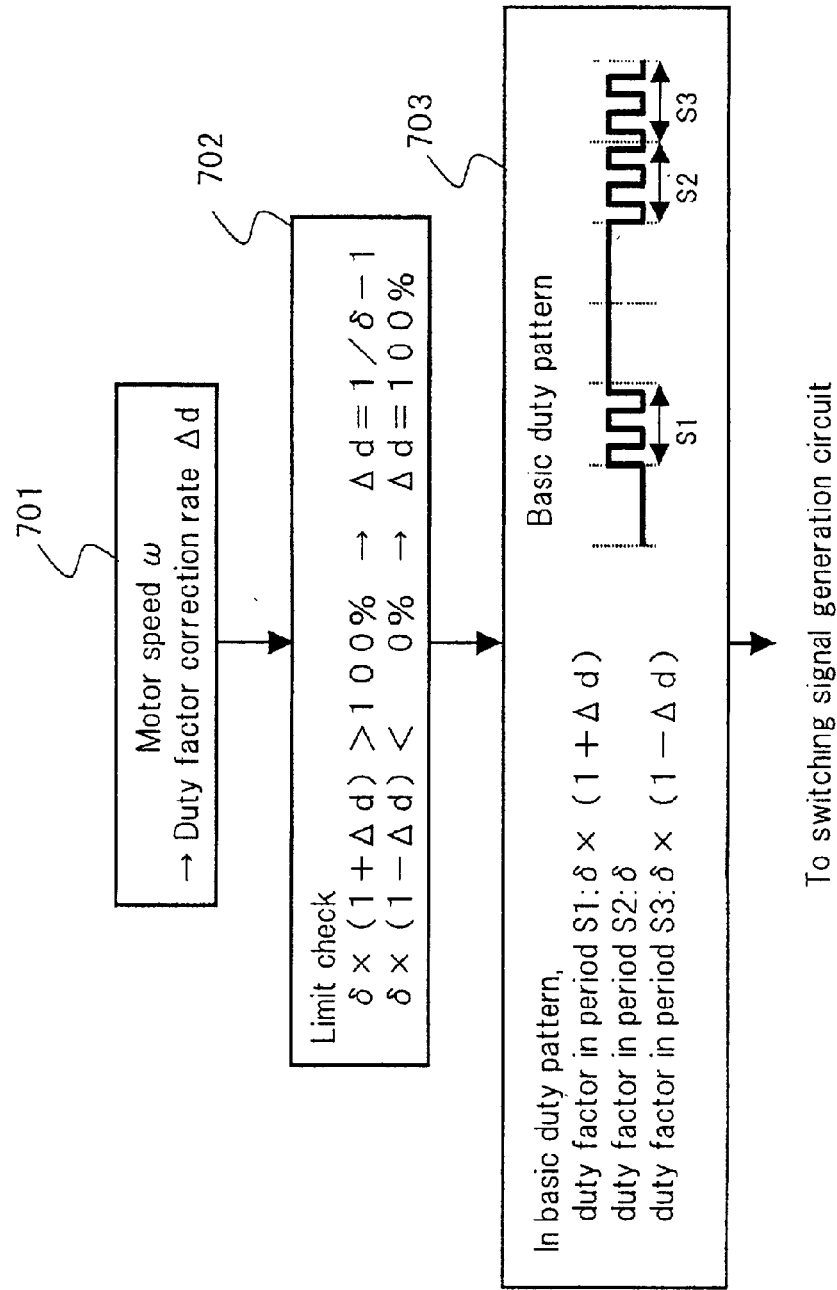
FIG. 28 is a flowchart for controlling a duty pattern generation circuit in accordance with Embodiment 7.

Next, the operation of the duty pattern generation circuit 19 in Embodiment 7 will be described below referring to the flowchart shown in FIG. 28.

At step 701, a duty factor correction rate $\Delta d$ is calculated from the motor speed $\omega$. As a calculation method, for example, the duty factor correction rate $\Delta d$ with respect to the motor speed, indicated in the table shown in FIG. 29, is obtained.

At step 702, it is necessary that the value of the duty factor $\delta$ corrected by the duty factor correction rate, that is, $\delta \times (1 \pm \Delta d)$, does not become less than 0% or more than 100%. Therefore, at step 702, a judgment is made as to whether the obtained duty factor correction rate $\Delta d$ exceeds the limit values or not.

At step 703, in a basic duty pattern having an energization period of 150 degrees in an electrical angle of 180 degrees, the duty factor in the first 30-degree period of the energization period is set at $\delta \times (1+\Delta d)$, and the duty factor in the last 30-degree period of the energization period is set at $\delta \times (1-\Delta d)$. In this way, a new duty pattern is generated. The duty pattern generated as described above is output to the second switching signal generation circuit 20.

As described above, the controller in accordance with Embodiment 7 is provided with the duty pattern generation circuit 19, whereby the waveform of the current supplied to the brushless motor 1 is improved. As a result, noise and vibration can be reduced, and highly efficient operation can be attained.

The duty pattern generation circuit 19 in accordance with Embodiment 7 uses the table values with respect to the motor speed, indicated in the table shown in FIG. 29. In the case when the brushless motor 1 is an embedded magnet brushless motor, the induced voltage changes depending on the motor speed and the motor current. In addition, the motor current relates to the duty factor index. Hence, when the influence of the change in the duty factor index within the operation range of the motor cannot be ignored, an effect similar to that of the above-mentioned Embodiment 7 is obtained by generating and using the values depending on the motor speed and the duty factor index in the table shown in FIG. 30.

In addition, the duty pattern generation circuit 19 in accordance with Embodiment 7 has the duty pattern having an energization period of 150 degrees as the basic duty pattern. However, a similar effect is also obtained even when a duty pattern having an energization period of 120 degrees or more and less than 180 degrees is used as the basic duty pattern.

Furthermore, the duty pattern generation circuit 19 in Embodiment 7 carries out setting so that the duty factor in the 30-degree period from the start of the energization becomes larger than the duty factor in the 30-degree period to the end of the energization. However, a similar effect is also obtained even when the duty factor is changed depending on the energization period in an electrical angle of 180 degrees.

Figure 31:
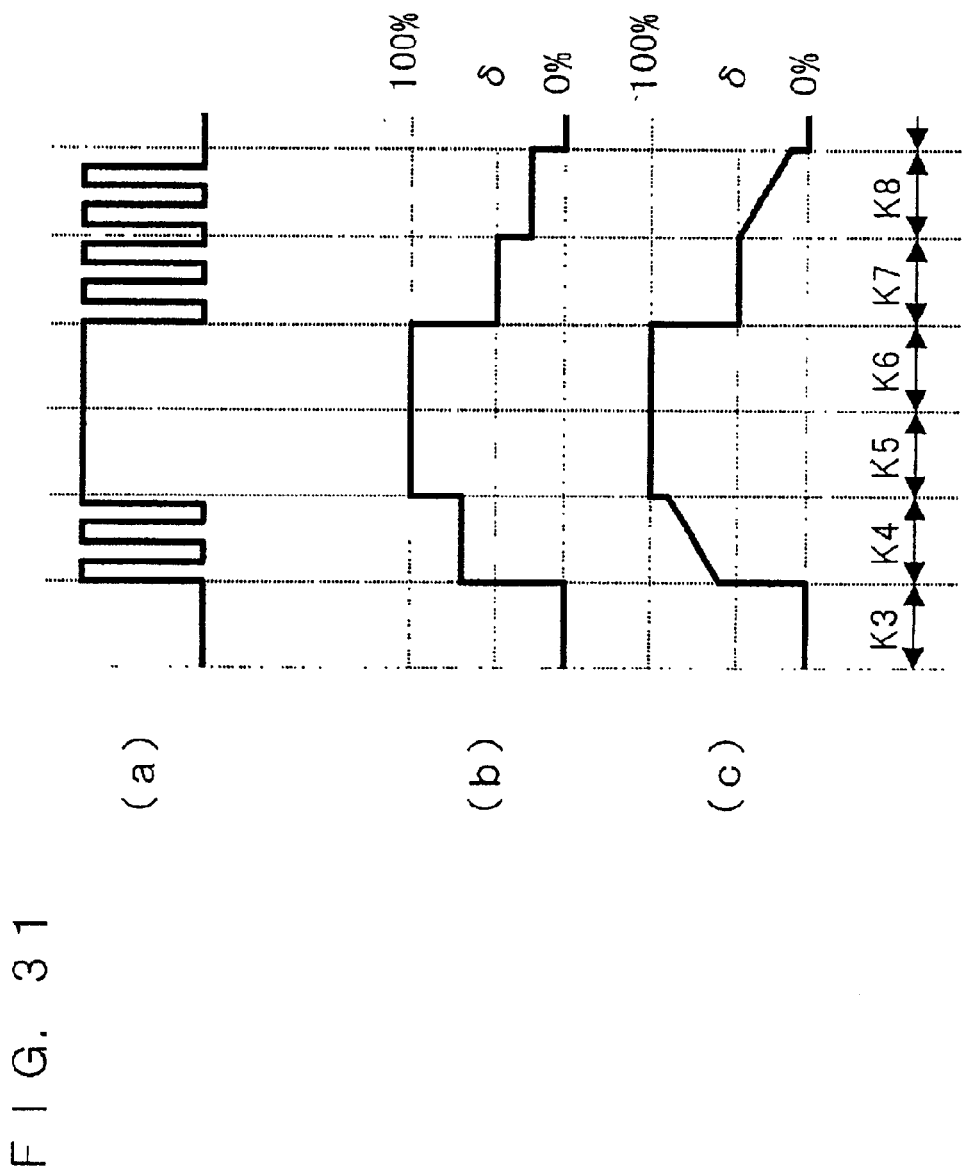
FIG. 31 is a signal waveform graph showing a basic duty pattern and changed duty patterns in accordance with Embodiment 7; the part (a) shows the basic duty pattern, the part (b) shows a duty pattern generated by increasing/decreasing the duty factor by a constant amount after the start and before the end of the duty pattern; and the part (c) shows a duty pattern generated by increasing/decreasing the duty factor by non-constant amounts after the start and before the end of the duty pattern.

Still further, the duty pattern generation circuit 19 in Embodiment 7 has been explained by taking an example wherein a constant amount is added to the duty factor index to obtain the duty factor in the predetermined period from the start of the energization. However, the amount to be added is not required to be constant. The part (a) of FIG. 31 shows an ON/OFF signal supplied to the switching device in a phase, and the part (b) shows a duty pattern indicating the duty factor index δ. In the above-mentioned Embodiment 7, the duty factor is raised and lowered by the constant amount in periods K4 and K8. However, a similar effect is obtained even when the duty factor is changed so as to have an inclination in the periods K4 and K8, as shown in the duty pattern in the part (c) of FIG. 31.

As described above, the brushless motor controller in accordance with Embodiment 7 can perform highly efficient low-vibration low-noise operation for a given brushless motor. Magnetic detection means, such as Hall devices, are not necessary in order to detect the rotation position of the rotor 3.

Embodiment 8

Next, a brushless motor controller in accordance with Embodiment 8 of the present invention will be described below. In the brushless motor controller in accordance with Embodiment 8, the induced voltage values detected before a predetermined time passes after the judgment of the end of reflux are not used as data for detecting the position of the rotor. With this configuration, the time of the intersection of the induced voltage and the induced voltage reference value can be detected properly, whereby stable brushless motor driving can be attained.

The control method of the brushless motor controller in accordance with Embodiment 8 will be described below.

Figure 32:
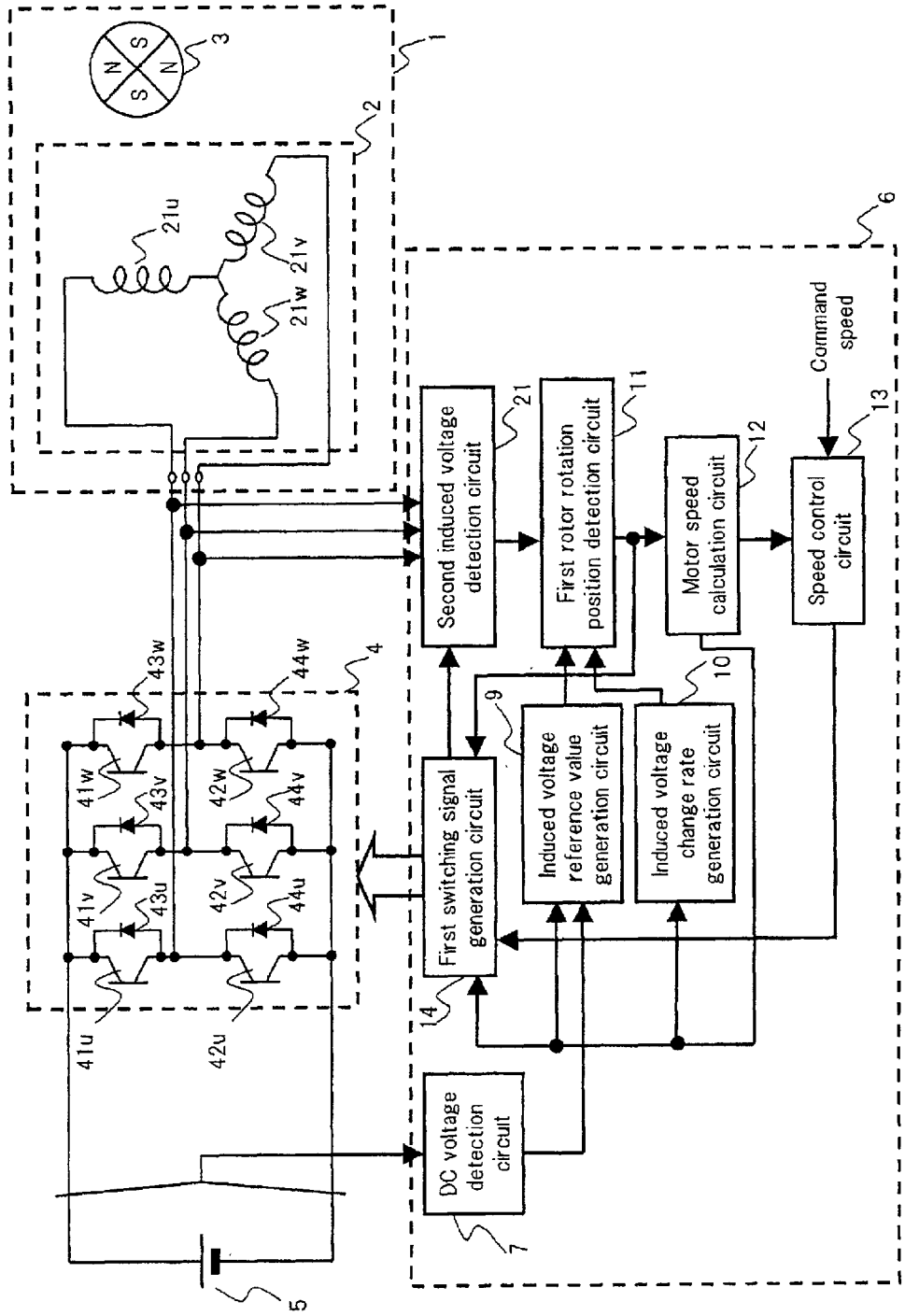
FIG. 32 is a block diagram showing a configuration of a brushless motor controller in accordance with Embodiment 8 of the present invention.

FIG. 32 is a block diagram showing the configuration of the brushless motor controller in accordance with Embodiment 8. In FIG. 32, the same components as those of the above-mentioned Embodiment 1 are designated by the same numerals as those used in FIG. 1, and their explanations are omitted.

The controller in accordance with Embodiment 8 is provided with a second induced voltage detection circuit 21 instead of the first induced voltage detection circuit 8.

The operation of the second induced voltage detection circuit 21 will be described below in detail.

Figure 33:
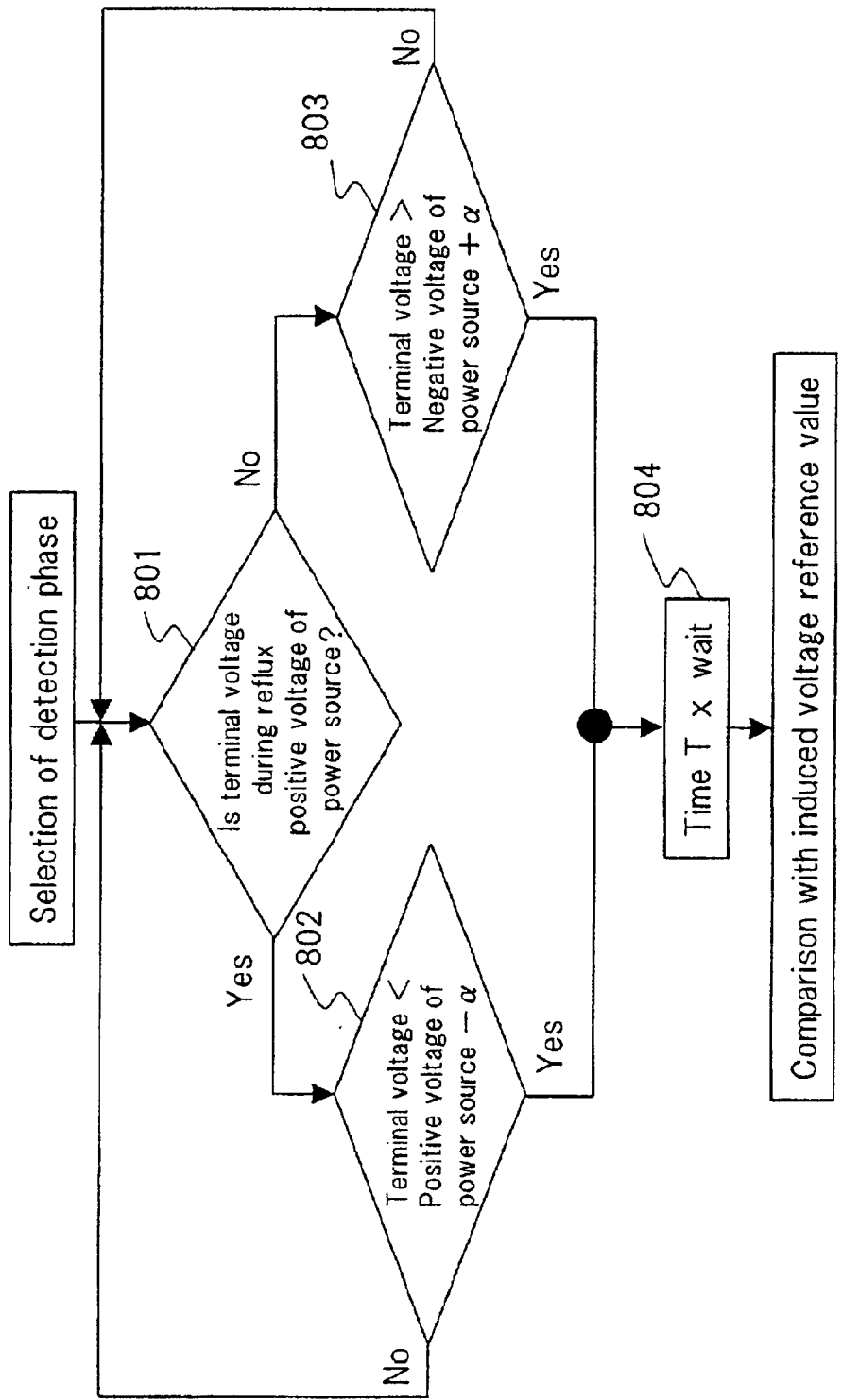
FIG. 33 is a flowchart for obtaining an effective induced voltage in accordance with Embodiment 8.

The induced voltage for detecting the position of the rotor is generated when both the two switching devices in a phase are OFF and when no current flows through the winding in the same phase. However, immediately after the selection of the induced voltage detection phase, a reflux state occurs, that is, a current flows through the diodes connected reversely in parallel with the switching devices and through the winding. In this reflux state, the voltage at the terminal becomes the positive or negative voltage of the power source depending on the direction of the current. When the terminal voltage changes from this state, it can be judged that the reflux state is ended. After this, the position of the rotor can be detected depending on the detected induced voltage. Owing to the response performance and the like of the switching devices and the diodes, the actual terminal voltage does not change to an effective induced voltage level immediately, but the change requires a certain time. Hence, it is necessary to judge the position of the rotor without using the induced voltage values detected during the change. For this purpose, the second induced voltage detection circuit 21 carries out the process shown in FIG. 33. FIG. 33 is a flowchart showing the operation of the second induced voltage detection circuit 21.

First, after the selection of the induced voltage detection phase, the terminal voltage is detected, and a judgment is made as to whether the voltage is the positive or negative voltage of the power source (at step 801). The reflux ends after the detection of the terminal voltage is carried out multiple times, and the level of the terminal voltage begins to change. After it is detected that the terminal voltage has changed by the amount of the predetermined value α or more at step 802 or step 803, a wait state occurs for the time Tx during which the terminal voltage is not detected. α is herein set at a value not causing factors resulting in improper judgments, such as noise. For example, α is set at 10% of the voltage of the power source. The time Tx is set at a period so that a transient state, in which the terminal voltage begins to change but is lower than the induced voltage value effective for the judgment of the rotor position, can be neglected. After the time Tx has passed, the induced voltage is detected again and compared with the induced voltage reference value.

Figure 34:
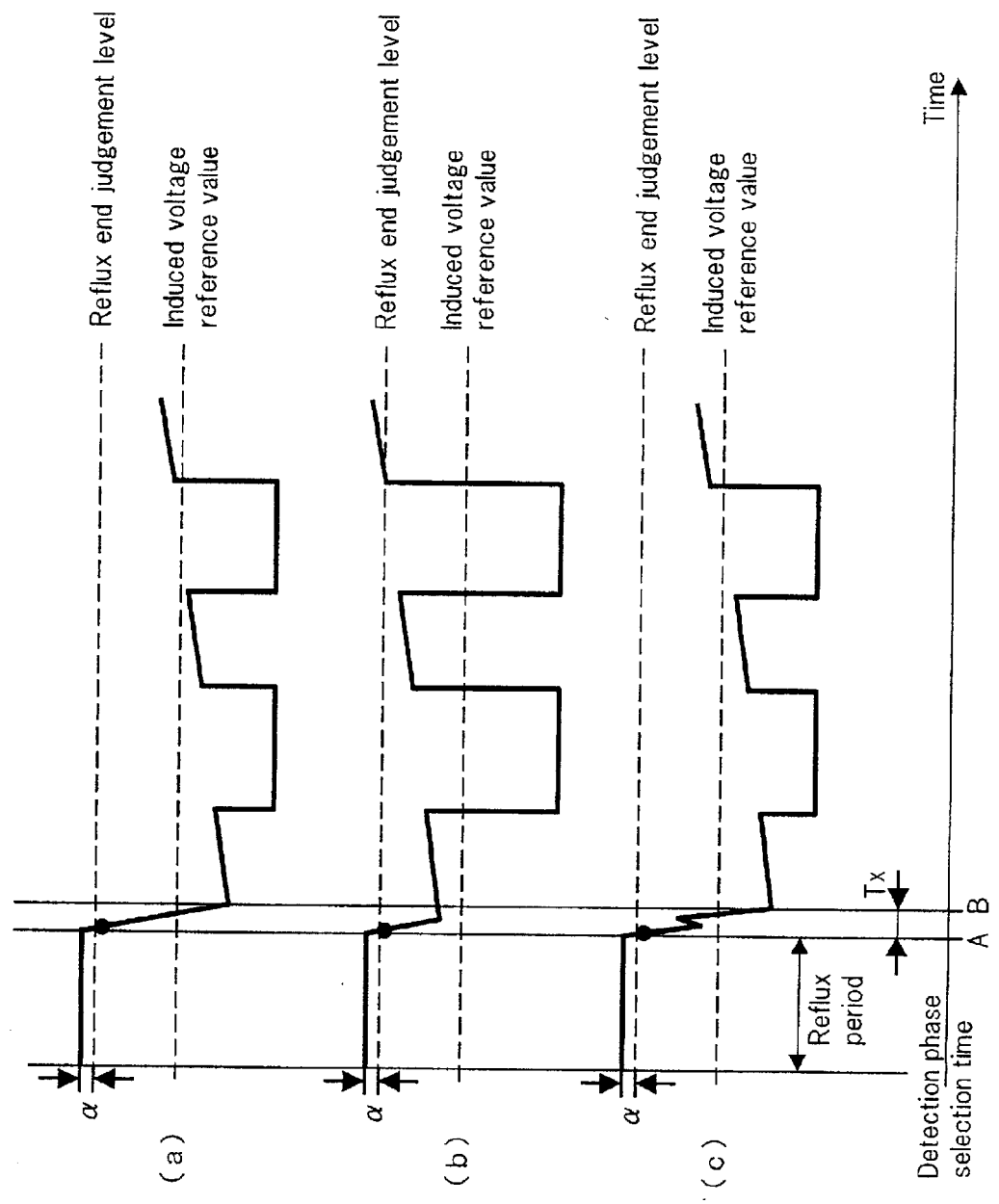
FIG. 34 shows terminal voltage waveforms in accordance with Embodiment 8; the part (a) shows a terminal voltage waveform in the case when the time of the intersection with an induced voltage threshold value is present after reflux; the part (b) shows a terminal voltage waveform in the case when the induced voltage has already exceeded the induced voltage threshold value after the reflux; and the part (c) shows a terminal voltage waveform in the case when noise enters after the reflux.

FIG. 34 shows a state after the selection of the terminal voltage detection phase of the induced voltage detection phase. In FIG. 34, the part (a) of FIG. 34 shows a state wherein the detected induced voltage intersects the induced voltage reference value after the reflux. The part (b) shows a state wherein the detected induced voltage does not intersect the induced voltage reference value after the reflux. The part (c) shows a state wherein the detected induced voltage intersects the induced voltage reference value after the reflux but noise is included after the reflux.

In any one of these cases, the end of the reflux is judged at time A. After the wait state in the time Tx, the induced voltage detected at time B and thereafter is output to the first rotor rotation position detection circuit 11. The detected induced voltage is the effective induced voltage that can be used for the comparison with the induced voltage reference value. As a result, the position of the rotor can be obtained properly.

Even when the time from the selection of the detection phase to the end of the reflux changes owing to a change in load or the like, the delay of the detection of the effective induced voltage is reduced by the operation of the second induced voltage detection circuit 21. In particular, when the induced voltage has already exceeded the induced voltage reference value at time B after the wait state in the time Tx as shown in the part (b) of FIG. 34, that is, when the detection has already delayed from the true time of the intersection of the induced voltage and the induced voltage reference value, the delay of the detection can be minimized. Hence, a time allowance is provided before the next switching state selection time, whereby the stability of the detection is enhanced.

In Embodiment 8, the terminal voltage is not detected in the time Tx after the judgment of the end of the reflux state. However, even if the terminal voltage is detected, if the terminal voltage is not used as a value to be compared with the induced voltage reference value, a similar effect is obtained.

As described above, the brushless motor controller in accordance with Embodiment 8 can properly detect the time of the intersection of the induced voltage and the induced voltage reference value for a given brushless motor, and can stably drive the motor. Magnetic detection means, such as Hall devices, are not necessary in order to detect the rotation position of the rotor.

Figure 35:
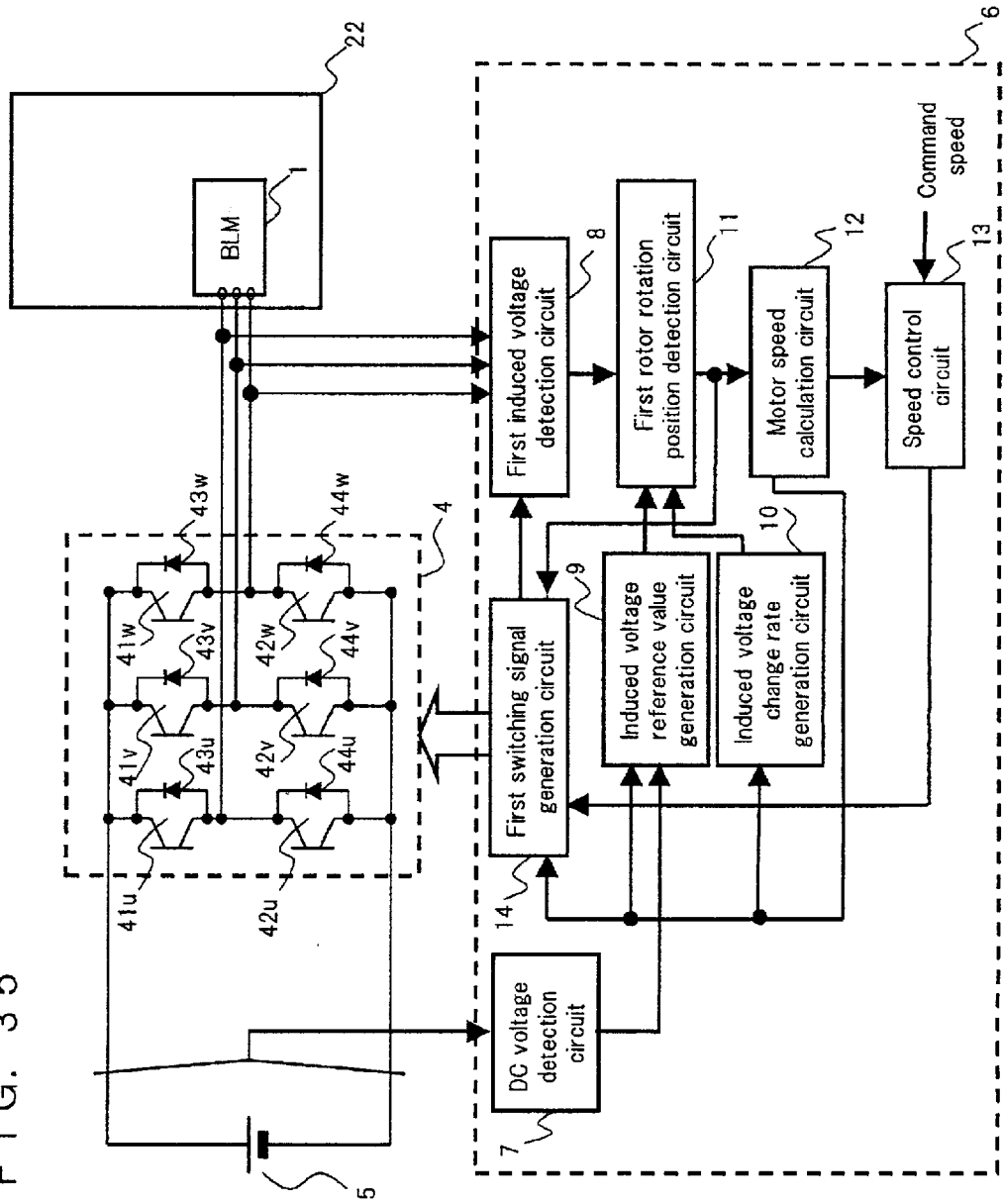
FIG. 35 is a block diagram showing a compressor comprising the brushless motor controller in accordance with the present invention.

In addition, a compressor may be controlled by using the brushless motor control method and controller in accordance with each embodiment of the present invention. For example, FIG. 35 is a block diagram showing an example wherein the controller of the brushless motor (BLM) 1 explained in the above-mentioned Embodiment 1 is used to control a compressor 22.

The compressor 22 has an enclosed structure and becomes high in temperature during operation. In order to ensure reliability, position sensors should not be installed.

In accordance with the present invention, magnetic detection means, such as Hall devices, are not necessary in order to detect the rotation position of the rotor. Furthermore, even when only one induced voltage value is detected, the rotation position of the rotor can be detected accurately. Hence, the compressor 22 can be driven reliably by using a given brushless motor 1. In particular, when wide-angle energization is carried out for the compressor 22 driven by an embedded magnet brushless motor, the rotation position of the rotor can be detected accurately. As a result, the compressor can be driven at low noise and at low vibration.

Figure 36:
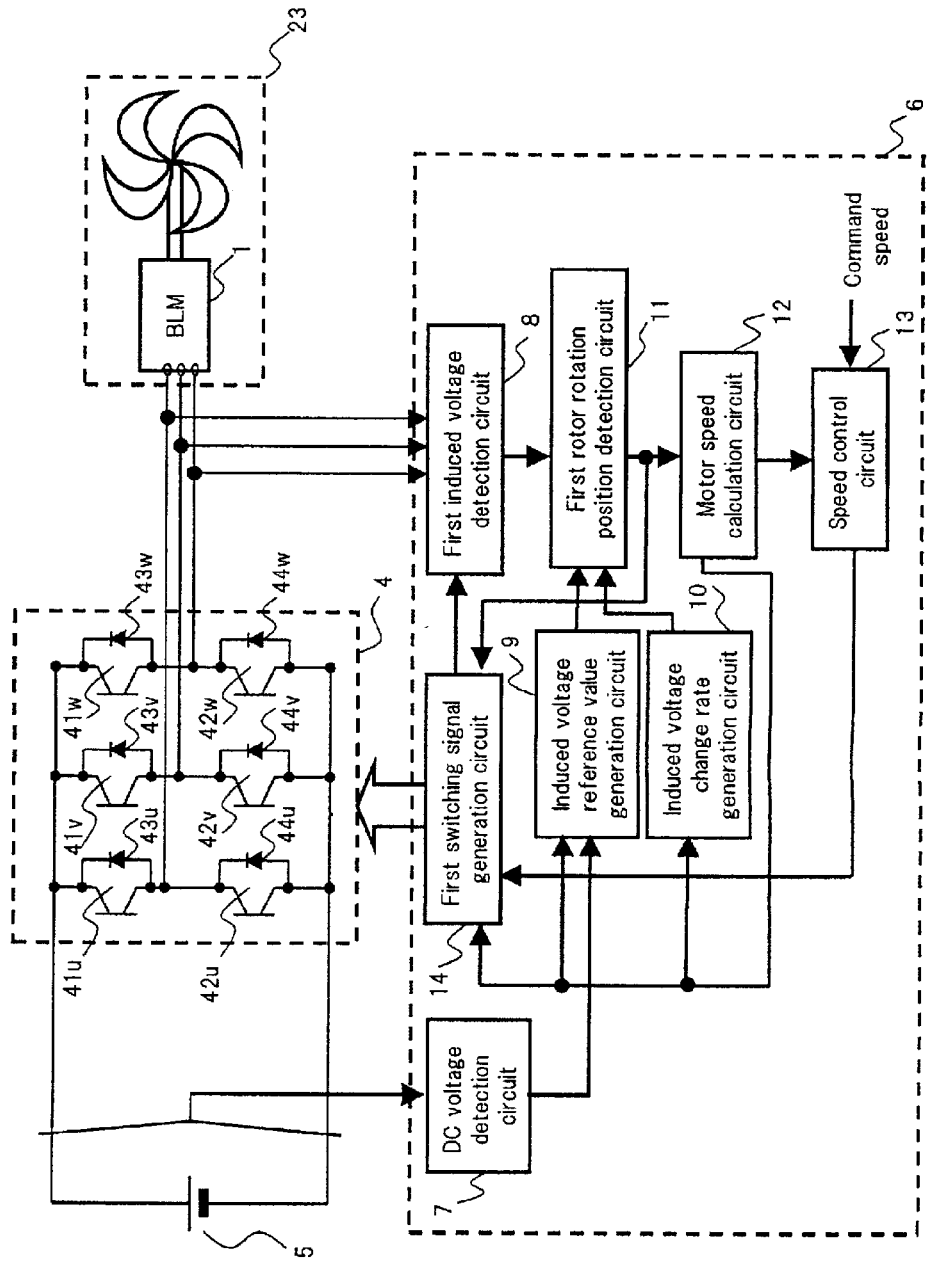
FIG. 36 is a block diagram showing a fan comprising the brushless motor controller in accordance with the present invention.

Furthermore, a fan may be controlled by using the brushless motor control method and controller in accordance with each embodiment of the present invention. For example, FIG. 36 is a block diagram showing an example wherein the controller of the brushless motor (BLM) 1 explained in the above-mentioned Embodiment 1 is used to control a fan 23.

In accordance with the present invention, magnetic detection means, such as Hall devices, are not necessary in order to detect the rotation position of the rotor. Even when only one induced voltage value is detected, the rotation position of the rotor can be detected accurately. Hence, even when a given brushless motor is used, the cost for rotation position detection means, such as rotor rotation position detection sensors, is not necessary. For this reason, a fan produced at low cost can be driven accurately. In particular, when wide-angle energization is carried out for a fan driven by an embedded magnet brushless motor, the rotation position of the rotor can be detected accurately. As a result, the fan can be driven at low noise and at low vibration.

Figure 37:
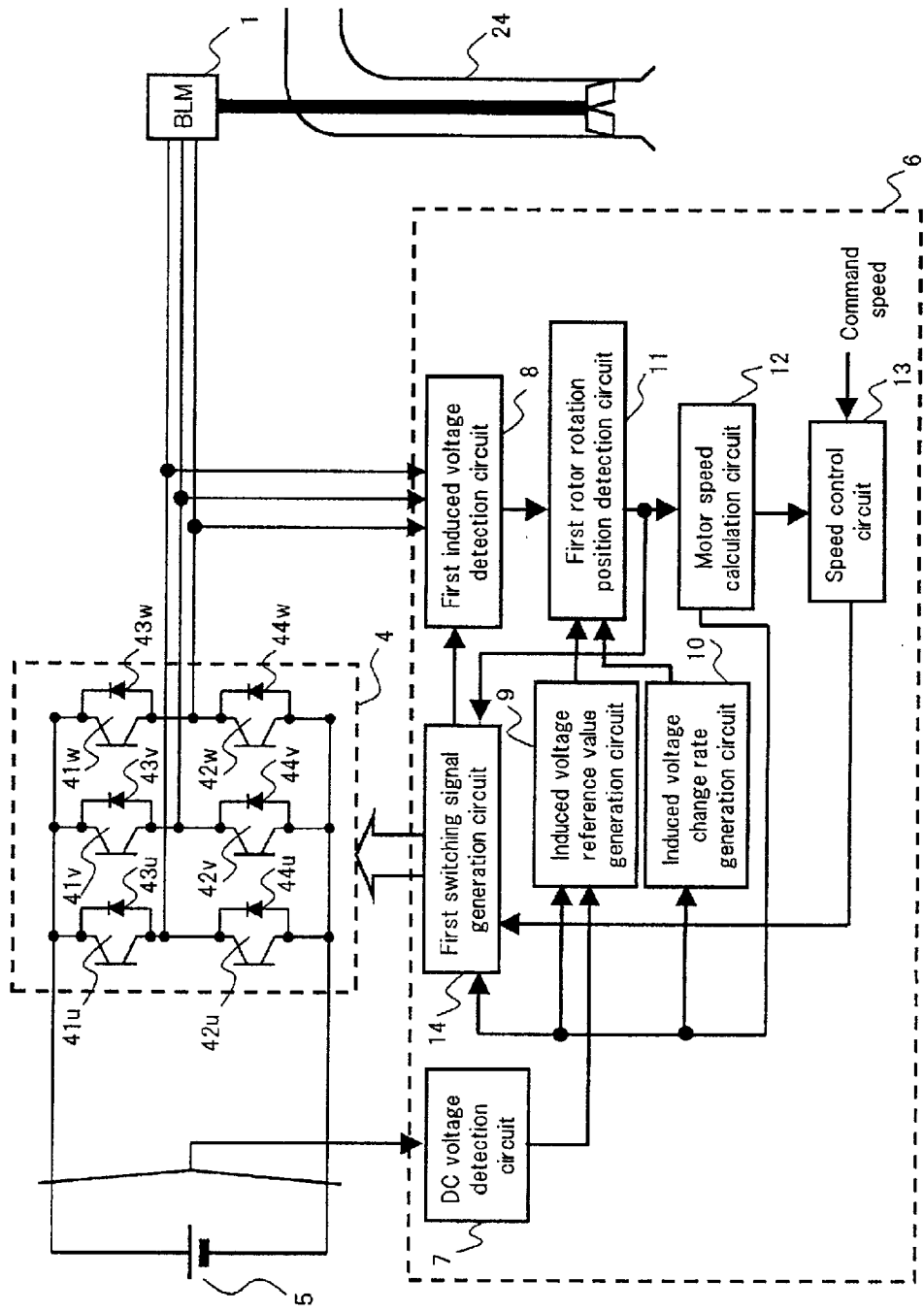
FIG. 37 is a block diagram showing a pump comprising the brushless motor controller in accordance with the present invention.
Figure 38:
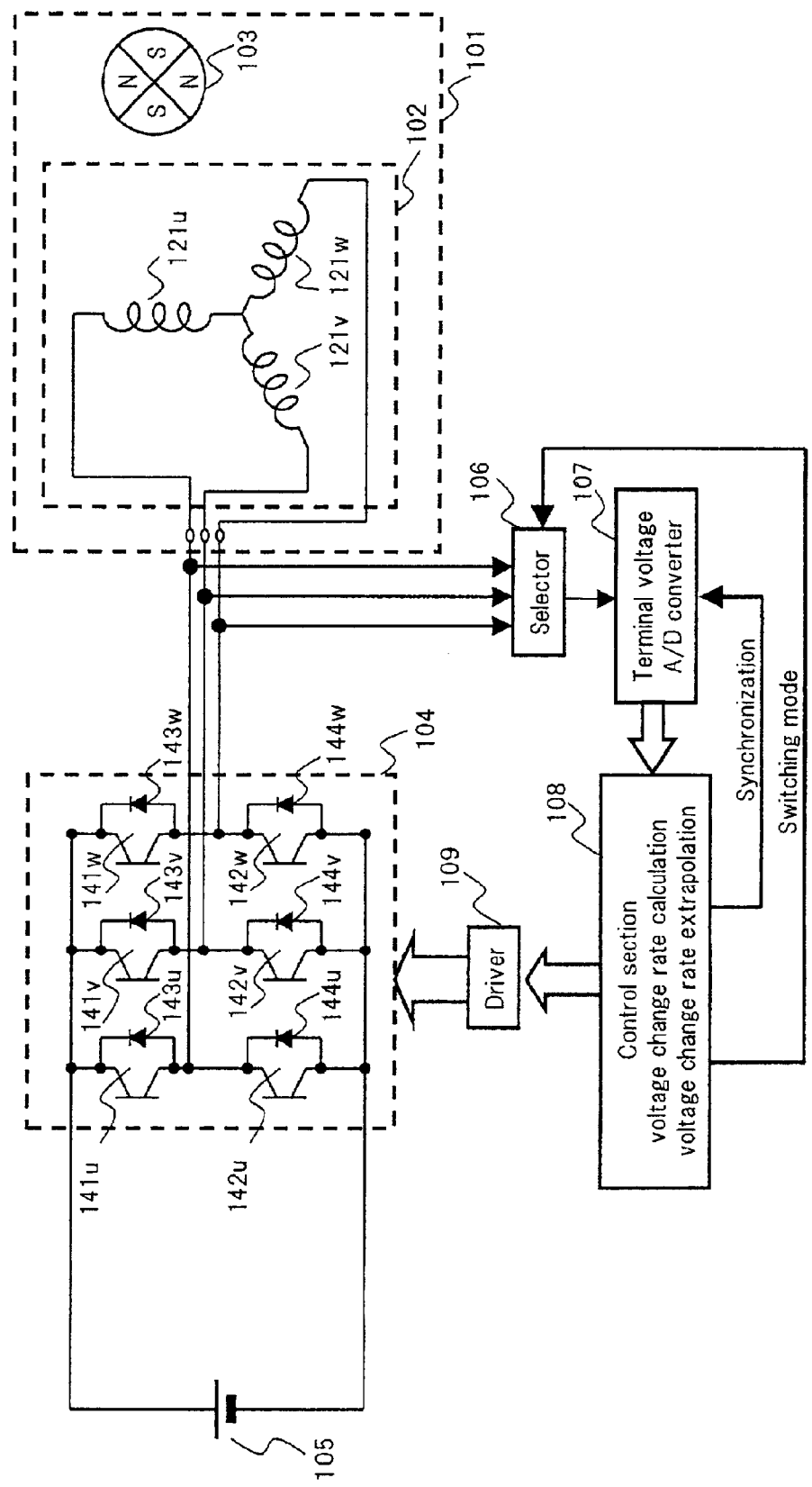
FIG. 38 is the block diagram showing the configuration of the conventional brushless motor controller.
Figure 39:
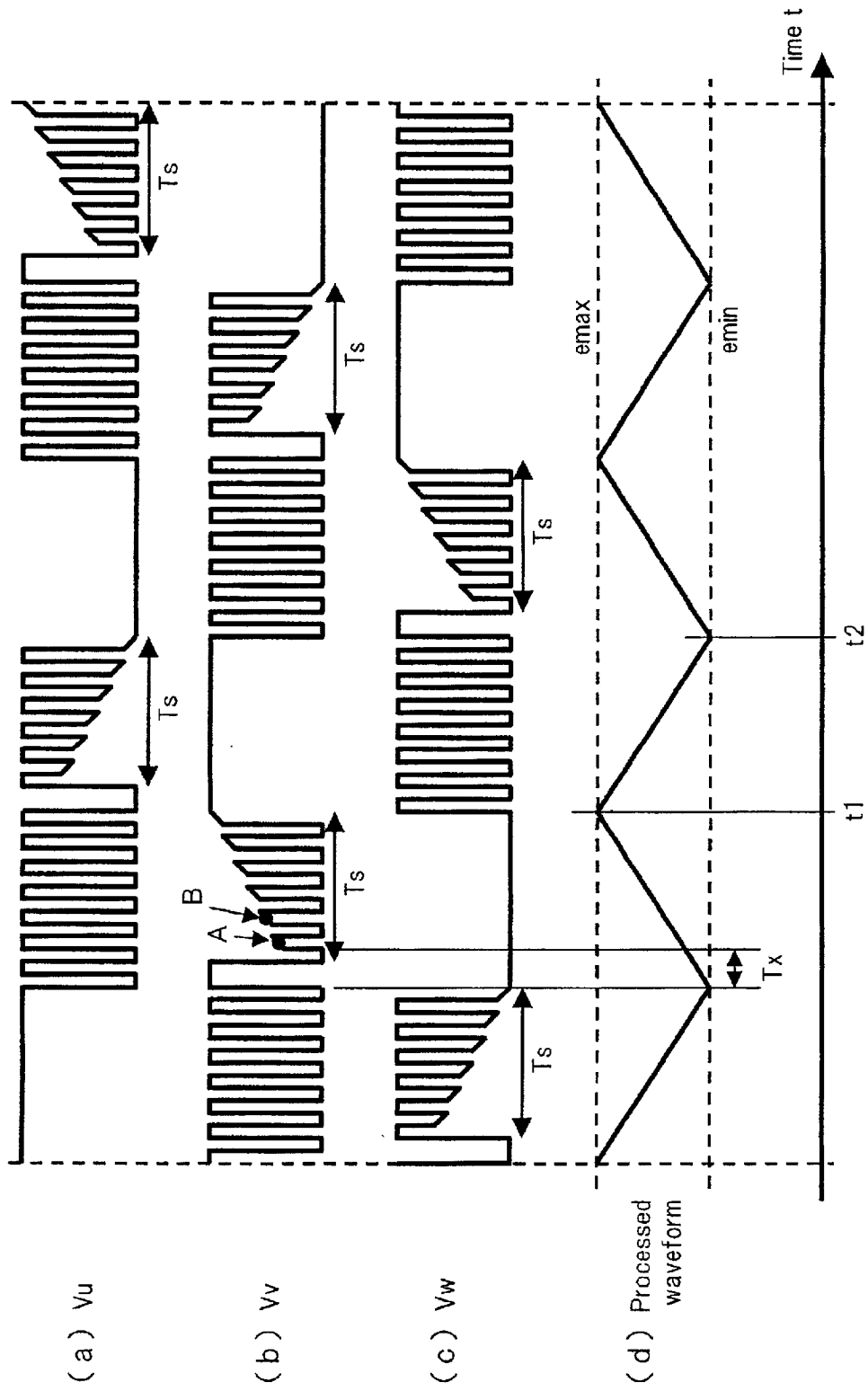
FIG. 39 is the view showing the waveform of the voltage appearing at the terminal in each phase and the waveform obtained by subjecting the effective induced voltage value to extrapolation in the conventional brushless motor controller; the part (a) shows the waveform of the terminal voltage generating in the U phase; the part (b) shows the waveform of the terminal voltage generating in the V phase; the part (c) shows the waveform of the terminal voltage generating in the W phase; and the part (d) shows the waveform of the waveform obtained by subjecting the effective induced voltage value in each phase to extrapolation with respect to the change rate with time.
Figure 40:
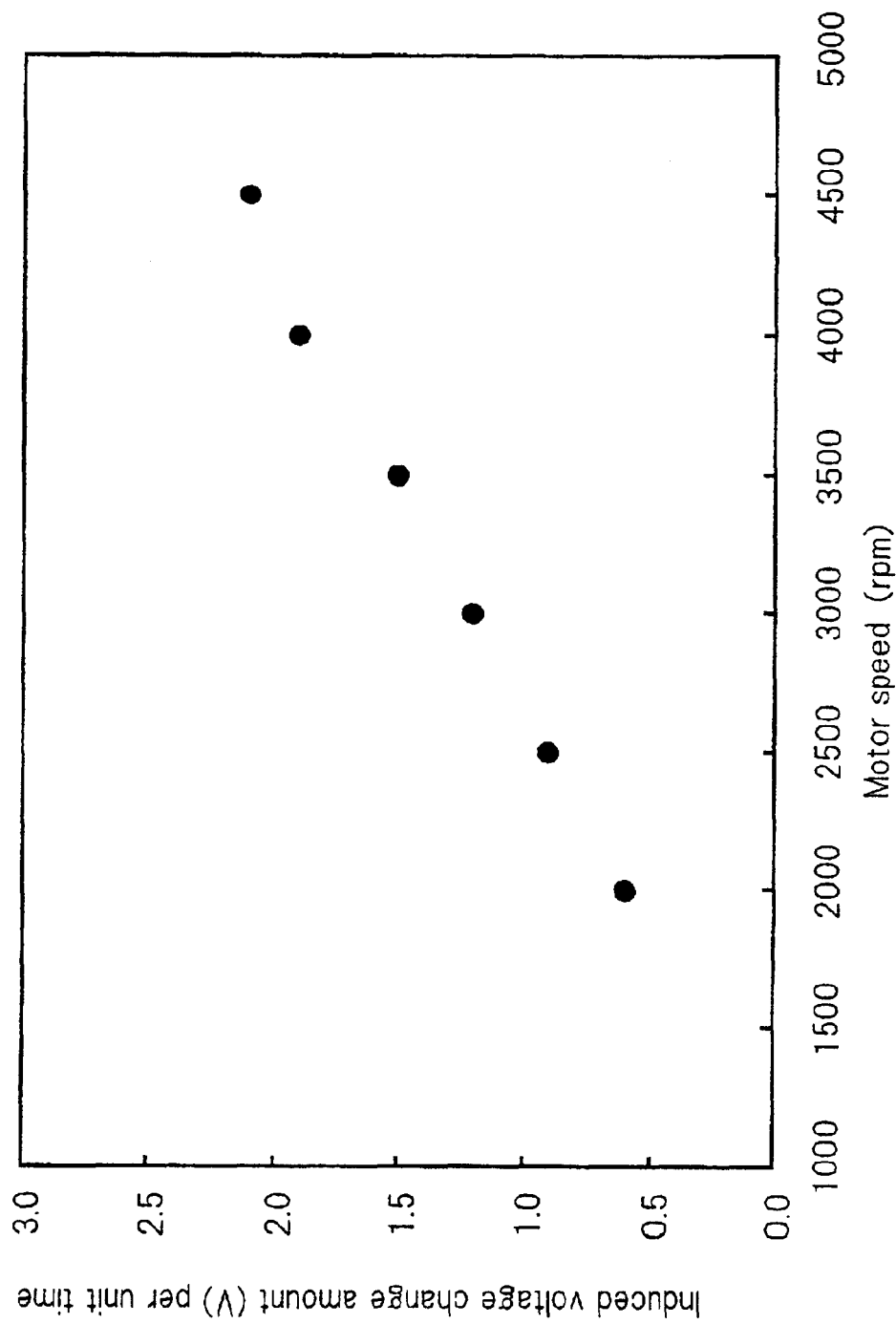
FIG. 40 is the graph showing the terminal voltage change amount per unit time in the conventional brushless motor controller.

Still further, a pump may be controlled by using the brushless motor control method and controller in accordance with each embodiment of the present invention. For example, FIG. 37 is a block diagram showing an example wherein the controller of the brushless motor (BLM) 1 explained in the above-mentioned Embodiment 1 is used to control a pump 24.

In accordance with the present invention, magnetic detection means, such as Hall devices, are not necessary in order to detect the rotation position of the rotor. Even when only one induced voltage value is detected, the rotation position of the rotor can be detected accurately. Hence, even when a given brushless motor is used, the cost for rotation position detection means, such as rotor rotation position detection sensors, is not necessary. For this reason, a pump produced at low cost can be driven accurately. In particular, when wide-angle energization is carried out for a pump driven by an embedded magnet brushless motor, the rotation position of the rotor can be detected accurately. As a result, the pump can be driven at low noise and at low vibration.

As clearly explained in detail with respect to the embodiments, the brushless motor controller in accordance with the present invention has the following effects.

In the brushless motor controller in accordance with the present invention, the time of the intersection of the detected induced voltage and the induced voltage reference value can be detected accurately at all times. Hence, in accordance with the present invention, the rotation position of the rotor can be detected accurately from one induced voltage detection value. Magnetic detection means, such as Hall devices, are not necessary in order to detect the rotation position of the rotor.

In the brushless motor controller in accordance with the present invention, even when the time of the intersection of the detected induced voltage and the induced voltage reference value cannot be detected, the time of the intersection can be obtained on the basis of the induced voltage change rate. Hence, in accordance with the present invention, the rotation position of the rotor can be detected securely without using magnetic detection means, such as Hall devices, for detecting the rotation position of the rotor.

When it is judged that the time of the intersection of the detected induced voltage and the induced voltage reference value cannot be detected in the brushless motor controller in accordance with the present invention, the energization of the OFF phase starts immediately. Hence, the selection of the voltage application state can be carried out securely.

Even when the motor parameters change owing to temperature or the like in the brushless motor controller in accordance with the present invention, the table values for generating the induced voltage reference value and the table values for generating the induced voltage change rate are corrected on the basis of the change rate of the detected induced voltage, two or more values of which can be detected. Therefore, in accordance with the present invention, the rotation position of the rotor can be detected accurately without using magnetic detection means, such as Hall devices, for detecting the rotation position of the rotor.

In the brushless motor controller in accordance with the present invention, the table values of the induced voltage reference value generation circuit with respect to the change in temperature is corrected. Hence, in accordance with the present invention, highly efficient operation can be carried out without using magnetic detection means, such as Hall devices, for detecting the rotation position of the rotor.

In the brushless motor controller in accordance with the present invention, the induced voltage reference value can be adjusted and set at a value different from the DC voltage by half, whereby the current phase with respect to the induced voltage can be controlled. Hence, even when the applied voltage is saturated, the motor speed can be raised further by changing the current phase. Therefore, in accordance with the present invention, the operation range of the motor can be widened, without using magnetic detection means, such as Hall devices, for detecting the rotation position of the rotor.

In the brushless motor controller in accordance with the present invention, the duty factor in a predetermined time from the start of an energization period can be set so as to be larger than the duty factor in a predetermined time to the end of the energization period on the basis of the motor speed and the duty factor index. Therefore, the current supplied to the phase winding can have a sine waveform in the brushless motor controller in accordance with the present invention. Therefore, in accordance with the present invention, low-vibration low-noise operation can be attained at high efficiency.

Although the present invention has been described with respect to its preferred embodiments in some detail, the disclosed contents of the preferred embodiments may change in the details of the structure thereof, and any changes in the combination and sequence of the components may be attained without departing from the scope and spirit of the claimed invention.

What is claimed is:

1. A brushless motor control method for controlling a brushless motor provided with a stator having a number of windings and a rotor having a number of magnetic poles, comprising:

a step of detecting a supplied DC voltage, a step of detecting an induced voltage appearing at a terminal of an OFF phase, a step of generating an induced voltage reference value depending on the operation state of said brushless motor, a step of renewing an induced voltage change rate generation table on the basis of a change rate of said induced voltage detected at least at two points, a step of generating the change rate of said induced voltage depending on the operation state of said brushless motor on the basis of the renewed induced voltage change rate generation table, a step of detecting an intersection time of the intersection of said detected induced voltage and said induced voltage reference value on the basis of said detected induced voltage and said induced voltage reference value, or calculating said intersection time on the basis of said detected induced voltage, said induced voltage reference value and said induced voltage change rate, a step of calculating the rotation speed of said brushless motor on the basis of time interval of said detected intersection time values, a step of outputting a duty factor index on the basis of a deviation between a command speed and said rotation speed of said brushless motor, and a step of driving said brushless motor on the basis of said detected intersection time, said rotation speed and said duty factor index.

2. A brushless motor control method for controlling a brushless motor provided with a stator having a number of windings and a rotor having a number of magnetic poles, comprising:

a step of detecting a supplied DC voltage, a step of detecting an induced voltage appearing at a terminal of an OFF phase, a step of renewing an induced voltage reference value generation table on the basis of a change rate of said induced voltage detected at least at two points, a step of generating an induced voltage reference value depending on the operation state of said brushless motor on the basis of said renewed induced voltage reference value generation table, a step of generating an induced voltage change rate depending on the operation state of said brushless motor, a step of correcting said induced voltage reference value on the basis of the change rate of said induced voltage detected at least at two points, a step of detecting an intersection time of the intersection of said detected induced voltage and said induced voltage reference value on the basis of said detected induced voltage and said induced voltage reference value, or calculating said intersection time on the basis of said detected induced voltage, said induced voltage reference value and said induced voltage change rate, a step of calculating the rotation speed of said brushless motor on the basis of a time interval of said detected intersection time, a step of outputting a duty factor index on the basis of a deviation between a command speed and said rotation speed of said brushless motor, and a step of driving said brushless motor on the basis of said detected intersection time, said rotation speed and said duty factor index.

3. A brushless motor control method for controlling a brushless motor provided with a stator having a number of windings and a rotor having a number of magnetic poles, comprising:

a step of detecting a supplied DC voltage, a step of detecting an induced voltage appearing at a terminal of an OFF phase, a step of generating an induced voltage reference value depending on the operation state of said brushless motor, a step of generating an induced voltage change rate depending on the operation state of said brushless motor, a step of detecting an intersection time of the intersection of the detected induced voltage and said induced voltage reference value on the basis of said detected induced voltage and said induced voltage reference value, or calculating said intersection time on the basis of said detected induced voltage, said induced voltage reference value and said induced voltage change rate, a step of calculating the rotation speed of said brushless motor on the basis of a time interval of said detected intersection time, a step of changing said induced voltage reference value so that the phase of the current with respect to said induced voltage advances at the time when said rotation speed has a first predetermined value or more or when it is detected that said duty factor index is a second predetermined value or more, and a step of driving said brushless motor on the basis of said detected intersection time, said rotation speed and said duty factor index.

4. A brushless motor control method for controlling a brushless motor provided with a stator having a number of windings and a rotor having a number of magnetic poles, comprising:

a step of detecting a supplied DC voltage, a step of detecting an induced voltage appearing at a terminal of an OFF phase, a step of generating an induced voltage reference value depending on the operation state of said brushless motor, a step of generating an induced voltage change rate depending on the operation state of said brushless motor, a step of detecting an intersection time of the intersection of the detected induced voltage and said induced voltage reference value on the basis of said detected induced voltage and said induced voltage reference value, or calculating said intersection time on the basis of said detected induced voltage, said induced voltage reference value and said induced voltage change rate, a step of calculating the rotation speed of said brushless motor on the basis of a time interval of said detected intersection time values, a step of generating a duty pattern of a duty factor in an energization period so that the average of duty factors in a first predetermined time from the start of said energization period becomes larger than the average of duty factors in a second predetermined time to the end of said energization period, and a step of driving said brushless motor on the basis of said detected intersection time, said rotation speed, said duty factor index and said duty pattern.

5. A brushless motor control method in accordance with any one of claims 1 to 4, wherein when it is judged that the intersection time of the intersection of said detected induced voltage and said induced voltage reference value cannot be detected, said intersection time is calculated on the basis of said detected induced voltage, said induced voltage reference value and said induced voltage change rate.

6. A brushless motor control method in accordance with any one of claims 1 to 4, wherein when it is judged that the intersection time of the intersection of said detected induced voltage and said induced voltage reference value cannot be detected on the basis of an induced voltage value first detected after the selection of an OFF phase, the sign of said induced voltage change rate and said induced voltage reference value, the energization of said OFF phase is started immediately.

7. A brushless motor control method in accordance with any one of claims 1 to 4, wherein when an OFF period of said OFF phase is shorter than a predetermined value, the intersection time of the intersection of said detected induced voltage and said induced voltage reference value is calculated on the basis of said detected induced voltage, said induced voltage reference value and said induced voltage change rate.

8. A brushless motor control method in accordance with any one of claims 1 to 4, wherein said induced voltage change rate is generated from an induced voltage change rate generation table based on said rotation speed.

9. A brushless motor control method in accordance with any one of claims 1 to 4, wherein said induced voltage change rate is generated from an induced voltage change rate generation table based on said rotation speed and said duty factor index.

10. A brushless motor control method in accordance with any one of claims 1 to 4, wherein the sum of or the difference between a half of said detected DC voltage and a table value based on said rotation speed or said duty factor index is output as said induced voltage reference value.

11. A brushless motor control method in accordance with any one of claims 1 to 4, wherein the intersection time of said intersection of a detected induced voltage and said induced voltage reference value is determined by using said detected induced voltage after a predetermined time has passed from a time when the detected induced voltage first has a predetermined difference from a positive or negative voltage value of a DC voltage source supplying a DC voltage after the selection of an OFF phase, or said intersection time is calculated on the basis of said detected induced voltage, said induced voltage reference value and said induced voltage change rate.

12. A brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of said switching circuit, induced voltage detection means for detecting an induced voltage appearing at a terminal of each phase winding connected to a connection point of said two switching devices of said series circuit in a period when both the switching devices in one of said series circuits of said switching circuit are OFF simultaneously, induced voltage reference value generation means for generating an induced voltage reference value depending on the operation state of said brushless motor, induced voltage change rate correction means for renewing an induced voltage change rate generation table on the basis of a change rate of said induced voltage detected at least at two points, induced voltage change rate generation means for generating the change rate of said induced voltage depending on the operation state of said brushless motor on the basis of the renewed induced voltage change rate generation table, rotor rotation position detection means for detecting an intersection time of the intersection of the detected induced voltage and said induced voltage reference value on the basis of said detected induced voltage and said induced voltage reference value, or calculating said intersection time on the basis of said detected induced voltage, said induced voltage reference value and said induced voltage change rate, motor speed calculation means for calculating the rotation speed of said brushless motor on the basis of a time interval of said intersection time values detected by said rotor rotation position detection means, speed control means for outputting a duty factor index on the basis of a deviation between a command speed and said rotation speed of said brushless motor, and first switching signal generation means for outputting switching signals to the number of said switching devices on the basis of said intersection time detected by said rotor rotation position detection means, said rotation speed and said duty factor index.

13. A brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of said switching circuit, induced voltage detection means for detecting an induced voltage appearing at a terminal of each phase winding connected to a connection point of said two switching devices of said series circuit in a period when both the switching devices in one of said series circuits of said switching circuit are OFF simultaneously, induced voltage reference value correction means for renewing an induced voltage reference value generation table on the basis of a change rate of said induced voltage detected at least at two points, induced voltage reference value generation means for generating a reference value of said induced voltage depending on the operation state of said brushless motor on the basis of the renewed induced voltage reference value generation table, induced voltage change rate generation means for outputting the change rate of said induced voltage depending on the operation state of said brushless motor, rotor rotation position detection means for detecting an intersection time of the intersection of the detected induced voltage and said induced voltage reference value on the basis of said detected induced voltage and said induced voltage reference value, or calculating said intersection time on the basis of said detected induced voltage, said induced voltage reference value and said induced voltage change rate, motor speed calculation means for calculating the rotation speed of said brushless motor on the basis of a time interval of said intersection time values detected by said rotor rotation position detection means, speed control means for outputting a duty factor index on the basis of a deviation between a command speed and said rotation speed of said brushless motor, and first switching signal generation means for outputting switching signals to the number of said switching devices on the basis of said intersection time detected by said rotor rotation position detection means, said rotation speed and said duty factor index.

14. A brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of said switching circuit, induced voltage detection means for detecting an induced voltage appearing at a terminal of each phase winding connected to a connection point of said two switching devices of said series circuit in a period when both the switching devices in one of said series circuits of said switching circuit are OFF simultaneously, induced voltage reference value generation means for generating an induced voltage reference value depending on the operation state of said brushless motor, induced voltage change rate generation means for outputting a change rate of said induced voltage depending on the operation state of said brushless motor, rotor rotation position detection means for detecting an intersection time of the intersection of the detected induced voltage and said induced voltage reference value on the basis of said detected induced voltage and said induced voltage reference value, or calculating said intersection time on the basis of said detected induced voltage, said induced voltage reference value and said induced voltage change rate, motor speed calculation means for calculating the rotation speed of said brushless motor on the basis of a time interval of said intersection time values detected by said rotor rotation position detection means, speed control means for outputting a duty factor index on the basis of a deviation between a command speed and said rotation speed of said brushless motor, current phase adjustment means for changing said induced voltage reference value so that the phase of the current with respect to said induced voltage advances at a time when said rotation speed has a first predetermined value or more or when it is detected that said duty factor index is a second predetermined value or more, and first switching signal generation means for outputting switching signals to the number of said switching devices on the basis of said intersection time detected by said rotor rotation position detection means, said rotation speed and said duty factor index.

15. A brushless motor controller for controlling a brushless motor provided with a stator having a number of windings and a rotor having a number of magnetic poles, comprising:

a switching circuit having a number of series circuits, each of which comprises two switching devices disposed on the upstream and downstream sides of a current-flowing direction and connected in series, DC voltage detection means for detecting a DC voltage supplied to each series circuit of said switching circuit, induced voltage detection means for detecting an induced voltage appearing at a terminal of each phase winding connected to a connection point of said two switching devices of said series circuit in a period when both the switching devices in one of said series circuits of said switching circuit are OFF simultaneously, induced voltage reference value generation means for generating an induced voltage reference value depending on the operation state of said brushless motor, induced voltage change rate generation means for outputting a change rate of said induced voltage depending on the operation state of said brushless motor, rotor rotation position detection means for detecting an intersection time of the intersection of the detected induced voltage and said induced voltage reference value on the basis of said detected induced voltage and said induced voltage reference value, or calculating said intersection time on the basis of said detected induced voltage, said induced voltage reference value and said induced voltage change rate, motor speed calculation means for calculating the rotation speed of said brushless motor on the basis of a time interval of said intersection time values detected by said rotor rotation position detection means, speed control means for outputting a duty factor index on the basis of a deviation between a command speed and said rotation speed of said brushless motor, duty pattern generation means for generating a duty pattern of a duty factor in an energization period so that the average of duty factors in a first predetermined time from the start of said energization period becomes larger than the average of duty factors in a second predetermined time to the end of said energization period, and second switching signal generation means for outputting switching signals to the number of said switching devices on the basis of said intersection time detected by said rotor rotation position detection means, said rotation speed, said duty factor index and said duty pattern.

16. A brushless motor controller in accordance with any one of claims 12 to 15, wherein when said rotor rotation position detection means judges that it cannot detect the intersection time of the intersection of said detected induced voltage and said induced voltage reference value, it calculates said intersection time on the basis of said detected induced voltage, said induced voltage reference value and said induced voltage change rate.

17. A brushless motor controller in accordance with any one of claims 12 to 15, wherein when said rotor rotation position detection means judges that it cannot detect the intersection time of the intersection of said detected induced voltage and said induced voltage reference value on the basis of a value of said detected induced voltage first detected after a start of a period when both the switching devices in one of said series circuits of said switching circuit are OFF simultaneously, said switching signal generation means outputting a signal for immediately starting the energization of said OFF phase.

18. A brushless motor controller in accordance with any one of claims 12 to 15, wherein when an OFF period of an OFF phase is shorter than a predetermined value, said rotor rotation position detection means calculates the intersection time of the intersection of said detected induced voltage and said induced voltage reference value on the basis of said detected induced voltage, said induced voltage reference value and said induced voltage change rate.

19. A brushless motor controller in accordance with any one of claims 12 to 15, wherein said induced voltage change rate generation means generates said induced voltage change rate from an induced voltage change rate generation table based on said rotation speed.

20. A brushless motor controller in accordance with any one of claims 12 to 15, wherein said induced voltage change rate generation means generates said induced voltage change rate from an induced voltage change rate generation table based on said rotation speed and said duty factor index.

21. A brushless motor controller in accordance with any one of claims 12 to 15, wherein said induced voltage reference value generation means outputs a sum of or a difference between a half of said detected DC voltage and a table value based on said rotation speed or said duty factor index as said induced voltage reference value.

22. A brushless motor controller in accordance with any one of claims 12 to 15, wherein said rotor rotation position detection means detects the intersection time of the intersection of the detected induced voltage and said induced voltage reference value by using the detected induced voltage after a predetermined time has passed from a time when the detected induced voltage first has a predetermined difference from a positive or negative voltage value of a DC voltage source supplying said DC voltage after the detection phase of said induced voltage is changed to the phase of a series circuit used for the detection, or calculates said intersection time on the basis of said detected induced voltage, said induced voltage reference value and said induced voltage change rate.

23. A compressor having the brushless motor controller described in any one of claims 12 to 15.

24. A fan having the brushless motor controller described in any one of claims 12 to 15.

25. A pump having the brushless motor controller described in any one of claims 12 to 15.

* * * * *